(12) United States Patent
Nakano

(10) Patent No.: US 6,201,331 B1
(45) Date of Patent: Mar. 13, 2001

(54) MOTOR/GENERATOR

(75) Inventor: Masaki Nakano, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/275,789

(22) Filed: Mar. 25, 1999

(30) Foreign Application Priority Data

Mar. 25, 1998 (JP) .................................................. 10-077495

(51) Int. Cl.⁷ .................................................. H02K 16/00
(52) U.S. Cl. .......................... 310/114; 310/261; 310/266; 318/148; 318/153; 318/801; 318/811; 318/432
(58) Field of Search ..................................... 310/112, 114, 310/122, 156, 162, 266, 261, 68 R; 318/700, 140, 141, 148, 151, 153, 432, 434, 433, 801, 811, 798–815

(56) References Cited

U.S. PATENT DOCUMENTS

| | | | |
|---|---|---|---|
| 396,355 | * | 1/1889 | Dyer ...................................... 310/114 |
| 2,666,174 | * | 1/1954 | Pestarini .............................. 318/700 |
| 4,087,698 | * | 5/1978 | Myers ..................................... 307/84 |
| 4,407,132 | * | 10/1983 | Kawakatsu et al. ................... 60/716 |
| 4,453,447 | * | 6/1984 | Shinneman .......................... 84/422.4 |
| 4,866,321 | * | 9/1989 | Blanchard et al. .................. 310/112 |
| 5,184,040 | * | 2/1993 | Lim ...................................... 310/114 |
| 5,311,092 | * | 5/1994 | Fisher .................................. 310/266 |
| 5,444,341 | * | 8/1995 | Kneifel, II et al. .................. 318/432 |
| 5,495,131 | * | 2/1996 | Goldie et al. .......................... 310/12 |
| 5,554,915 | * | 9/1996 | Wedeen et al. ...................... 318/432 |
| 5,594,322 | * | 1/1997 | Rozman et al. ....................... 322/10 |
| 5,744,895 | * | 4/1998 | Seguchi et al. ...................... 310/266 |
| 5,783,894 | * | 7/1998 | Wither ................................. 310/266 |
| 5,793,136 | * | 8/1998 | Redzic ................................. 310/114 |

FOREIGN PATENT DOCUMENTS 8-340663  12/1996  (JP) .

* cited by examiner

Primary Examiner—David Martin
(74) Attorney, Agent, or Firm—Foley & Lardner

(57) ABSTRACT

Two rotors (3,4) and one stator (2) are arranged coaxially. The stator (2) comprises a coil unit (6) which produces, by the supply of a first alternating current, the same number of rotating magnetic fields as the number of magnetic poles of said first rotor (3), and, by the supply of a second alternating current, the same number of rotating magnetic fields as the number of magnetic poles of said second rotor (4). A composite current of said first and second alternating currents is supplied to said coil unit (6), and a circuit (15) is provided for compensating torque fluctuation due to non-uniformity of the magnetic field accompanying the relative rotation of the two said rotors (3, 4).

4 Claims, 13 Drawing Sheets

RELATION AT t = 0

RELATION AT t = 0

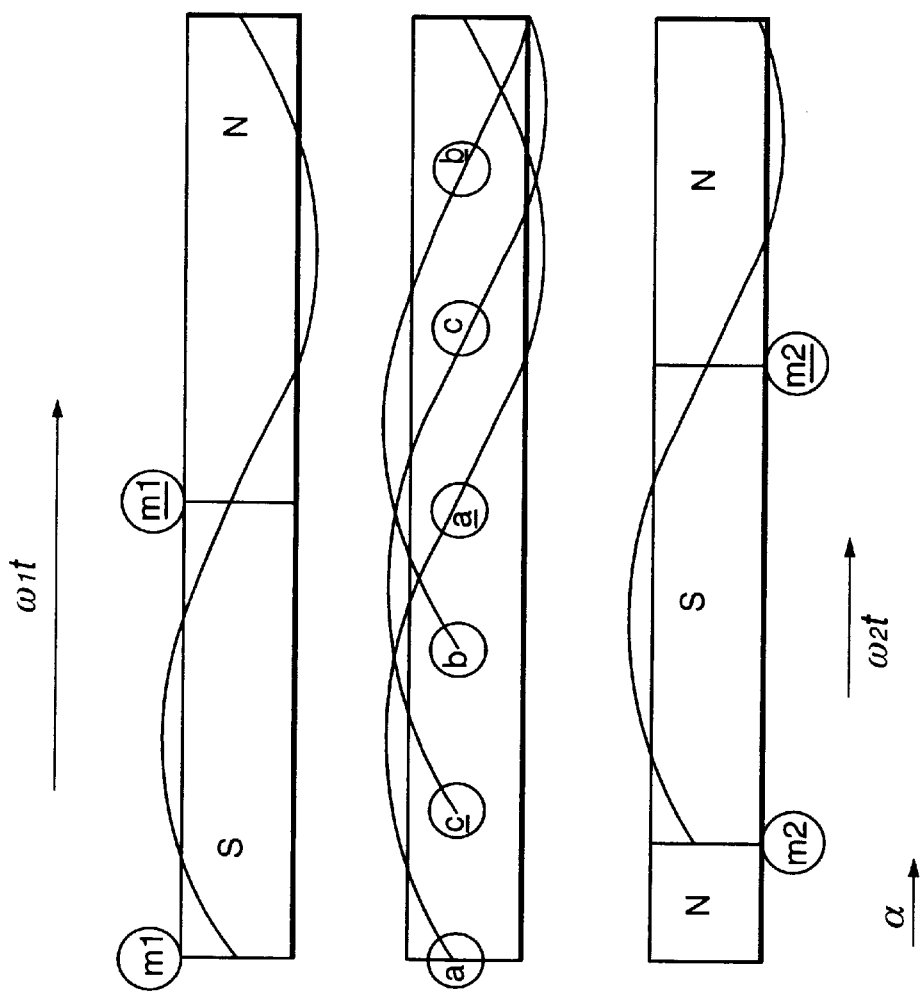

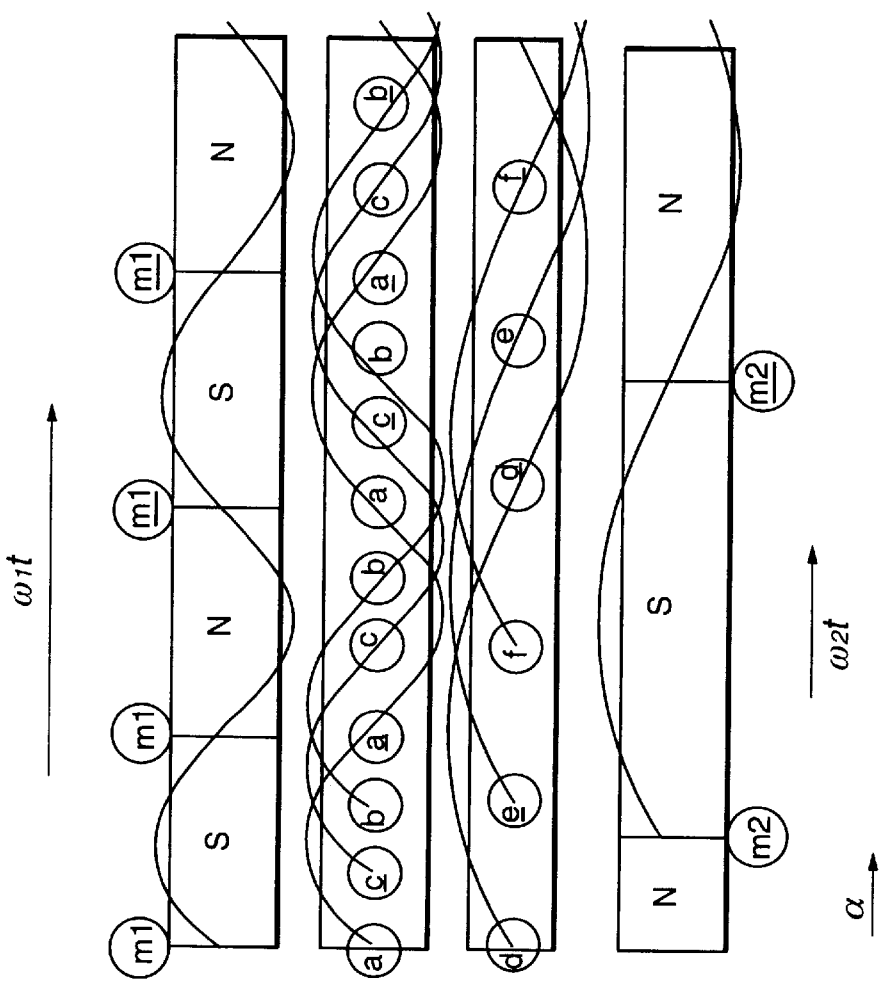

RELATION AT t = 0

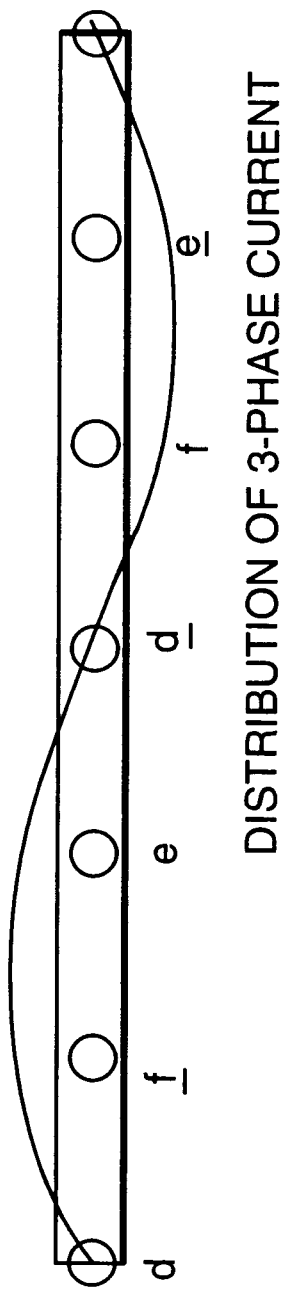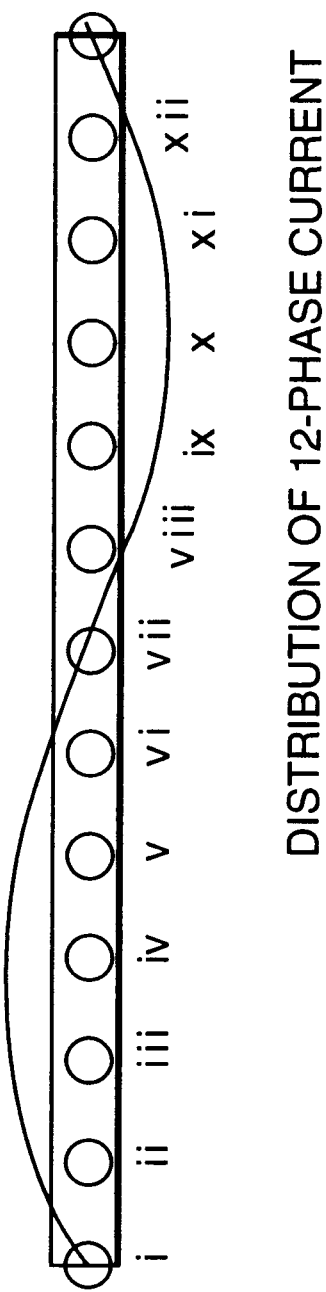
FIG. 10A  DISTRIBUTION OF 3-PHASE CURRENT
FIG. 10B  DISTRIBUTION OF 12-PHASE CURRENT

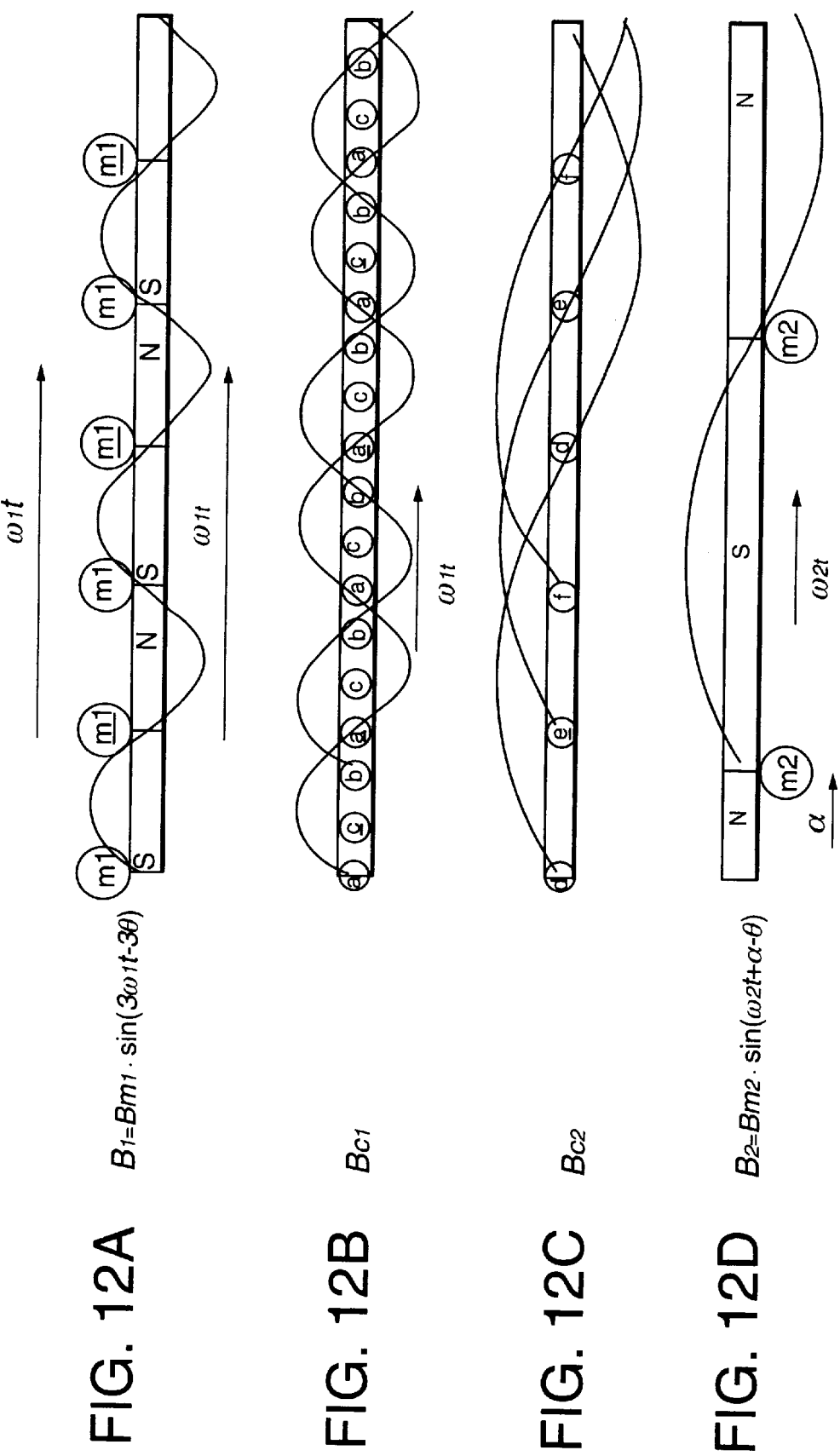

STAGE A

STAGE B

MOTOR/GENERATOR

FIELD OF THE INVENTION

This invention relates to the structure of a motor/generator.

BACKGROUND OF THE INVENTION

Tokkai Hei 8-340663 published by the Japanese Patent Office in 1996 discloses a motor/generator comprising two rotors and one stator coaxially arranged in three layers wherein one of the rotors is driven as a motor and the other is driven as a generator.

In this motor/generator, wo sets of coils are installed in the stator for providing a magnetic field for respective rotors, and two sets of inverters, i.e., current controllers, are provided for controlling respective sets of coils.

SUMMARY OF THE INVENTION

However, in the case of this motor/generator, since two sets of coils and inverters are required, current losses such as copper losses or switching losses are large.

It is therefore an object of this invention to reduce current losses of a motor/generator having the construction described in the prior art.

In order to achieve the above object, this invention provides a motor/generator comprising a first rotor comprising plural magnetic poles and supported free to rotate, a second rotor comprising plural magnetic poles and supported free to rotate coaxially with the first rotor, a stator fixed co-axially with the first rotor, and a coil unit comprising plural coils disposed at equal angular intervals on the stator, wherein the coil unit forms plural rotating magnetic fields of equal number to the number of magnetic poles of the first rotor according to a first alternating current and forms plural rotating magnetic fields of equal number to the number of magnetic poles of the second rotor according to a second alternating current.

The motor/generator further comprises an electrical circuit for supplying a composite electrical current comprising the first alternating current and the second alternating current to the coil unit, and a circuit for compensating a torque fluctuation produced in either of the two rotors due to the non-uniformity of the magnetic field accompanying the relative rotation of the first rotor and second rotor.

The details as well as other features and advantages of this invention are set forth in the remainder of the specification and are shown in the accompanying drawings.

BRIEF DESCRIPTION OF THE DRAWINGS

FIGS. 6A–6C are diagrams showing a variation of the flux density in the motor/generator of FIG. 8.

FIGS. 8A–8D are diagrams showing a change of magnetic flux density in the motor/generator of FIG. 7.

FIGS. 10A and 10B are diagrams showing a distribution of alternating current to drive the motor/generator of FIG. 9.

FIGS. 12A–12D are diagrams showing a change of magnetic flux density in the motor/generator of FIG. 11.

DESCRIPTION OF THE PREFERRED EMBODIMENTS

Figure 1:
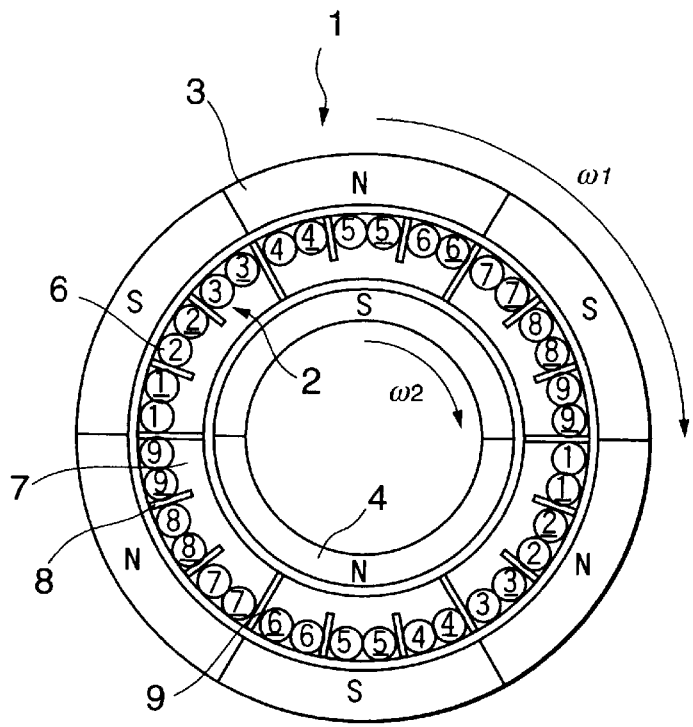
FIG. 1 is a schematic cross-sectional view of a motor/generator according to this invention.

Referring to FIG. 1 of the drawings, a motor/generator has a three-layer construction comprising a cylindrical stator 2 and rotors 3, 4 arranged with a predetermined clearance outside and inside the stator 2.

Figure 3:
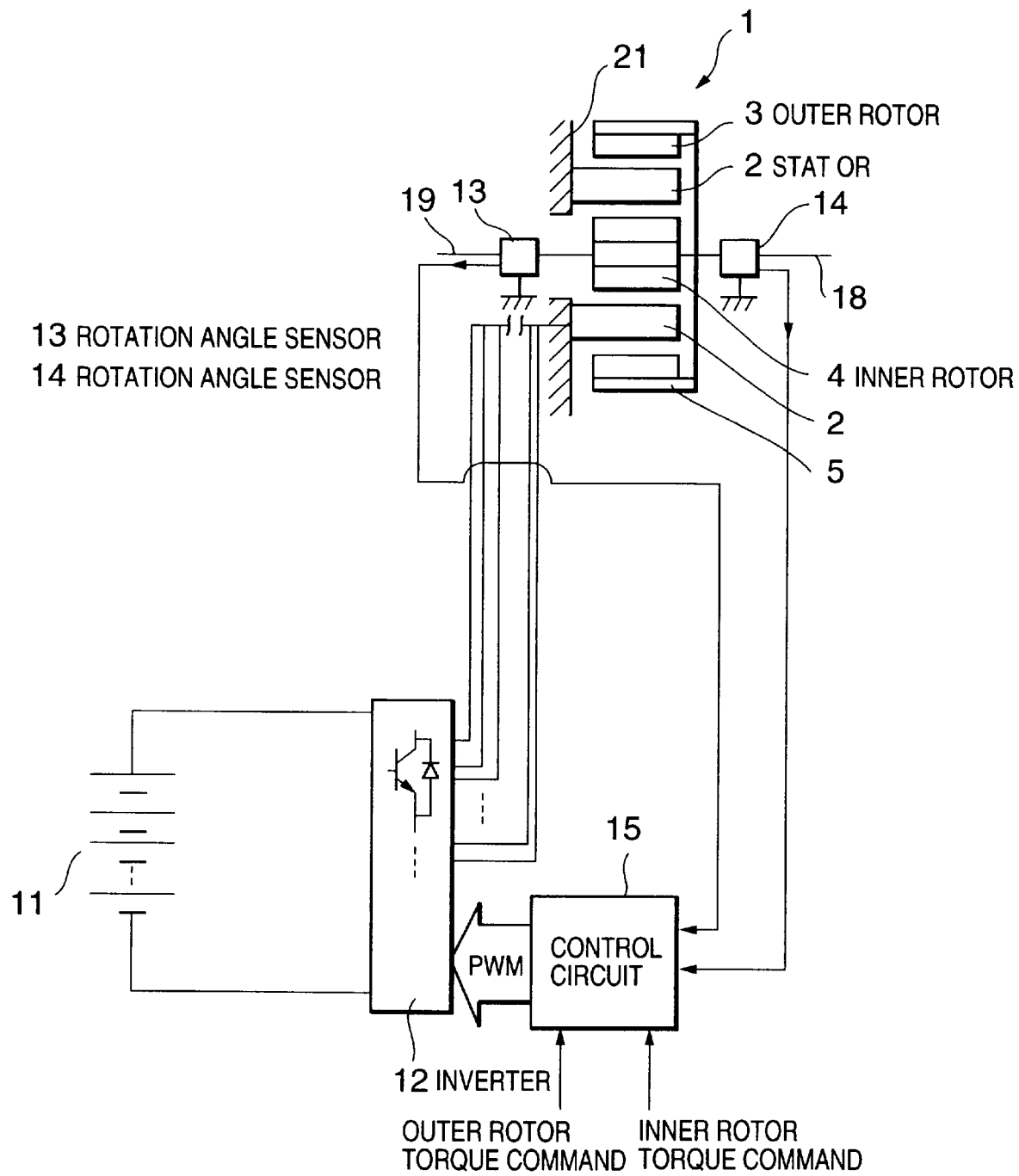
FIG. 3 is a schematic diagram of a control circuit according to this invention.

The stator 2, outer rotor 3 and inner rotor 4 are arranged coaxially. The stator 2 is fixed to a casing 21 of a motor/generator 1 as shown in FIG. 3. The outer rotor 3 is fixed to a frame 5, and the frame 5 rotates relative to the casing 21 via an axis 18. The inner rotor 4 rotates relative to the casing 21 via an axis 19.

The inner rotor 4 comprises permanent magnets having N poles and S poles respectively arranged on each of two semicircles, as shown in FIG. 1. The outer rotor 3 comprises permanent magnets having a pole number three times that of the rotor 4 with three S poles and N poles alternately arranged at 60 degree intervals.

When the magnetic pole number ratio of the outer rotor 3 and inner rotor 4 (referred to hereafter simply as magnetic pole number ratio) is 3:1 the rotating magnetic fields relative to the inner rotor 4 has no effect on the rotational torque of the outer rotor 3, as described later.

The rotating magnetic fields relative to the outer rotor 3 does have an effect on the rotation torque of the inner rotor 4, and causes a torque fluctuation thereof. However, as will be clear from the following theoretical analysis, this torque fluctuation may be expressed as a function of the phase difference ($\omega_1-\omega_2$) of the outer rotor 3 and inner rotor 4, and by adding an amplitude modulation to the alternating current supplied to the coils 6 of the stator 2, the torque fluctuation may be eliminated beforehand and the inner rotor 4 can be rotated under a fixed rotation torque. The stator 2 comprises three of the coils 6 per magnetic pole of the outer rotor 3, i.e., a total of eighteen coils. These coils 6 are arranged at equal intervals on the same circumference.

For convenience, the numbers #1–#9 are appended to these eighteen coils, as shown in FIG. 1.

To distinguish from part numbers, the symbol # will be appended before a number when referring to a coil.

The coils 6 are wound around six cores 7. The cores 7 are arranged in a circumferential direction across gaps 9. To reduce the total number of cores 7, the cores are split into three by slits 8 and three coils 6 are wound on one of the cores 7.

The following currents $I_1$–$I_{18}$ are passed into these eighteen coils.

$I_1 = Ia + Id$ $I_2 = \underline{Ic}$ $I_3 = Ib$ $I_4 = \underline{Ia} + \underline{If}$ $I_5 = Ic$ $I_6 = \underline{Ib}$ $I_7 = Ia + Ie$ $I_8 = \underline{Ic}$ $I_{10} = \underline{Ia} + \underline{Id}(=I_1)$ $I_{11} = Ic(=I_2)$ $I_{12} = \underline{Ib}(=I_3)$ $I_{13} = \underline{Ia} + If(=I_4)$ $I_{14} = \underline{Ic}(=I_5)$ $I_{15} = Ib(=I_6)$ $I_{16} = \underline{Ia} + \underline{Ie}(=I_7)$ $I_{17} = Ic(=I_8)$ $I_9 = Ib$ $I_{18} = \underline{Ib}(=I_9)$ Herein, current numbers with underlining show currents in the reverse direction.

In the equations for these composite currents, $I_{10}$–$I_{18}$ are the reverse of $1_1$–$I_9$. Hence, in a combination where the magnetic pole number ratio is 3:1, the phase is reversed over half the circumference, and a nine-phase alternating current (half of eighteen-phase) may be used.

This is why the coil numbers #1–#9 are used. For example, alternating currents of the same phase but opposite direction are passed through each of the two coils #1. Similar processing is performed for the other coils #2–#9.

Next, the above current settings will be described in detail referring to FIG. 11.

For the purpose of comparison with FIG. 1, this diagram shows a case where specific coils d, f, e are provided on the inner circumference of the stator 2 stator generating rotating magnetic fields relative to the inner rotor 4, and specific coils a, c, b are provided on the outer circumference of the stator 2 for generating rotating magnetic fields relative to the outer rotor 3.

To combine these two groups of coils into the one group shown in FIG. 1, the current passed into the coil d is taken up by the coil a which is in the vicinity of the coil d, the current passed into the coil f is taken up by the coil a which is in the vicinity of the coil f, and the current passed into the coil e is taken up by the coil a which is in the vicinity of the coil e. Further the current passed through the coil d is taken up by the coil a which is in the vicinity of the coil d, the current passed into the coil f is taken up by the coil a which is in the vicinity of the coil f, and the current passed into the coil e is taken up by the coil a which is in the vicinity of the coil e.

The equations for the composite currents $I_1$–$I_{18}$ mentioned above are mathematical expressions of this concept. However, the current may be set by other methods as described hereafter.

When this current setting is applied, two rotating magnetic fields can be formed simultaneously, i.e., rotating magnetic fields relative to the inner rotor 4 and rotating magnetic fields relative to the outer rotor 3, despite the use of one series of coils. The above current setting of Id, If, Ie is performed in synchronism with the rotation of the inner rotor 4 and the current setting of Ia, Id, Ib is performed in synchronism with the rotation of the outer rotor 3. A phase advance or delay is set relative to the direction of the torque, but this is the same as the case of an ordinary synchronous motor.

Next, referring to FIG. 3, the case will be described of a controller supplying the composite currents $I_1$–$I_{18}$ mentioned above to the stator 2.

The controller comprises an inverter 12 to convert a direct current of a battery power supply 11 into an alternating current.

Since the total number of coils is eighteen, an inverter having a phase number equal to the total number of coils is required, i.e., an inverter which produces an eighteen-phase alternating current, but as the eighteen-phase current reverses every 180 degrees, an inverter which generates nine-phase alternating current may be used. Consequently, a smaller number of transistors and diodes is required to construct the inverter 12.

Figure 4:
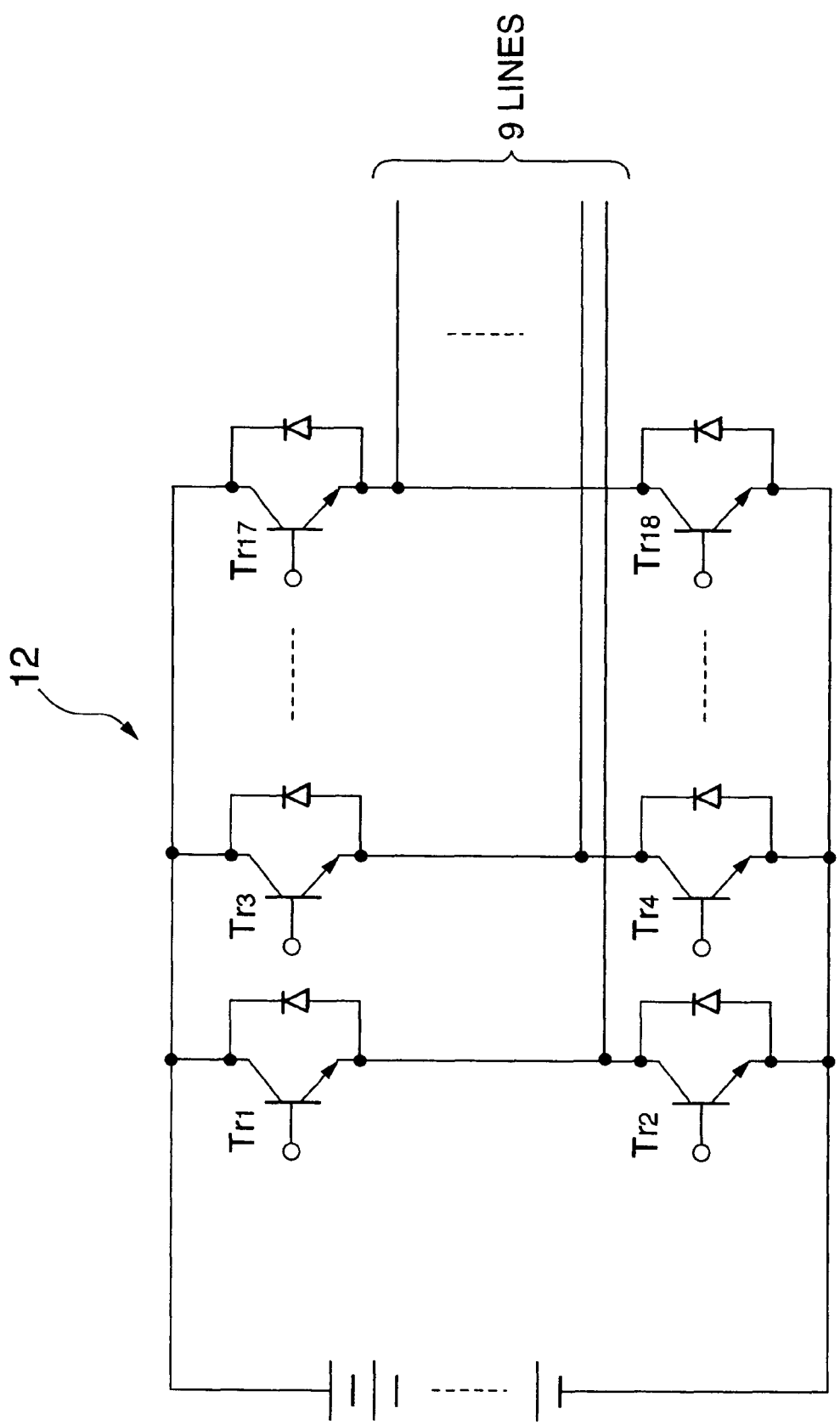
FIG. 4 is a schematic cross-sectional view of an inverter according to this invention.

The inverter 12 corresponds to a common three-phase bridge type inverter converted to a nine-phase inverter as shown in FIG. 4, and it comprises eighteen transistors Tr1–Tr18 and the same number of diodes.

An ON/OFF signal supplied to each gate of the inverter 12, i.e., base of the transistors, is a pulse width modulation (PWM) signal.

Rotation angle sensors 14 and 13 which detect the phases of the rotors 3 and 4 are fitted. The signals from these sensors 13, 14 are input into a control circuit 15. A PWM signal is generated in the control circuit 15 based on positive or negative torque command values input to the control circuit 15 for specifying the desired rotational torque to be exerted on the outer rotor 3 and inner rotor 4.

In this way, in this motor/generator 1, two rotors 3 and 4 and one stator 2 are arranged coaxially in three layers, common coils 6are provided in the stator 2, and a composite current is passed in the coils 6 so as to generate rotating magnetic fields inside and outside which are equal in number to the number of magnetic poles of the rotors 3 and 4. Therefore, when one of the rotors 3 and 4 is driven as a motor and the other is driven as a generator, a current differential between the motor drive power and the power generated by the generator may be passed into the coils 6, and thereby largely reduce current losses compared to the case when coils are provided separately for the rotors 3 and 4.

Further, as the two rotors 3 and 4 can be controlled by a single inverter 12, the cost of the inverter can be reduced, and as the power switching transistor capacitance of the inverter is reduced, switching efficiency improves.

On the other hand, regarding the constant torque fluctuation produced in the rotation of the inner rotor 4 due to the non-uniformity of the magnetic field accompanying the relative rotation of the two rotors 3 and 4, this torque fluctuation may be eliminated beforehand by adding an amplitude modulation to the component of the composite current which generates rotating magnetic fields relative to the outer magnets, and torque fluctuation is thereby suppressed.

Figure 2:
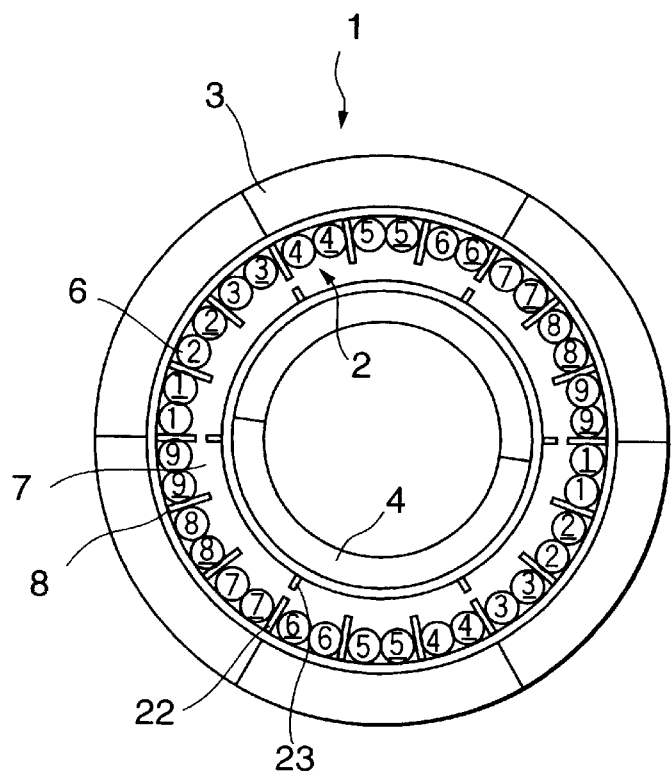
FIG. 2 is similar to FIG. 1, but showing a second embodiment of this invention.

Next, a second embodiment of the invention will be described referring to FIG. 2.

In the aforesaid first embodiment, there were six of the cores 7, but in this embodiment, all the coils 6 are wound on an identical core 7. However, slits 22 and 23 of predetermined width are provided at a fixed interval in the core 7 to largely increase the magnetic resistance so as to avoid interference between the magnetic fluxes generated by the coils 6. With this construction, the number of steps for manufacturing the motor/generator is less than in the aforesaid first embodiment.

In the first and second embodiments, the magnetic pole number ratio is 3:1, but according to theoretical analysis, except in the case where the magnetic pole number ratio is 2:1, one of the rotors 3, 4 or the rotating magnetic fields which drive that rotor causes a fluctuation in the rotation of the other rotor. This torque fluctuation is prevented by adding an amplitude modulation to the alternating current. This processing is also based on theoretical analysis.

Next, the theoretical analysis of the driving forces acting on the rotors will be performed with respect to the magnetic pole number ratios.

(1) N(2p—2p) type

First, describing the notation N(2p—2p), 2p on the left represents the number of magnetic poles of the permanent magnets of the outer rotor 3, and 2p on the right represents the number of magnetic poles of the permanent magnets of the inner rotor 4. Accordingly, the magnetic pole number ratio N(2p—2p) means a motor/generator wherein the magnetic polymer ratio of the outer rotor 3 and inner rotor 4 is 1:1.

Figure 5:
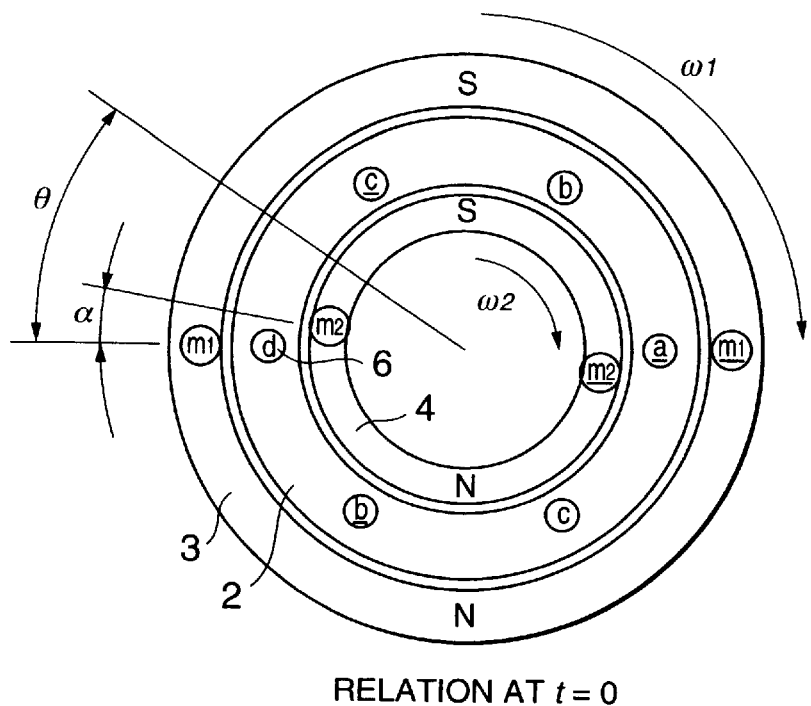
FIG. 5 is a schematic cross-sectional view of a motor/generator used as a model for theoretically analyzing the principle of this invention.

N is a positive integer. If N is 1, the magnetic pole number of both the outer rotor 3 and inner rotor 4 is two, and if N is 2, the magnetic pole number of both the outer rotor 3 and inner rotor 4 is four. FIG. 5 shows the case of a motor/generator wherein N is 1.

(1—1) Basic formulae

In FIG. 5, if the permanent magnets of the outer rotor 3 (hereafter abbreviated as outer magnets) $m_1$ and the permanent magnets of the inner rotor 4 (hereafter abbreviated as inner magnets) $m_2$ are replaced by equivalent coils, the magnetic flux densities $B_1$, $B_2$ of the permanent magnets may be represented by the following equations (1) and (2).

$$B_1 = Bm_1 \cdot \sin(\omega_1 \cdot t - \theta) = \mu \cdot Im_1 \cdot \sin(\omega_1 \cdot t - \theta) \quad (1)$$

$$B_2 = Bm_2 \cdot \sin(\omega_2 \cdot t + \alpha - \theta) = \mu \cdot Im_2 \cdot \sin(\omega_1 \cdot t + \alpha - \theta) \quad (2)$$

where,
  $Bm_1$, $Bm_2$=magnetic flux amplitudes,
  $\mu$=magnetic permeability,
  $Im_1$=equivalent direct current of outer magnets,
  $Im_2$=equivalent direct current of inner magnets,
  $\omega_1$–rotational angular velocity of outer magnets,
  $\omega_2$–rotational angular velocity of inner magnets,
  $\alpha$=phase difference of outer and inner magnets (when t=0), and
  t=elapsed time from time when phase of outer magnets and stator coil coincided.

If the current passed through the stator is a three-phase alternating current, the magnetic flux density Bc due to the stator coil is expressed by the following equation (3).

$$Bc = \mu \cdot n \cdot \left\{ Ica(t) \cdot \sin\theta + Icb(t) \cdot \sin\left(\theta - \frac{2\pi}{3}\right) + Icc(t) \cdot \sin\left(\theta - \frac{4\pi}{3}\right) \right\} \quad (3)$$

where, n=coil constant.

In equation (3), Ica(t), Icb(t), Icc(t) are currents which are different in phase by 120 degrees.

The variation of the aforesaid magnetic flux densities $B_1$, $B_2$ and Bc is shown in FIGS. 6A–6C. The magnetic flux density changes as a sine-wave, and a total magnetic flux density B at an angle $\theta$ is expressed by the following equation (4).

$$B = B_1 + B_2 + Bc \quad (4)$$

$$= \mu \cdot Im_1 \cdot \sin(\omega_1 \cdot t - \theta) + \mu \cdot Im_2 \cdot \sin(\omega_2 \cdot t + \alpha - \theta) + \mu \cdot n \cdot$$

$$\left\{ Ica(t) \cdot \sin\theta + Icb(t) \cdot \sin\left(\theta - \frac{2\pi}{3}\right) + Icc(t) \cdot \sin\left(\theta - \frac{4\pi}{3}\right) \right\}$$

Here, let the torque acting on the outer rotor 3 be $\tau_1$. If the force which acts on a semicircle of the outer rotor 3 is $f_1$, the force which then acts the other semicircle is also $f_1$. Accordingly, the force acting on the whole circumference is $2f_1$, and the torques, may be expressed by the following equation.

$$\tau_1 = 2f_1 \cdot r_1$$

where, $r_1$=distance to outer magnets from center shaft of outer rotor.

Here, the force $f_1$ is a drive force which occurs when a direct current $Im_1$ is generated in a magnetic field of magnetic flux density B. From the above equation, it is seen that there is a directly proportional relation between the torque $\tau_1$ and the drive force $f_1$. As an equivalent direct current is formed for each semicircle, $f_1$ is given by the following equation.

$$f_1 = Im_1 \cdot B$$

where, $\theta = \omega_1 \cdot t_o$.

From this equation and equation (4), $f_1$ may be expressed by the following equation (5).

$$f_1 = Im_1 \cdot \left[ [\mu \cdot Im_2 \cdot \sin(\omega_2 \cdot t + \alpha - \omega_1 \cdot t) + \mu \cdot n \cdot \right. \quad (5)$$

$$\left\{ Ica(t) \cdot \sin(\omega_1 \cdot t) + Icb(t) \cdot \sin\left(\omega_1 \cdot t - \frac{2\pi}{3}\right) + \right.$$

$$\left. \left. Icc(t) \cdot \sin\left(\omega_1 \cdot t - \frac{4\pi}{3}\right) \right\} \right]$$

Similarly, if the force acting on the semicircle of the inner rotor 4 is $f_2$, the force acting on the whole rotor is $2f_2$, so the torque $\tau_2$ acting on the inner magnets $m_2$ may be expressed by the following equation.

$$\tau_2 = 2f_2 \cdot r_2$$

where, $r_2$=distance from center axis of inner rotor 4 to the inner magnets $m_2$., Here, the force $f_2$ is the drive force due to an equivalent direct current $Im_2$ in a magnetic field of magnetic flux density B. As an equivalent direct current is formed for each semicircle, $f_2$ is given by the following equation.

$$f_2 = Im_2 \cdot B \quad (5)$$

where, $\theta = \omega_2 \cdot t + \alpha$.

From this equation and equation (4), $f_2$ may be expressed by the following equation (6)

$$f_2 = Im_2 \cdot \left[ \mu \cdot Im_1 \cdot \sin(\omega_1 \cdot t - \omega_2 \cdot t - \alpha) + \mu \cdot n \cdot \right. \quad (6)$$
$$\left. \{Ica(t) \cdot \sin(\omega_2 \cdot t + \alpha) + Icb(t) \cdot \sin\left(\omega_2 \cdot t + \alpha - \frac{2\pi}{3}\right) + Icc(t) \cdot \sin\left(\omega_2 \cdot t + \alpha - \frac{4\pi}{3}\right)\} \right]$$

(1-2) When external rotating magnetic fields are applied In order to pass currents in the coils a, b, c each of which has a phase difference of $\beta$ with respect to the rotating outer magnets $m_1$, alternating currents Ica(t), Icb(t), Icc(t) in equation (3) are set by the following equations (7A)–(7C).

$$IIca(t) = Ic \cdot \cos(\omega_1 \cdot t - \beta) \quad (7A)$$

$$Icb(t) = Ic \cdot \cos\left(\omega_1 \cdot t - \beta - \frac{2\pi}{3}\right) \quad (7B)$$

$$Icc(t) = Ic \cdot \cos\left(\omega_1 \cdot t - \beta - \frac{4\pi}{3}\right) \quad (7C)$$

where,

Ic = amplitude of alternating currents, and
$\beta$ = phase difference.

The drive force $f_1$, $f_2$ is calculated by substituting equations (7A)–(7C) in equations (5)–(6).

$$f_1 = Im_1 \cdot \{\mu \cdot Im_2 \cdot \sin(\omega_2 \cdot t + \alpha - \omega_1 \cdot t)\} + \mu \cdot n \cdot Ic \cdot$$
$$\left\{ \cos(\omega_1 \cdot t - \beta) \cdot \sin(\omega_1 \cdot t) + \right.$$
$$\cos\left(\omega_1 \cdot t - \beta - \frac{2\pi}{3}\right) \cdot \sin\left(\omega_1 \cdot t - \frac{2\pi}{3}\right) +$$
$$\left. \cos\left(\omega_1 \cdot t - \beta - \frac{4\pi}{3}\right) \cdot \sin\left(\omega_1 \cdot t - \frac{4\pi}{3}\right) \right\}$$

Here, the above equation may be rewritten using the formula $$\cos(a+b) = \frac{1}{2} \cdot \{\sin(2a+b) - \sin(b)\}.$$

$$f_1 = Im_1 \cdot \left[ \mu \cdot Im_2 \cdot \sin(\omega_2 \cdot t + \alpha - \omega_1 \cdot t) + \mu \cdot n \cdot Ic \cdot \right. \quad (8)$$
$$\left[ \frac{1}{2} \cdot \{\sin(2\omega_1 \cdot t - \beta) + \sin\beta\} + \right.$$
$$\frac{1}{2} \cdot \left[ \sin\left\{2\left(\omega_1 \cdot t - \frac{2\pi}{3}\right) - \beta\right\} + \sin\beta \right] +$$
$$\left. \left. \frac{1}{2} \cdot \left[ \sin\left\{2\left(\omega_1 \cdot t - \frac{4\pi}{3}\right) - \beta\right\} + \sin\beta \right] \right] \right]$$

$$= Im_1 \cdot \left[ \mu \cdot Im_2 \cdot \sin(\omega_2 \cdot t + \alpha - \omega_1 \cdot t) + \frac{1}{2} \cdot \mu \cdot n \cdot Ic \cdot \right.$$

$$\left[ 3\sin\beta + \sin\left\{2\left(\omega_1 \cdot t - \frac{2\pi}{3}\right) - \beta\right\} + \sin\left\{2\left(\omega_1 \cdot t - \frac{4\pi}{3}\right) - \beta\right\} \right] \right]$$

$$= Im_1 \cdot \left[ \mu \cdot Im_2 \cdot \sin(\omega_2 \cdot t + \alpha - \omega_1 \cdot t) + \frac{1}{2} \cdot \mu \cdot n \cdot Ic \cdot \right.$$
$$\left\{ 3\sin\beta + \sin\left(2\omega_1 \cdot t - \frac{4\pi}{3} - \beta\right) + \sin\left(2\omega_1 \cdot t - \frac{8\pi}{3} - \beta\right) \right\} \right]$$

$$= Im_1 \cdot \left[ \mu \cdot Im_2 \cdot \sin(\omega_2 \cdot t + \alpha - \omega_1 \cdot t) + \frac{1}{2} \cdot \mu \cdot n \cdot Ic \cdot \right.$$
$$\left\{ 3\sin\beta + \sin\left(2\omega_1 \cdot t - \beta - \frac{2\pi}{3}\right) + \sin\left(2\omega_1 \cdot t - \beta - \frac{4\pi}{3}\right) \right\} \right]$$

$$= -Im_1 \cdot \left[ \mu \cdot Im_2 \cdot \sin\{(\omega_2 - \omega_1) \cdot t - \alpha\} - \frac{3}{2} \cdot \mu \cdot n \cdot Ic \cdot \sin\beta \right]$$

Equation (8) has a form wherein the first term which is a torque fluctuation amount due to the effect of the magnetic field of the inner agnets is added to the second term which is a constant torque.

Also, $f_2$ may be rewritten by the following equation.

$$f_2 = Im_2 \cdot B$$
$$= Im_2 \cdot \left[ \mu \cdot Im_1 \cdot \sin(\omega_1 \cdot t - \omega_2 \cdot t - \alpha) + \mu \cdot n \cdot Ic \cdot \right.$$
$$\left\{ \cos(\omega_1 \cdot t - \beta) \cdot \sin(\omega_2 \cdot t + \alpha) + \right.$$
$$\cos\left(\omega_1 \cdot t - \frac{2\pi}{3} - \beta\right) \cdot \sin\left(\omega_2 \cdot t - \frac{2\pi}{3} + \alpha\right) +$$
$$\left. \left. \cos\left(\omega_1 \cdot t - \frac{4\pi}{3} - \beta\right) \cdot \sin\left(\omega_2 \cdot t - \frac{4\pi}{3} + \alpha\right) \right\} \right]$$

Here, the above equation may be rewritten using the formula $$\cos(a) \cdot \sin(b) = \frac{1}{2} \cdot \{\sin(a+b) - \sin(a-b)\}.$$

$$f_2 = Im_2 \cdot \left[ \mu \cdot Im_1 \cdot \sin(\omega_1 \cdot t - \omega_2 \cdot t - \alpha) + \mu \cdot n \cdot Ic \cdot \frac{1}{2} \cdot \right. \quad (9)$$
$$\left\{ \sin(\omega_1 \cdot t - \beta + \omega_2 \cdot t + \alpha) - \sin(\omega_1 \cdot t - \beta - \omega_2 \cdot t - \alpha) + \right.$$
$$\sin\left(\omega_1 \cdot t - \frac{2\pi}{3} - \beta + \omega_2 \cdot t - \frac{2\pi}{3} + \alpha\right) -$$
$$\sin\left(\omega_1 \cdot t - \frac{2\pi}{3} - \beta - \omega_2 \cdot t + \frac{2\pi}{3} - \alpha\right) +$$
$$\sin\left(\omega_1 \cdot t - \frac{4\pi}{3} - \beta + \omega_2 \cdot t - \frac{4\pi}{3} + \alpha\right) -$$
$$\left. \left. \sin\left(\omega_1 \cdot t - \frac{4\pi}{3} - \beta - \omega_2 \cdot t + \frac{4\pi}{3} - \alpha\right) \right\} \right]$$

$$= Im_2 \cdot \left[ \mu \cdot Im_1 \cdot \sin(\omega_1 \cdot t - \omega_2 \cdot t - \alpha) + \mu \cdot n \cdot Ic \cdot \frac{1}{2} \cdot \right.$$
$$\left[ \sin\{(\omega_1 + \omega_2) \cdot t + \alpha - \beta\} - \sin\{(\omega_1 - \omega_2) \cdot t - \alpha - \beta\} + \right.$$
$$\sin\left\{(\omega_1 - \omega_2) \cdot t - \frac{4\pi}{3} + \alpha - \beta\right\} -$$
$$\sin\{(\omega_1 - \omega_2) \cdot t - \alpha + \beta\} +$$

-continued
$$\sin\{(\omega_1+\omega_2)\cdot t - \frac{8\pi}{3}+\alpha-\beta\}-$$
$$\sin\{(\omega_1-\omega_2)\cdot t-\alpha-\beta\}\Big]\Big]$$
$$= Im_2 \cdot \Big[\mu \cdot Im_1 \cdot \sin(\omega_1 \cdot t - \omega_2 \cdot t - \alpha) - \frac{3}{2}\cdot \mu \cdot n \cdot Ic \cdot$$
$$\sin\{(\omega_1-\omega_2)\cdot t-\alpha-\beta\}+\mu\cdot n\cdot Ic\cdot\frac{1}{2}\cdot$$
$$[\sin\{(\omega_1+\omega_2)\cdot t+\alpha-\beta\}+$$
$$\sin\{(\omega_1-\omega_2)\cdot t+\alpha-\beta-\frac{2\pi}{3}\}+$$
$$\sin\{(\omega_1+\omega_2)\cdot t+\alpha-\beta-\frac{4\pi}{3}\}]\Big]$$
$$= \mu\cdot Im_2\cdot\Big[Im_1\cdot\sin\{(\omega_1-\omega_2)\cdot t-\alpha\}-\frac{3}{2}\cdot n\cdot Ic\cdot$$
$$\sin\{(\omega_1-\omega_2)\cdot t-\alpha-\beta\}$$

(1-3) When inner rotating magnetic fields are applied

In order to pass currents in the coils a, b, c each of which has a phase difference of $\gamma$ with respect to the rotating inner magnets $m_2$, alternating currents Ica(t), Icb(t), Icc(t) in the above equation (3) are set by the following equations (10a)–(10C).

$$Ica(t) = Ic \cdot \cos(\omega_2 \cdot t - \gamma) \quad (10A)$$

$$Icb(t) = Ic \cdot \cos\left(\omega_2 \cdot t - \gamma - \frac{2\pi}{3}\right) \quad (10B)$$

$$Icc(t) = Ic \cdot \cos\left(\omega_2 \cdot t - \gamma - \frac{4\pi}{3}\right) \quad (10C)$$

where,

Ic=amplitude of alternating currents, and
$\gamma$=phase difference.

The drive force $f_1$, $f_2$ is calculated by substituting equations (10A)–(10C) in equations (5)–(6).

$$f_1 = Im_1 \cdot \Big[\mu \cdot Im_2 \cdot \sin\Big[\omega_2\cdot t+\alpha-\omega_1\cdot t+\mu\cdot n\cdot Ic\cdot$$
$$\Big\{\cos(\omega_2\cdot t-\gamma)\cdot\sin(\omega_1\cdot t)+$$
$$\cos\Big(\omega_2\cdot t-\gamma-\frac{2\pi}{3}\Big)\cdot\sin\Big(\omega_1\cdot t-\frac{2\pi}{3}\Big)+$$
$$\cos\Big(\omega_2\cdot t-\gamma-\frac{4\pi}{3}\Big)\cdot\sin\Big(\omega_1\cdot t-\frac{4\pi}{3}\Big)\Big\}\Big]$$

Here, the above equation may be rewritten using the formula
$$\cos(a)\cdot\sin(b)=\tfrac{1}{2}\{\sin(a+b)-\sin(a-b)\}.$$

$$f_1 = Im_1 \cdot \Big[\mu\cdot Im_2\cdot\sin(\omega_2\cdot t+\alpha-\omega_1\cdot t)+\frac{1}{2}\cdot\mu\cdot n\cdot Ic\cdot \quad (11)$$
$$\Big\{\sin(\omega_2\cdot t-\gamma+\omega_1\cdot t)-\sin(\omega_2\cdot t-\gamma-\omega_1\cdot t)+$$
$$\sin\Big(\omega_2\cdot t-\gamma-\frac{2\pi}{3}+\omega_1\cdot t-\frac{2\pi}{3}\Big)-$$

-continued
$$\sin\Big(\omega_2\cdot t-\gamma-\frac{2\pi}{3}-\omega_1\cdot t+\frac{2\pi}{3}\Big)+$$
$$\sin\Big(\omega_2\cdot t-\gamma-\frac{4\pi}{3}+\omega_1\cdot t-\frac{4\pi}{3}\Big)-$$
$$\sin\Big(\omega_2\cdot t-\gamma-\frac{4\pi}{3}+\omega_1\cdot t+\frac{4\pi}{3}\Big)\Big\}\Big]+$$
$$= Im_1 \cdot \Big[\mu\cdot Im_2\cdot\sin\{(\omega_2-\omega_1)\cdot t+\alpha\}+\frac{1}{2}\cdot\mu\cdot n\cdot Ic\cdot$$
$$\Big[\sin\{(\omega_2+\omega_1)\cdot t-\gamma\}-\sin\{(\omega_2-\omega_1)\cdot t-\gamma\}+$$
$$\sin\Big\{(\omega_2+\omega_1)\cdot t-\gamma-\frac{4\pi}{3}\Big\}-\sin\{(\omega_2-\omega_1)\cdot t-\gamma\}+$$
$$\sin\Big\{(\omega_2+\omega_1)\cdot t-\gamma-\frac{8\pi}{3}\Big\}-\sin\{(\omega_2-\omega_1)\cdot t-\gamma\}\Big]\Big]$$
$$= Im_1 \cdot \Big[\mu\cdot Im_2\cdot\sin\{(\omega_2-\omega_1)\cdot t+\alpha\}-\frac{3}{2}\cdot\mu\cdot n\cdot Ic\cdot$$
$$\sin\{(\omega_2-\omega_1)\cdot t-\gamma\}+\frac{1}{2}\cdot\mu\cdot n\cdot Ic\cdot$$
$$\Big[\sin\{(\omega_2+\omega_1)\cdot t-\gamma\}+\sin\Big\{(\omega_2+\omega_1)\cdot t-\gamma-\frac{2\pi}{3}\Big\}+$$
$$\sin\Big\{(\omega_2+\omega_1)\cdot t-\gamma-\frac{4\pi}{3}\Big\}\Big]\Big]$$
$$= -\mu\cdot Im_1\cdot\Big[Im_2\cdot\sin\{(\omega_1-\omega_2)\cdot t-\alpha\}-\frac{3}{2}\cdot n\cdot Ic\cdot$$
$$\sin\{(\omega_1-\omega_2)\cdot t+\gamma\}\Big]$$

Equation (11) shows that a torque fluctuation occurs only in the outer magnets.

Also, $f_2$ may be rewritten by the following equation.

$$f_2 = Im_2 \cdot \Big[\mu\cdot Im_1\cdot\sin(\omega_2\cdot t-\omega_1\cdot t-\alpha)+\mu\cdot n\cdot Ic\cdot$$
$$\Big\{\cos(\omega_2\cdot t-\gamma)\cdot\sin(\omega_2\cdot t+\alpha)+$$
$$\cos\Big(\omega_2\cdot t-\gamma-\frac{2\pi}{3}\Big)\cdot\sin\Big(\omega_2\cdot t+\alpha-\frac{2\pi}{3}\Big)+$$
$$\cos\Big(\omega_2\cdot t-\gamma-\frac{4\pi}{3}\Big)\cdot\sin\Big(\omega_2\cdot t+\alpha-\frac{4\pi}{3}\Big)\Big\}\Big]$$

Here, the above equation may be rewritten using the formula
$$\cos(a)\cdot\sin(b)=\tfrac{1}{2}\{\sin(a+b)-\sin(a-b)\}.$$

$$f_2 = Im_2 \cdot \Big[\mu\cdot Im_1\cdot\sin(\omega_1\cdot t-\omega_2\cdot t-\alpha)-\frac{3}{2}\cdot\mu\cdot n\cdot Ic\cdot \quad (12)$$
$$\sin(-\alpha-\gamma)+\frac{1}{2}\cdot\mu\cdot n\cdot Ic\cdot\Big\{\sin(2\cdot\omega_2\cdot t+\alpha-\gamma)+$$
$$\sin\Big(2\cdot\omega_2\cdot t+\alpha-\gamma-\frac{2\pi}{3}\Big)+\sin\Big(2\cdot\omega_2\cdot t+\alpha-\gamma-\frac{4\pi}{3}\Big)\Big\}\Big]$$
$$= \mu\cdot Im_2\cdot\Big[Im_1\cdot\sin\{(\omega_1-\omega_2)\cdot t-\alpha\}+\frac{3}{2}\cdot n\cdot Ic\cdot\sin(\alpha+\gamma)\Big]$$

Equation (12) has a form wherein the first term which is a torque fluctuation amount due to the effect of the magnetic field of the inner magnets is added to the second term which is a constant torque.

(1-4) When the outer rotating magnetic fields and inner rotating magnetic fields are applied together The above Ica(t), Icb(t), Icc(t) are set to pass a current through the coils 6 in synchronism with the outer magnets and inner magnets.

$$Ica(t) = Ic \cdot \cos(\omega_1 \cdot t - \beta) + Ic_2 \cdot \cos(\omega_2 \cdot t - \gamma) \quad (13A)$$

$$Icb(t) = Ic \cdot \cos\left(\omega_1 \cdot t - \beta - \frac{2\pi}{3}\right) + Ic_2 \cdot \cos\left(\omega_2 \cdot t - \gamma - \frac{2\pi}{3}\right) \quad (13B)$$

$$Icc(t) = Ic \cdot \cos\left(\omega_1 \cdot t - \beta - \frac{4\pi}{3}\right) + Ic_2 \cdot \cos\left(\omega_2 \cdot t - \gamma - \frac{4\pi}{3}\right) \quad (13C)$$

The drive forces $f_1$, $f_2$ are calculated by the following equations (14), (15).

$$\begin{aligned}
f_1 &= Im_1 \cdot \Big[\mu \cdot Im_2 \cdot \sin(\omega_2 \cdot t + \alpha - \omega_1 \cdot t) + \mu \cdot n \cdot \\
&\quad \Big[\{Ic \cdot \cos(\omega_1 \cdot t - \beta) + Ic_2 \cdot \cos(\omega_2 \cdot t - \gamma)\} \cdot \sin(\omega_1 \cdot t) + \\
&\quad \left\{Ic \cdot \cos\left(\omega_1 \cdot t - \beta - \frac{2\pi}{3}\right) + Ic_2 \cdot \cos\left(\omega_2 \cdot t - \gamma - \frac{2\pi}{3}\right)\right\} \cdot \\
&\quad \sin\left(\omega_1 \cdot t - \frac{2\pi}{3}\right) + \left\{Ic \cdot \cos\left(\omega_1 \cdot t - \beta - \frac{4\pi}{3}\right) + \right. \\
&\quad \left. Ic_2 \cdot \cos\left(\omega_2 \cdot t - \gamma - \frac{4\pi}{3}\right)\right\} \cdot \sin\left(\omega_1 \cdot t - \frac{4\pi}{3}\right)\Big]\Big] \\
&= Im_1 \cdot \Big[\mu \cdot Im_2 \cdot \sin(\omega_2 \cdot t + \alpha - \omega_1 \cdot t) + \mu \cdot n \cdot \\
&\quad \left\{Ic \cdot \cos(\omega_1 \cdot t - \beta) \cdot \sin(\omega_1 \cdot t) + Ic_2 \cdot \cos(\omega_2 \cdot t - \gamma) \cdot \right. \\
&\quad \sin(\omega_1 \cdot t) + Ic \cdot \cos\left(\omega_1 \cdot t - \beta - \frac{2\pi}{3}\right) \cdot \sin\left(\omega_1 \cdot t - \frac{2\pi}{3}\right) + \\
&\quad Ic_2 \cdot \cos\left(\omega_2 \cdot t - \gamma - \frac{2\pi}{3}\right) \cdot \sin\left(\omega_1 \cdot t - \frac{2\pi}{3}\right) + \\
&\quad Ic \cdot \cos\left(\omega_1 \cdot t - \beta - \frac{4\pi}{3}\right) \cdot \sin\left(\omega_1 \cdot t - \frac{4\pi}{3}\right) + \\
&\quad \left. Ic_2 \cdot \cos\left(\omega_2 \cdot t - \gamma - \frac{4\pi}{3}\right) \cdot \sin\left(\omega_1 \cdot t - \frac{4\pi}{3}\right)\right\}\Big] \\
&= Im_1 \cdot \Big[\mu \cdot Im_2 \cdot \sin(\omega_2 \cdot t + \alpha - \omega_1 \cdot t) + \mu \cdot n \cdot \\
&\quad \Big[Ic \cdot \left\{\cos(\omega_1 \cdot t - \beta) \cdot \sin(\omega_1 \cdot t) + \cos\left(\omega_1 \cdot t - \beta - \frac{2\pi}{3}\right) \cdot \right. \\
&\quad \sin\left(\omega_1 \cdot t - \frac{2\pi}{3}\right) + \cos\left(\omega_1 \cdot t - \beta - \frac{4\pi}{3}\right) \cdot \\
&\quad \left. \sin\left(\omega_1 \cdot t - \frac{4\pi}{3}\right)\right\} + Ic_2 \cdot \left\{\cos(\omega_2 \cdot t - \gamma) \cdot \sin(\omega_1 \cdot t) + \right. \\
&\quad \cos\left(\omega_2 \cdot t - \gamma - \frac{2\pi}{3}\right) \cdot \sin\left(\omega_1 \cdot t - \frac{2\pi}{3}\right) + \\
&\quad \left. \cos\left(\omega_2 \cdot t - \gamma - \frac{4\pi}{3}\right) \cdot \sin\left(\omega_1 \cdot t - \frac{4\pi}{3}\right)\right\}\Big]\Big] \\
&= Im_1 \cdot \Big[\mu \cdot Im_2 \cdot \sin(\omega_2 \cdot t + \alpha - \omega_1 \cdot t) + \mu \cdot n \cdot \\
&\quad \left[Ic \cdot \left(\frac{3}{2} \cdot \sin\beta\right) + Ic_2 \cdot \left[\frac{3}{2} \cdot \sin\{(\omega_1 - \omega_2)t + \gamma\}\right]\right]\Big]
\end{aligned}$$
(14)

Equation (14) has a form wherein a torque fluctuation is added to a constant torque according to a rotation phase difference β relative to the outer magnets $m_1$.

$$\begin{aligned}
f_2 &= Im_2 \cdot \Big[\mu \cdot Im_1 \cdot \sin(\omega_1 \cdot t - \omega_2 \cdot t - \alpha) + \mu \cdot n \cdot \\
&\quad \Big[\{Ic \cdot \cos(\omega_1 \cdot t - \beta) + Ic_2 \cdot \cos(\omega_2 \cdot t - \gamma)\} \cdot \sin(\omega_2 \cdot t + \alpha) + \\
&\quad \left\{Ic \cdot \cos\left(\omega_1 \cdot t - \beta - \frac{2\pi}{3}\right) + Ic_2 \cdot \cos\left(\omega_2 \cdot t - \gamma - \frac{2\pi}{3}\right)\right\} \cdot \\
&\quad \sin\left(\omega_2 \cdot t + \alpha - \frac{2\pi}{3}\right) + \left\{Ic \cdot \cos\left(\omega_1 \cdot t - \beta - \frac{4\pi}{3}\right) + \right. \\
&\quad \left. Ic_2 \cdot \cos\left(\omega_2 \cdot t - \gamma - \frac{4\pi}{3}\right)\right\} \cdot \sin\left(\omega_2 \cdot t + \alpha - \frac{4\pi}{3}\right)\Big]\Big] \\
&= Im_2 \cdot \Big[\mu \cdot Im_1 \cdot \sin(\omega_1 \cdot t - \omega_2 \cdot t - \alpha) + \mu \cdot n \cdot \\
&\quad \left\{Ic \cdot \cos(\omega_1 \cdot t - \beta) \cdot \sin(\omega_2 \cdot t + \alpha) + Ic_2 \cdot \cos(\omega_2 \cdot t - \gamma) \cdot \right. \\
&\quad \sin(\omega_2 \cdot t + \alpha) + Ic \cdot \cos\left(\omega_1 \cdot t - \beta - \frac{2\pi}{3}\right) \cdot \sin\left(\omega_2 \cdot t + \alpha - \frac{2\pi}{3}\right) + \\
&\quad Ic_2 \cdot \cos\left(\omega_2 \cdot t - \gamma - \frac{2\pi}{3}\right) \cdot \sin\left(\omega_2 \cdot t + \alpha - \frac{2\pi}{3}\right) + \\
&\quad Ic \cdot \cos\left(\omega_1 \cdot t - \beta - \frac{4\pi}{3}\right) \cdot \sin\left(\omega_2 \cdot t + \alpha - \frac{4\pi}{3}\right) + \\
&\quad \left. Ic_2 \cdot \cos\left(\omega_2 \cdot t - \gamma - \frac{4\pi}{3}\right) \cdot \sin\left(\omega_2 \cdot t + \alpha - \frac{4\pi}{3}\right)\right\}\Big] \\
&= Im_2 \cdot \Big[\mu \cdot Im_1 \cdot \sin(\omega_1 \cdot t - \omega_2 \cdot t - \alpha) + \mu \cdot n \cdot \\
&\quad \Big[Ic \cdot \left\{\cos(\omega_1 \cdot t - \beta) \cdot \sin(\omega_2 \cdot t + \alpha) + \cos\left(\omega_1 \cdot t - \beta - \frac{2\pi}{3}\right) \cdot \right. \\
&\quad \sin\left(\omega_2 \cdot t + \alpha - \frac{2\pi}{3}\right) + \cos\left(\omega_1 \cdot t - \beta - \frac{4\pi}{3}\right) \cdot \\
&\quad \left. \sin\left(\omega_2 \cdot t + \alpha - \frac{4\pi}{3}\right)\right\} + Ic_2 \cdot \left\{\cos(\omega_2 \cdot t - \gamma) \cdot \sin(\omega_2 \cdot t + \alpha) + \right. \\
&\quad \cos\left(\omega_2 \cdot t - \gamma - \frac{2\pi}{3}\right) \cdot \sin\left(\omega_2 \cdot t + \alpha - \frac{2\pi}{3}\right) + \\
&\quad \left. \cos\left(\omega_2 \cdot t - \gamma - \frac{4\pi}{3}\right) \cdot \sin\left(\omega_2 \cdot t + \alpha - \frac{4\pi}{3}\right)\right\}\Big]\Big]
\end{aligned}$$

Here, the above equation may be rewritten using the formula $$\cos(a)\cdot\sin(b) = \tfrac{1}{2}\cdot\{\sin(a+b) - \sin(a-b)\}$$

$$\begin{aligned}
f_2 &= Im_2 \cdot \Big[\mu \cdot Im_1 \cdot \sin(\omega_1 \cdot t - \omega_2 \cdot t - \alpha) + \mu \cdot n \cdot \\
&\quad \Big[Ic \cdot \Big[\tfrac{1}{2} \cdot \{\sin(\omega_1 \cdot t - \beta + \omega_2 \cdot t + \alpha) - \\
&\quad \sin(\omega_1 \cdot t - \beta - \omega_2 \cdot t - \alpha)\} + \tfrac{1}{2} \cdot \\
&\quad \left\{\sin\left(\omega_1 \cdot t - \beta - \frac{2\pi}{3} + \omega_2 \cdot t + \alpha - \frac{2\pi}{3}\right) - \right. \\
&\quad \left. \sin\left(\omega_1 \cdot t - \beta - \frac{2\pi}{3} - \omega_2 \cdot t - \alpha + \frac{2\pi}{3}\right)\right\} + \tfrac{1}{2} \cdot \\
&\quad \left\{\sin\left(\omega_1 \cdot t - \beta - \frac{4\pi}{3} + \omega_2 \cdot t + \alpha - \frac{4\pi}{3}\right) - \right. \\
&\quad \left. \sin\left(\omega_1 \cdot t - \beta - \frac{4\pi}{3} - \omega_2 \cdot t - \alpha + \frac{4\pi}{3}\right)\right\}\Big] + Ic_2 \cdot \Big[\tfrac{1}{2} \cdot \\
&\quad \{\sin(\omega_2 \cdot t - \gamma + \omega_2 \cdot t + \alpha) - \sin(\omega_2 \cdot t - \gamma - \omega_2 \cdot t - \alpha)\} + \\
&\quad \tfrac{1}{2} \cdot \left\{\sin\left(\omega_2 \cdot t - \gamma - \frac{2\pi}{3} + \omega_2 \cdot t + \alpha - \frac{2\pi}{3}\right) - \right.
\end{aligned}$$
(15)

-continued $$\sin\left(\omega_2 \cdot t - \gamma - \frac{2\pi}{3} - \omega_2 \cdot t - \alpha + \frac{2\pi}{3}\right)\} + \frac{1}{2} \cdot$$

$$\left\{\sin\left(\omega_2 \cdot t - \gamma - \frac{4\pi}{3} + \omega_2 \cdot t + \alpha - \frac{4\pi}{3}\right) - \sin\left(\omega_2 \cdot t - \gamma - \frac{4\pi}{3} - \omega_2 \cdot t - \alpha + \frac{4\pi}{3}\right)\}\right]\right]$$

$$= Im_2 \cdot \left[\mu \cdot Im_1 \cdot \sin(\omega_1 \cdot t - \omega_2 \cdot t - \alpha) + \mu \cdot n \cdot \right.$$

$$\left[Ic \cdot \left\{\frac{1}{2} \cdot \left\{\sin(\omega_1 \cdot t - \beta + \omega_2 \cdot t + \alpha) - \sin(\omega_1 \cdot t - \beta - \omega_2 \cdot t - \alpha)\right\} + \frac{1}{2} \cdot\right.\right.$$

$$\left\{\sin\left(\omega_1 \cdot t - \beta + \omega_2 \cdot t + \alpha - \frac{4\pi}{3}\right) - \sin(\omega_1 \cdot t - \beta - \omega_2 \cdot t - \alpha)\right\} + \frac{1}{2} \cdot$$

$$\left\{\sin\left(\omega_1 \cdot t - \beta + \omega_2 \cdot t + \alpha - \frac{8\pi}{3}\right) - \sin(\omega_1 \cdot t - \beta - \omega_2 \cdot t - \alpha)\right\} + Ic_2 \cdot \left[\frac{1}{2} \cdot \right.$$

$$\{\sin(\omega_2 \cdot t - \gamma + \omega_2 \cdot t + \alpha) - \sin(\omega_2 \cdot t - \gamma - \omega_2 \cdot t - \alpha)\} +$$

$$\frac{1}{2} \cdot \left\{\sin\left(\omega_2 \cdot t - \gamma + \omega_2 \cdot t + \alpha - \frac{4\pi}{3}\right) - \sin(\omega_2 \cdot t - \gamma - \omega_2 \cdot t - \alpha)\right\} + \frac{1}{2} \cdot$$

$$\left\{\sin\left(\omega_2 \cdot t - \gamma + \omega_2 \cdot t + \alpha - \frac{8\pi}{3}\right) - \sin(\omega_2 \cdot t - \gamma - \omega_2 \cdot t - \alpha)\right\}\right]\right]$$

$$= Im_2 \cdot \left[\mu \cdot Im_1 \cdot \sin(\omega_1 \cdot t - \omega_2 \cdot t - \alpha) + \frac{1}{2} \cdot \mu \cdot n \cdot Ic \cdot\right.$$

$$\left\{\sin(\omega_1 \cdot t - \beta + \omega_2 \cdot t + \alpha) - \sin(\omega_1 \cdot t - \beta - \omega_2 \cdot t - \alpha) + \right.$$

$$\sin\left(\omega_1 \cdot t - \beta + \omega_2 \cdot t + \alpha - \frac{4\pi}{3}\right) - \sin(\omega_1 \cdot t - \beta + \omega_2 \cdot t + \alpha) +$$

$$\sin\left(\omega_1 \cdot t - \beta + \omega_2 \cdot t + \alpha - \frac{8\pi}{3}\right) - \sin(\omega_1 \cdot t - \beta - \omega_2 \cdot t - \alpha)\right\} + \frac{1}{2} \cdot \mu \cdot n \cdot Ic_2 \cdot$$

$$\left\{\sin(\omega_2 \cdot t - \gamma + \omega_2 \cdot t + \alpha) - \sin(\omega_2 \cdot t - \gamma + \omega_2 \cdot t - \alpha) + \right.$$

$$\sin\left(\omega_2 \cdot t - \gamma + \omega_2 \cdot t + \alpha - \frac{4\pi}{3}\right) - \sin(\omega_2 \cdot t - \gamma - \omega_2 \cdot t - \alpha) +$$

$$\sin\left(\omega_2 \cdot t - \gamma + \omega_2 \cdot t + \alpha - \frac{8\pi}{3}\right) - \sin(\omega_2 \cdot t - \gamma - \omega_2 \cdot t - \alpha)\right\}\right]$$

$$= Im_2 \cdot \left[\mu \cdot Im_1 \cdot \sin(\omega_1 \cdot t - \omega_2 \cdot t - \alpha) + \frac{1}{2} \cdot \mu \cdot n \cdot Ic \cdot\right.$$

$$\left[-3 \cdot \sin\{(\omega_2 - \omega_1)t - \alpha - \beta\} + \frac{1}{2} \cdot \mu \cdot n \cdot Ic_2 \cdot\right.$$

$$\{-3 \cdot \sin(-\alpha - \gamma)\}\right]\right]$$

$$= Im_2 \cdot \left[\mu \cdot Im_1 \cdot \sin(\omega_1 \cdot t - \omega_2 \cdot t - \alpha) - \frac{3}{2} \cdot \mu \cdot n \cdot Ic \cdot\right.$$

$$\sin\{(\omega_2 - \omega_1) \cdot t - \alpha - \beta\} + \frac{3}{2} \cdot \mu \cdot n \cdot Ic_2 \cdot 3 \cdot \sin(\alpha + \gamma)\right]$$

Equation (15) also has a form wherein a torque fluctuation is added to a constant torque rotation phase difference ($\alpha+\gamma$) relative to the inner magnets $m_2$.

(1-5) Summary

The above-mentioned equations (8), (9), (11), (12), (14), (15) may be summarized as follows.

When the outer rotating magnetic fields are applied $$f_1 = -\mu \cdot Im_1 \cdot [Im_2 \cdot \sin\{(\omega_2-\omega_1) \cdot t-\alpha\} - \tfrac{3}{2} \cdot n \cdot Ic \cdot \sin \beta] \quad (8)$$

$$f_2 = \mu \cdot Im_2 \cdot [Im_1 \cdot \sin\{(\omega_1 \omega_2) \cdot t-\alpha\} - \tfrac{3}{2} \cdot n \cdot Ic \cdot \sin\{(\omega_1-\omega_2) \cdot t-\alpha-\beta\}] \quad (9)$$

When the inner rotating magnetic fields are applied $$f_1 = -\mu \cdot Im_1 \cdot [Im_2 \cdot \sin\{(\omega_2-\omega_1) \cdot t \cdot \alpha\} - \tfrac{3}{2} \cdot n \cdot Ic \cdot \sin\{(\omega_1-\omega_2) \cdot t+\gamma\}] \quad (11)$$

$$f_2 = \mu \cdot Im_2 \cdot [Im_1 \cdot \sin\{(\omega_1 \omega_2) \cdot t-\alpha\} + \tfrac{3}{2} \cdot n \cdot Ic \cdot \sin(\alpha+\gamma)] \quad (12)$$

When the outer rotating magnetic fields and inner rotating magnetic fields are applied together $$f_1 = (Im)_1 \cdot [\mu \cdot Im_2 \cdot \sin(\omega_2 \cdot t + \alpha - \omega_1 \cdot t) + \quad (14)$$

$$\mu \cdot n \cdot \left[Ic \cdot \left(\frac{3}{2} \cdot \sin\beta\right) + Ic_2 \cdot \left[\frac{3}{2} \cdot \sin\{(\omega_1 - \omega_2) \cdot t + \gamma\}\right]\right]\right]$$

$$f_2 = \mu \cdot Im_2 \cdot \left[Im_1 \cdot \sin(\omega_1 \cdot t - \omega_2 \cdot t - \alpha) + \frac{3}{2} n \cdot Ic \cdot \quad (15)\right.$$

$$\sin\{(\omega_1 - \omega_w) \cdot t - \alpha - \beta\} +$$

$$\frac{3}{2} \cdot n \cdot Ic_2 \cdot \sin(\alpha + \gamma)\right]$$

The meaning of these equations is as follows.

The second term on the right-hand side of equation (8), the second term on the right-hand side of equation (12), the second term on the right-hand side of equation (14) and the third term on the right-hand side of equation (15) are fixed terms, i.e., constant values, and a rotational torque occurs only when these constant terms are present. Terms other than the constant terms are trigonometric functions, and the average value of a drive force fn which does not comprise a fixed term is zero. In other words, a rotational torque does not occur due to terms other than fixed terms.

Comparing equations (8) and (9), only $f_1$ from equation (8) comprises a constant torque. In other words, when a current is passed through the coils 6 of the stator 2 in synchronism with the rotation of the outer magnets, a rotational torque acts only the outer magnets..

Comparing equations (11) and (12), only $f_2$ from equation (12) comprises a constant torque. In other words, when a current is passed through the coils 6 of the stator 2 in synchronism with the rotation of the inner magnets, a rotational torque acts only the inner magnets.

Comparing equations (14) and (15), $f_1$ from equation (14) and $f_2$ from equation (15) both comprise a constant torque. In other words, when a current synchronized with the rotation of the outer magnets and a current synchronized with the rotation of the inner magnets are passed together through the coils 6, rotational torques corresponding to the respective currents act on the outer and inner magnets.

It is seen from the above facts that, when the magnetic pole number ratio is 1:1, the two rotors 3, 4 can be driven as a generator and a motor simultaneously using only one series of coils 6. Further, it may be surmised that the same operation is possible for any magnetic pole number ratio.

(1-6) Suppression of torque fluctuation

Due to terms other than fixed terms in the equations containing fixed terms, i.e., due to the first term on the right-hand side of equation (8), and the first and third terms on the right-hand side of equation (14), a torque fluctuation appears in the outer magnets rotation due to the phase difference $(\omega_1-\omega_2)$ between the inner magnets and outer magnets.

Also, due to the first term on the right-hand side of equation (12), and the first and second terms on the right-hand side of equation (15), a torque fluctuation appears in the inner magnets rotation due to the phase difference $(\omega_1-\omega_2)$ between the inner magnets and outer magnets.

Now, the suppression of torque fluctuation will be considered when both the outer rotating magnetic fields and an inner rotating magnetic fields are applied.

Equation (14) may be rewritten as follows.

$$f_1 = \mu \cdot Im_1 \cdot Im_2 \cdot \sin(\omega_2 \cdot t + \alpha - \omega_1 \cdot t) + Ic \cdot \mu \cdot n \cdot Im_1 \cdot Ic \cdot (\tfrac{3}{2} \cdot \sin \beta) + Ic_2 \cdot Im_1 \cdot \tfrac{3}{2} \cdot \sin\{(\omega_1 - \omega_2) \cdot t + \gamma\}$$

Here, $f_1$ may be written as follows.

$$f_1 = A + Ic \cdot C + Ic_2 \cdot V \tag{16}$$

where, $$A = \mu \cdot Im_1 \cdot Im_2 \cdot \sin(\omega_2 \cdot t + \alpha - \omega_1 \cdot t),$$

$$V = Im_1 \cdot \tfrac{3}{2} \cdot \sin\{(\omega_1 - \omega_2) \cdot t + \gamma\},$$

and $$C = \mu \cdot n \cdot Im_1 \cdot Ic \cdot (\tfrac{3}{2} \cdot \sin \beta).$$

Here, if a modulation of $$Ic = \frac{C_1 - A - Ic_2 \cdot V}{C}$$

is added, $f_1=C_1$(constant) and the torque fluctuation is eliminated from the rotation of the outer magnets.

Similarly, equation (15) may be rewritten as follows.

$$f_2 = \mu \cdot Im_2 \cdot Im_1 \cdot \sin(\omega_1 \cdot t - \omega_2 \cdot t - \alpha) + Ic \cdot \tfrac{3}{2} \mu \cdot Im_2 \cdot n \cdot \sin\{(\omega_1 - \omega_2) \cdot t - \alpha - \beta\} + Ic_2 \cdot \tfrac{3}{2} \mu \cdot Im_2 \cdot n \cdot \sin(\alpha + \gamma)$$

Here, $f_2$ may be written as follows.

$$f_2 = -A + Ic \cdot D + Ic_2 \cdot E \tag{17}$$

where, $$D = \tfrac{3}{2} \mu \cdot Im_2 \cdot n \cdot \sin\{(\omega_1 - \omega_2) \cdot t - \alpha - \beta\},$$

and $$F = \tfrac{3}{2} \mu \cdot Im_2 \cdot n \cdot \sin(\alpha + \gamma).$$

Here, if a modulation of $$Ic_2 = \frac{C_2 - A - Ic \cdot D}{E}$$

is added, $f_2=C_2$ (constant) and the torque fluctuation is eliminated from the rotation of the inner magnets.

Therefore to give both permanent magnets a constant rotation, the following two simultaneous second order equations regarding Ic and $Ic_2$ should be solved.

$$C_1 = A + Ic \cdot C + Ic_2 \cdot V \tag{18}$$

$$C_2 = -A + Ic \cdot D + Ic_2 \cdot E \tag{19}$$

In this way, in the composite current, the torque fluctuation in the rotation of the rotors can be eliminated by adding an amplitude modulation to the alternating current which generates rotating magnetic fields that produce a torque fluctuation.

(2) N(2(2p)-2p) Type (2-1) When the magnetic pole number ratio is 2:1

Figure 7:
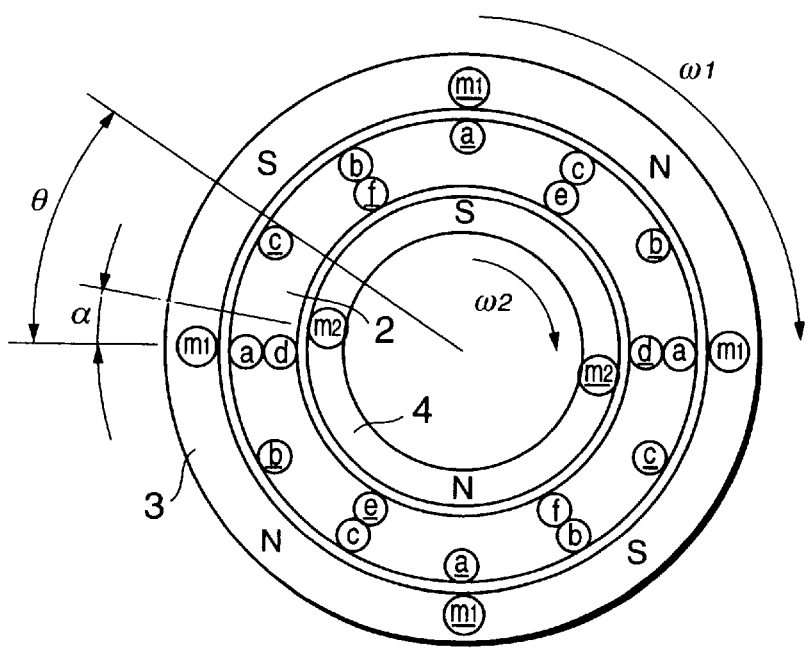
FIG. 7 is a schematic cross-sectional view of a motor/generator having a magnetic pole number ratio of 2:1 wherein a stator has coils on its inner and outer circumference, conceived for the purpose of describing composite current flow.

Taking the motor/generator of FIG. 7 as an example, when the magnetic pole number of the outer magnets is 4 and the magnetic pole number of the inner magnets is 2, the magnetic pole number ratio is 2:1. In this construction, if the permanent magnets are magnetically replaced by an equivalent coil, a magnetic flux density $B_1$ generated by the outer magnets is expressed by the following equation (21).

$$B_1 = Bm_2 \cdot \sin(2\omega_1 \cdot t - 2\theta) = \mu \cdot Im_1 \cdot \sin(2\omega_1 \cdot t - 2\theta) \tag{21}$$

The magnetic flux density $B_2$ generated in the inner magnets is expressed by equation (22) which is equivalent to the equation (2).

$$B_2 = Bm_2 \cdot \sin(\omega_2 \cdot t + \alpha - \theta) = \mu \cdot Im_2 \cdot \sin(\omega_2 \cdot t + \alpha - \theta) \tag{22}$$

It may be considered that the coils are arranged as shown in FIG. 10 so as to calculate the magnetic field produced by the coils 6 of the stator 2 separately for the outer rotating magnetic fields which rotate the outer rotor 3 and the inner rotating magnetic fields which rotate the inner rotor 4.

Magnetic flux densities $Bc_1$, $Bc_2$ of the outer coils and inner coils are expressed by the following equations (23), (24).

$$Bc_1 = \mu \cdot n \cdot \left\{ Ica(t) \cdot \sin 2\theta + Icb(t) \cdot \sin\left(2\theta - \frac{2\pi}{e}\right) + Icc(t) \cdot \sin\left(2\theta - \frac{4\pi}{3}\right) \right\} \tag{23}$$

$$Bc_2 = \mu \cdot n \cdot \left\{ Icd(t) \cdot \sin\theta + Ice(t) \cdot \sin\left(\theta - \frac{2\pi}{e}\right) + Icf(t) \cdot \sin\left(\theta - \frac{4\pi}{3}\right) \right\} \tag{24}$$

where, Icd(t), Ice(t), Icf(t) are also currents which are different in phase by 120 degrees as in the case of Ica(t), Icb(t), Icc(t).

Next, the change of magnetic flux density $B_1$, $B_2$, $Bc_1$, $Bc_2$ mentioned above will be described referring to FIGS. 8A–8D.

The magnetic flux density B at an angle $\theta$ is the sum of the aforesaid four magnetic flux densities.

$$B = B_1 + B_2 + Bc_1 + Bc_2 \quad (25)$$

$$= \mu \cdot Im_1 \cdot \sin(2\omega_1 \cdot t - 2\theta) + \mu \cdot Im_2 \cdot$$

$$\sin(\omega_2 \cdot t + \alpha - \theta) + \mu \cdot n \cdot$$

$$\left\{ Ica(t) \cdot \sin 2\theta + Icb(t) \cdot \sin\left(2\theta - \frac{2\pi}{3}\right) + \right.$$

$$\left. Icc(t) \cdot \sin\left(2\theta - \frac{4\pi}{3}\right) \right\} + \mu \cdot n \cdot$$

$$\left\{ Icd(t) \cdot \sin\theta + Ice(t) \cdot \sin\left(\theta - \frac{2\pi}{3}\right) + \right.$$

$$\left. Icf(t) \cdot \sin\left(\theta - \frac{4\pi}{3}\right) \right\}$$

Here, if the total torque acting on the outer rotor 3 is $\tau_1$, the following equation holds.

$$\tau_1 = f_1 \cdot r_1$$

where, $r_1$=distance to outer magnets from center axis of outer rotor.

In the construction of FIG. 7, the torques exerted on each of the outer magnets $m_1$ are not symmetrical. Therefore the force $f_1$ is considered to be a total force acting on each of four equivalent direct currents that correspond to the outer magnets $m_1$. This relation is expressed by the following equation.

$$f_1 = Im_1 \cdot B_{10} + Im_1 \cdot B_{20} - Im_1 \cdot B_{30} - Im_1 \cdot B_{40}$$

where, $B_{10}$ is magnetic flux density B at $\theta = \omega_1 \cdot t$,
$B_{20}$ is magnetic flux density B at $\theta = \omega_1 \cdot t + \pi$,
$B_{30}$ is | magnetic flux density B at in $\theta = \omega_1 \cdot t + \pi/2$, and
$B_{40}$ is magnetic flux density B at $\theta = \omega_1 \cdot t + 3\pi/2$.

Therefore, the above equation can be rewritten as follows.

$$f_1 = \mu \cdot Im_1 \cdot [Im_1 \cdot \sin(2\omega_1 \cdot t - 2\omega_1 \cdot t) + Im_1 \cdot \quad (26)$$

$$\sin(2\omega_1 \cdot t - 2\omega_1 \cdot t - 2\pi) - Im_1 \cdot$$

$$\sin(2\omega_1 \cdot t - 2\omega_1 \cdot t - \pi) - Im_1 \cdot$$

$$\sin(2\omega_1 \cdot t - 2\omega_1 \cdot t + 3\pi) + Im_2 \cdot$$

$$\sin(\omega_2 \cdot t + \alpha - \omega_1 \cdot t) + Im_2 \cdot$$

$$\sin(\omega_2 \cdot t + \alpha - \omega_1 \cdot t + \pi) - Im_2 \cdot$$

$$\sin\left(\omega_2 \cdot t + \alpha - \omega_1 \cdot t + \frac{\pi}{2}\right) - Im_2 \cdot$$

$$\sin\left(\omega_2 \cdot t + \alpha - \omega_1 \cdot t + \frac{\pi}{2}\right) + n \cdot$$

$$\left\{ Ica(t) \cdot \sin(2\omega_1 \cdot t) + Icb(t) \cdot \sin\left(2\omega_1 \cdot t - \frac{2\pi}{3}\right) + \right.$$

$$\left. Icc(t) \cdot \sin\left(2\omega_1 \cdot t - \frac{4\pi}{3}\right) \right\} + n \cdot \{Ica(t) \cdot$$

$$\sin(2\omega_1 \cdot t + 2\pi) + Icb(t) \cdot \sin(2\omega_1 \cdot t +$$

$$2\pi - \frac{2\pi}{3}) + Icc(t) \cdot \sin\left(2\omega_1 \cdot t + 2\pi - \frac{4\pi}{3}\right) \} -$$

$$n \cdot \left\{ Ica(t) \cdot \sin(2\omega_1 \cdot t + \pi) + Icb(t) \cdot \sin\left(2\omega_1 \cdot t + \frac{\pi}{3}\right) + \right.$$

$$\left. Icc(t) \cdot \sin\left(2\omega_1 \cdot t - \frac{\pi}{3}\right) \right\} + n \cdot$$

$$\left\{ Icd(t) \cdot \sin(\omega_1 \cdot t) + Ice(t) \cdot \sin\left(\omega_1 \cdot t - \frac{2\pi}{3}\right) + \right.$$

$$\left. Icf(t) \cdot \sin\left(\omega_1 \cdot t - \frac{4\pi}{3}\right) \right\} + n \cdot \{Icd(t) \cdot$$

$$\sin(\omega_1 \cdot t + \pi) + Ice(t) \cdot \sin\left(\omega_1 \cdot t + \pi - \frac{2\pi}{3}\right) +$$

$$Icf(t) \cdot \sin\left(\omega_1 \cdot t + \pi - \frac{4\pi}{3}\right) \} - n \cdot$$

$$\left\{ Icd(t) \cdot \sin\left(\omega_1 \cdot t + \frac{\pi}{2}\right) + Ice(t) \cdot \sin\left(\omega_1 \cdot t + \frac{\pi}{2} - \frac{2\pi}{3}\right) + \right.$$

$$\left. Icf(t) \cdot \sin\left(\omega_1 \cdot t + \frac{\pi}{2} - \frac{4\pi}{3}\right) \right\} - n \cdot$$

$$\left\{ Icd(t) \cdot \sin\left(\omega_1 \cdot t + \frac{3\pi}{2}\right) + Ice(t) \cdot \right.$$

$$\sin\left(\omega_1 \cdot t + \frac{3\pi}{2} - \frac{2\pi}{3}\right) +$$

$$\left. Icf(t) \cdot \sin\left(\omega_1 \cdot t + \frac{3\pi}{2} - \frac{4\pi}{3}\right) \right\} \bigg]$$

$$= 4 \cdot \mu \cdot Im_1 \cdot n \cdot \{Ica(t) \cdot \sin(2\omega_1 \cdot t) +$$

$$Icb(t) \cdot \sin\left(2\omega_1 \cdot t - \frac{2\pi}{3}\right) + Icc(t) \cdot \sin\left(2\omega_1 \cdot t - \frac{4\pi}{3}\right) \}$$

Equation (26) shows that the torque acting on the outer magnets $m_1$ due to the exciting currents of the coils a, b, c can be controlled, and that It is not affected by the exciting currents of the coils d, e, f.

Next, if the torque acting on the inner rotor 4 is $\tau_2$, the following equation holds.

$$\tau_2 = f_2 \cdot r_2$$

where, $r_2$=distance to inner magnets $m_2$ from center shaft of an inner rotor.

The torques acting on the inner magnets $m_2$ of the inner rotor 4 are not symmetrical. Therefore, the force $f_2$ is considered to be a total force acting on each of two equivalent direct currents that correspond to the inner magnets. This relation is expressed by the following equation.

$$f_2 = Im_2 \cdot B_{100} - Im_2 \cdot B_{200}$$

where, $B_{100}$ is magnetic flux density B when $\theta = \omega_2 \cdot t + \alpha$, and
$B_{200}$ is magnetic flux density B when $\theta = \omega_2 \cdot t + \pi + \alpha$.

Therefore, the above equation may be rewritten as follows.

$$f_2 = \mu \cdot Im_2 \cdot [Im_1 \cdot \sin(2\omega_1 \cdot t - 2\omega_2 \cdot t - 2\alpha) - \quad (27)$$

$$Im_1 \cdot \sin(2\omega_1 \cdot t - 2\omega_2 \cdot t - 2\alpha - 2\pi) + Im_2 \cdot$$

$$\sin(2\omega_2 \cdot t + 2\alpha - 2\omega_2 \cdot t - 2\alpha) - Im_2 \cdot$$

$$\sin(2\omega_2 \cdot t + 2\alpha - 2\omega_2 \cdot t - 2\alpha - 2\pi) + n \cdot$$

$$\{Ica(t) \cdot \sin(2\omega_2 \cdot t + 2\alpha) + Icb(t) \cdot$$

$$\sin\left(2\omega_2 \cdot t + 2\alpha - \frac{2\pi}{3}\right) + Icc(t) \cdot$$

$$\sin\left(2\omega_2 \cdot t + 2\alpha - \frac{4\pi}{3}\right)\} - n \cdot$$

$$\{Ica(t) \cdot \sin(2\omega_2 \cdot t + 2\pi + 2\alpha) + Icb(t) \cdot$$

$$\sin\left(2\omega_2 \cdot t + 2\pi + 2\alpha - \frac{2\pi}{3}\right) + Icc(t) \cdot$$

-continued $$\sin\left(2\omega_2 \cdot t + 2\pi + 2\alpha - \frac{4\pi}{3}\right)\right\} + n \cdot$$

$$\{Icd(t) \cdot \sin(\omega_2 \cdot t + \alpha) + Ice(t) \cdot$$

$$\sin\left(\omega_2 \cdot t + \alpha - \frac{2\pi}{3}\right) + Icf(t) \cdot$$

$$\sin\left(\omega_2 \cdot t + \alpha - \frac{4\pi}{3}\right)\right\} -$$

$$n\{Icd(t) \cdot \sin(\omega_2 \cdot t + \pi + \alpha) + Ice(t) \cdot$$

$$\sin\left(\omega_2 \cdot t + \pi + \alpha - \frac{2\pi}{3}\right) + Icf(t) \cdot$$

$$\sin\left(\omega_2 \cdot t + \pi + \alpha - \frac{4\pi}{3}\right)\right\}\Big]$$

$$= 2\mu \cdot Im_2 \cdot n \cdot \{Icd(t) \cdot \sin(\omega_2 \cdot t + \alpha) +$$

$$Ice(t) \cdot \sin\left(\omega_2 \cdot t + \alpha - \frac{2\pi}{3}\right) +$$

$$Icf(t) \cdot \sin\left(\omega_2 \cdot t + \alpha - \frac{4\pi}{3}\right)\}$$

According to the equation (27), the torque acting on the inner magnets $m_2$ due to the excitation currents of the coils d, e, f can be controlled, and the torque acting on the inner magnets $m_2$ is not affected by the excitation currents of the coils a, b, c.

(2-2) When the outer rotating magnetic fields are applied

Currents with a phase difference of $\beta$ with respect to the rotation position of the outer magnets $m_1$ are passed through the coils a, b, c. In order to generate the above currents, the alternating currents Ica(t), Icb(t), Icc(t) mentioned above may be defined by the following equations.

$$Ica(t) = Ic \cdot \cos(2\omega_1 \cdot t - 2\beta) \qquad (28A)$$

$$Icb(t) = Ic \cdot \cos\left(2\omega_1 \cdot t - 2\beta - \frac{2\pi}{3}\right) \qquad (28B)$$

$$cc(t) = Ic \cdot \cos\left(2\omega_1 \cdot t - 2\beta - \frac{4\pi}{3}\right) \qquad (28C)$$

Next, (28A)–(28C) are substituted in equations (26) (27) to calculate $f_1$.

$$f_1 = 4\mu \cdot Im_1 \cdot n \cdot Ic \cdot \left\{\cos(2\omega_1 \cdot t - 2\beta) \cdot \sin(2\omega_1 \cdot t) + \right.$$

$$\cos\left(2\omega_1 \cdot t - 2\beta - \frac{2\pi}{3}\right) \cdot \sin\left(2\omega_1 \cdot t - \frac{2\pi}{3}\right) +$$

$$\cos\left(2\omega_1 \cdot t - 2\beta - \frac{4\pi}{3}\right) \cdot \sin\left(2\omega_1 \cdot t - \frac{4\pi}{3}\right)\right\}$$

Here, the above equation may be rewritten as the following equation (29) using the formula $\cos(a)\cdot\sin(b)=\frac{1}{2}\{\sin(a+b)-\sin(a-b)\}$.

$$f_1 = 4\mu \cdot Im_1 \cdot n \cdot Ic \cdot \left[\frac{1}{2} \cdot \{\sin(2\omega_1 \cdot t - 2\beta + 2\omega_1 \cdot t) - \right. \qquad (29)$$

$$\sin(2\omega_1 \cdot t - 2\beta - 2\omega_1 \cdot t)\} + \frac{1}{2} \cdot \left\{\sin\left(2\omega_1 \cdot t - 2\beta - \frac{2\pi}{3} + \right.\right.$$

$$\left.2\omega_1 \cdot t - \frac{2\pi}{3}\right) - \sin\left(2\omega_1 \cdot t - 2\beta - \frac{2\pi}{3} - 2\omega_1 \cdot t + \frac{2\pi}{3}\right)\right\} +$$

$$\frac{1}{2} \cdot \left\{\sin\left(2\omega_1 \cdot t - 2\beta - \frac{4\pi}{3} + 2\omega_1 \cdot t + \frac{4\pi}{3}\right) - \right.$$

$$\sin\left(2\omega_1 \cdot t - 2\beta - \frac{4\pi}{3} - 2\omega_1 \cdot t + \frac{4\pi}{3}\right)\right\}\Big]$$

$$= 2\mu \cdot Im_1 \cdot n \cdot Ic \cdot \left\{\sin(4\omega_1 \cdot t - 2\beta) + \sin 2\beta + \sin\left(4\omega_1 \cdot t - \right.\right.$$

$$\left.2\beta - \frac{4\pi}{3}\right) + \sin 2\beta + \sin\left(4\omega_1 \cdot t - 2\beta - \frac{8\pi}{3}\right) + \sin 2\beta\right\}$$

$$= 2\mu \cdot Im_1 \cdot n \cdot Ic \cdot \left\{\sin(4\omega_1 \cdot t - 2\beta) + \sin\left(4\omega_1 \cdot t - 2\beta - \frac{4\pi}{3}\right) + \right.$$

$$\left.\sin\left(4\omega_1 \cdot t - 2\beta - \frac{4\pi}{3}\right) + 3\sin 2\beta\right\}$$

$$= 6\mu \cdot Im_1 \cdot n \cdot Ic \cdot \sin 2\beta$$

Equation (29) shows that the torque acting on the outer magnet $m_1$ varies according to the phase difference $\beta$. Therefore, the rotation position of the outer magnets $m_1$ should be measured and excitation currents shifted in phase by $\beta$ should be applied to the coils a, b, c.

(2-3) When the inner rotating magnetic fields are applied

Currents with a phase difference of $\gamma$ with respect to the rotation position of the inner magnets $m_2$ are passed through the coils d, e, f In order to generate the above currents, the alternating currents Icd(t), Ice(t), Icf(t) mentioned above may be defined by the following equations.

$$Icd(t) = Ic \cdot \cos(\omega_2 \cdot t - \gamma) \qquad (30A)$$

$$Ice(t) = Ic \cdot \cos\left(\omega_2 \cdot t - \gamma - \frac{2\pi}{3}\right) \qquad (30B)$$

$$Icf(t) = Ic \cdot \cos\left(\omega_2 \cdot t - \gamma - 4\frac{\pi}{3}\right) \qquad (30C)$$

Next, (30A)–(30C) are substituted in equations (27) to calculate $f_2$.

$$f_2 = 2\mu \cdot Im_2 \cdot n \cdot \left\{Ic \cdot \cos(\omega_2 \cdot t - \gamma) \cdot \sin(\omega_2 \cdot t + \alpha) + \right.$$

$$Ic \cdot \cos\left(\omega_2 \cdot t - \gamma - \frac{2\pi}{3}\right) \cdot \sin\left(\omega_2 \cdot t + \alpha - \frac{2\pi}{3}\right) +$$

$$Ic \cdot \cos\left(\omega_2 \cdot t - \gamma - \frac{4\pi}{3}\right) \cdot \sin\left(\omega_2 \cdot t + \alpha - \frac{4\pi}{3}\right)\right\}$$

Here, the above equation may be rewritten using the formula $$\cos(a)\cdot\sin(b)=\frac{1}{2}\cdot\{\sin(a+b)-(a-b)\}$$

$$f_2 = 2\mu \cdot Im_2 \cdot n \cdot Ic \cdot \left[\frac{1}{2} \cdot \{\sin(\omega_2 \cdot t - \gamma + \omega_2 \cdot t + \alpha) - \right. \qquad (31)$$

$$\sin(\omega_2 \cdot t - \gamma - \omega_2 \cdot t - \alpha)\}\right) + \frac{1}{2} \cdot \left\{\sin\left(\omega_2 \cdot t - \gamma - \frac{2\pi}{3} + \right.\right.$$

$$\left.\omega_2 \cdot t + \alpha - \frac{2\pi}{3}\right) - \sin\left(\omega_2 \cdot t - \gamma - \frac{2\pi}{3} - \omega_2 \cdot t - \alpha + \frac{2\pi}{3}\right)\right\} +$$

$$\frac{1}{2} \cdot \left\{\sin\left(\omega_2 \cdot t - \gamma - \frac{4\pi}{3} + \omega_2 \cdot t + \alpha - \frac{4\pi}{3}\right) - \right.$$

$$\sin\left(\omega_2 \cdot t - \gamma - \frac{4\pi}{3} - \omega_2 \cdot t - \alpha + \frac{4\pi}{3}\right)\right\}\Big]$$

$$= \mu \cdot Im_2 \cdot n \cdot Ic \cdot \left\{\sin(2\omega_2 \cdot t - \gamma + \alpha) + \sin(\gamma + \alpha) + \sin\left(2\omega_2 \cdot t - \right.\right.$$

-continued $$\left.\gamma - \frac{4\pi}{3} + \alpha\right) + \sin(\gamma + \alpha) + \sin\left(2\omega_2 \cdot t - \gamma - \frac{8\pi}{3} + \alpha\right) + \sin(\gamma + \alpha)\right\}$$

$$= \mu \cdot Im_2 \cdot n \cdot Ic \cdot \left\{\sin(2\omega_2 \cdot t - \gamma + \alpha) + \sin\left(2\omega_2 \cdot t - \gamma - \frac{4\pi}{3} + \alpha\right) + \right.$$

$$\left. \sin\left(2\omega_2 \cdot t - \gamma - \frac{8\pi}{3} + \alpha\right) + 3\sin(\gamma + \alpha)\right\}$$

$$= 3\mu \cdot Im_2 \cdot n \cdot Ic \cdot \sin(\gamma + \alpha)$$

Equation (31) shows that the torque acting on the inner magnet $m_2$ varies according to the phase difference $(\gamma+\alpha)$.

Therefore, the rotation position of the inner magnets $m_2$ should be measured and excitation currents shifted in phase by $(\gamma+\alpha)$ should be applied to the coils d, e, f.

(2-4) Summary

Equation (29) shows that when currents are passed through the coils 6 of the stator 2 in synchronism with the outer magnets $m_1$, a rotational torque acts only the outer magnets $m_1$.

Equation (31) shows that when currents are passed through the coils 6 in synchronism with the outer magnets $m_2$, a rotational torque acts only the outer magnets $m_2$.

Although the calculations are not shown, when a current synchronized with the rotation of the outer magnets and a current synchronized with the rotation of the inner magnets are passed together through the coils 6, rotational torques corresponding to the respective currents act on the outer and inner magnets as in the case where the magnetic pole number ratio is 2:1, as described in (1–4).

This fact shows that also in the case where the magnetic pole number ratio is 2:1, the two rotors 3, 4 can be driven as a generator/motor using the coils 6.

In this case, as only constant terms remain, there is no fluctuation of rotation torque of the inner rotor 4 due to the effect of the outer rotor 3 or the rotational magnetic field produced to drive the outer rotor 3, and conversely, there is no fluctuation of rotation torque of the outer rotor 3 due to the effect of the inner rotor 4 or the rotational magnetic field produced to drive the inner rotor 4.

In other words, when the magnetic pole number ratio is 2:1, both rotors can be driven with a constant rotation, without adding an amplitude modulation to eliminate torque fluctuation as when the magnetic pole number ratio is 1:1, or as described later, 3:1.

(2-5) Setting of currents flowing through stator coil

In FIG. 7, a series of coils a, c, b for generating the outer rotating magnetic fields and another series of coils d, f, e for generating the inner rotating magnetic fields are assumed for the purpose of theoretical calculation.

Figure 9:
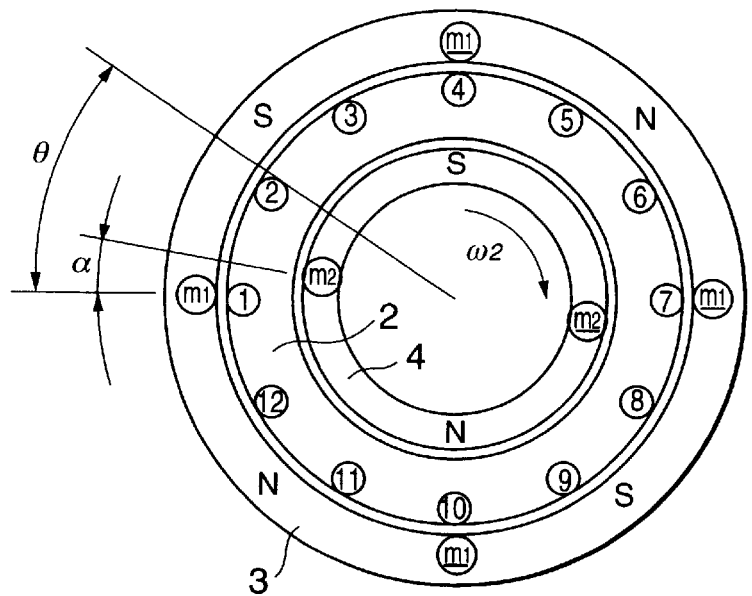
FIG. 9 is similar to FIG. 7, but showing a case where outer and inner coils are integrated.

In the real motor/generator according to this invention, these coils are integrated as shown in FIG. 9. specifically, the coils a and d, b and f, c and e, a and d, b and f, and c and e in FIG. 7 are respectively integrated to coils #1, #3, #5, #7, #9, #11. The composite currents $I_1$–$I_{12}$ passed through the coils #1–#12 in FIG. 9 are therefore set as follows due to their relation to the currents passed through the coils in FIG. 7.

$I_1 = Ia + Id$ $I_2 = Ic$ $I_3 = Ib + If$ $I_4 = Ia$ $I_5 = Ic + Ie$ $I_6 = Ib$ $I_7 = Ia + Id$ $I_8 = Ic$ $I_9 = Ib + If$ $I_{10} = Ia$ $I_{11} = Ic + Ie$ $I_{12} = Ib$

In this case, the load on the coils through which the currents $I_1, I_3, I_5, I_7, I_9, I_{11}$ are passed is greater than that of the remaining coils through which the currents $I_2, I_4, I_6, I_8, I_{10}$ are passed. Therefore, it is considered to spread the load among the remaining coils in order to form the inner rotating magnetic fields.

For example, comparing FIG. 7 and FIG. 9, the coils in FIG. 7 corresponding to #1, #2 in FIG. 9 are the outer coils a, c and the inner coil d. In this case, it is assumed that the position of the coil d is shifted to a position that is equidistant from the coil a and the coil c. These shifted coil is designated as coils d'.

Half of the current Id passed through the coil d' is assigned to each of the coils a and c. Similarly coils d, e', e' and f, f' are assumed and the currents passing through these coils are allocated in a similar manner.

In this way, the following alternative current settings are possible:

$I_1 = Ia + \frac{1}{2} \cdot Id'$ $I_2 = Ic + \frac{1}{2} \cdot Id'$ $I_3 = Ib + \frac{1}{2} \cdot If$ $I_4 = Ia + \frac{1}{2} \cdot If$ $I_5 = Ic + \frac{1}{2} \cdot Ie'$ $I_6 = Ib + \frac{1}{2} \cdot Ie'$ $I_7 = Ia + \frac{1}{2} \cdot Id'$ $I_8 = Ic + \frac{1}{2} \cdot Id'$ $I_9 = Ib + \frac{1}{2} \cdot If$ $I_{10} = Ia + \frac{1}{2} \cdot If$ $I_{11} = Ic + \frac{1}{2} \cdot Ie'$ $I_{12} = Ib + \frac{1}{2} \cdot Ie'$ Alternatively, the following settings are possible.

$I_1 = Ia + Ii$ $I_2 = Ic + Iii$ $I_3 = Ib + Iiii$ $I_4 = Ia + Iiv$ $I_5 = Ic + Iv$ $I_6 = Ib + Ivi$ $I_7 = Ia + Ivii$ $I_8 = Ic + Iviii$ $I_9 = Ib + Iix$ $I_{10} = Ia + Ix$ $I_{11} = Ic + Ixi$ $I_{12} = Ib + Ixii$ The currents Ii–Ixii which are the second terms on the right-hand side of the above equations for setting $I_1$–$I_{12}$, comprise a twelve-phase alternating current as shown in FIG. 10A, 10B. The inner rotating magnetic fields may be formed by this twelve-phase alternating current.

(2-6) When the inner rotating magnetic fields are supplied by twelve-phase alternating current (2-6-1) Magnetic flux density $Bc_2$ The magnetic flux density $Bc_2$ when the inner rotating magnetic fields are supplied by a twelve-phase alternating current is expressed by the following equation (32).

$$Bc_2 = \mu \cdot n \cdot \left\{ Ici(t) \cdot \sin\theta + Icii(t) \cdot \sin\left(\theta - \frac{2\pi}{12}\right) + Iciii(t) \cdot \right. \tag{32}$$

$$\sin\left(\theta - \frac{4\pi}{12}\right) + Iciv(t) \cdot \sin\left(\theta - \frac{6\pi}{12}\right) + Icv(t) \cdot$$

$$\sin\left(\theta - \frac{8\pi}{12}\right) + Icvi(t) \cdot \sin\left(\theta - \frac{10\pi}{12}\right) + Icvii(t) \cdot$$

$$\sin\left(\theta - \frac{12\pi}{12}\right) + Icviii(t) \cdot \sin\left(\theta - \frac{14\pi}{12}\right) + Icix(t) \cdot$$

$$\sin\left(\theta - \frac{16\pi}{12}\right) + Icx(t) \cdot \sin\left(\theta - \frac{18\pi}{12}\right) + Icxi(t) \cdot$$

$$\left. \sin\left(\theta - \frac{20\pi}{12}\right) + Icxii(t) \cdot \sin\left(\theta - \frac{22\pi}{12}\right) \right\}$$

The total magnetic flux density B is expressed by the following equation.

$$B = B_1 + B_2 + Bc_1 + Bc_2 \tag{33}$$

$$= \mu \cdot Im_1 \cdot \sin(2\omega_1 \cdot t - 2\theta) + \mu \cdot Im_2 \cdot$$

$$\sin(\omega_2 \cdot t + \alpha - \theta) + \mu \cdot n \cdot \{Ica(t) \cdot \sin 2\theta +$$

$$Icb(t) \cdot \sin\left(2\theta - \frac{2\pi}{3}\right) + Icc(t) \cdot \sin\left(2\theta - \frac{4\pi}{3}\right)\} +$$

$$\mu \cdot n \cdot \left\{ Ici(t) \cdot \sin\theta + Icii(t) \cdot \sin\left(\theta - \frac{2\pi}{12}\right) + \right.$$

$$Iciii(t) \cdot \sin\left(\theta - \frac{4\pi}{12}\right) + Iciv(t) \cdot \sin\left(\theta - \frac{6\pi}{12}\right) +$$

$$Icv(t) \cdot \sin\left(\theta - \frac{8\pi}{12}\right) + Icvi(t) \cdot \sin\left(\theta - \frac{10\pi}{12}\right) +$$

$$Icvii(t) \cdot \sin\left(\theta - \frac{12\pi}{12}\right) + Icviii(t) \cdot \sin\left(\theta - \frac{14\pi}{12}\right) +$$

$$Icix(t) \cdot \sin\left(\theta - \frac{16\pi}{12}\right) + Icx(t) \cdot \sin\left(\theta - \frac{18\pi}{12}\right) +$$

$$\left. Icxi(t) \cdot \sin\left(\theta - \frac{20\pi}{12}\right) + Icxii(t) \cdot \sin\left(\theta - \frac{22\pi}{12}\right) \right\}$$

$f_1$ is calculated by the following equation.

$$f_1 = Im_1 \cdot B_{10} + Im_1 \cdot B_{20} - Im_1 \cdot B_{30} - Im_1 \cdot B_{40} \tag{60}$$

where, $B_{10}$ is magnetic flux density B at $\theta = \omega_1 \cdot t$,
$B_{20}$ is magnetic flux density B at $\theta = \omega_1 \cdot t + \pi$,
$B_{30}$ is | magnetic flux density B at $\theta = \omega_1 \cdot T + \pi/2$, and
$B_{40}$ is magnetic flux density B at $\theta = \omega_1 \cdot t + 3\pi/2$.

Therefore, the above equation can be rewritten as follows.

$$f_1 = \mu \cdot Im_1 \cdot [Im_1 \cdot \sin(2\omega_1 \cdot t - 2\omega_1 \cdot t) + Im_1 \cdot \tag{34}$$

$$\sin(2\omega_1 \cdot t - 2\omega_1 \cdot t - 2\pi) - Im_1 \cdot$$

$$\sin(2\omega_1 \cdot t - 2\omega_1 \cdot t - \pi) - Im_1 \cdot$$

$$\sin(2\omega_1 \cdot t - 2\omega_1 \cdot t - 3\pi) + Im_2 \cdot$$

$$\sin(\omega_2 \cdot t + \alpha - \omega_1 \cdot t) + Im_2 \cdot$$

$$\sin(\omega_2 \cdot t + \alpha - \omega_1 \cdot t - \pi) - Im_2 \cdot$$

$$\sin\left(\omega_2 \cdot t + \alpha - \omega_1 \cdot t - \frac{\pi}{2}\right) - Im_2 \cdot$$

$$\sin\left(\omega_2 \cdot t + \alpha - \omega_1 \cdot t - \frac{3\pi}{2}\right) + n \cdot$$

$$\left\{ Ica(t) \cdot \sin(2\omega_1 \cdot t) + Icb(t) \cdot \sin\left(2\omega_1 \cdot t - \frac{2\pi}{3}\right) + \right.$$

$$\left. Icc(t) \cdot \sin\left(2\omega_1 \cdot t - \frac{4\pi}{3}\right) \right\} - \sin\left(\omega_1 \cdot t - \frac{6\pi}{12} + \frac{3\pi}{2}\right) \right\} +$$

$$Icv(t) \cdot \left\{ \sin\left(\omega_1 \cdot t - \frac{8\pi}{12}\right) + \sin\left(\omega_1 \cdot t - \frac{8\pi}{12} + \pi\right) - \right.$$

$$\left. \sin\left(\omega_1 \cdot t - \frac{8\pi}{12} + \frac{\pi}{2}\right) - \sin\left(\omega_1 \cdot t - \frac{8\pi}{12} + \frac{3\pi}{2}\right) \right\} +$$

$$Icvi(t) \cdot \left\{ \sin\left(\omega_1 \cdot t - \frac{10\pi}{12}\right) + \sin\left(\omega_1 \cdot t - \frac{10\pi}{12} + \pi\right) - \right.$$

$$\left. \sin\left(\omega_1 \cdot t - \frac{10\pi}{12} + \frac{\pi}{2}\right) - \sin\left(\omega_1 \cdot t - \frac{10\pi}{12} + \frac{3\pi}{2}\right) \right\} +$$

$$Icvii(t) \cdot \left\{ \sin\left(\omega_1 \cdot t - \frac{12\pi}{12}\right) + \sin\left(\omega_1 \cdot t - \frac{12\pi}{12} + \pi\right) - \right.$$

$$\left. \sin\left(\omega_1 \cdot t - \frac{12\pi}{12} + \frac{\pi}{2}\right) - \sin\left(\omega_1 \cdot t - \frac{12\pi}{12} + \frac{3\pi}{2}\right) \right\} +$$

$$Icviii(t) \cdot \left\{ \sin\left(\omega_1 \cdot t - \frac{14\pi}{12}\right) + \sin\left(\omega_1 \cdot t - \frac{14\pi}{12} + \pi\right) - \right.$$

$$\left. \sin\left(\omega_1 \cdot t - \frac{14\pi}{12} + \frac{\pi}{2}\right) - \sin\left(\omega_1 \cdot t - \frac{14\pi}{12} + \frac{3\pi}{2}\right) \right\} +$$

$$Icix(t) \cdot \left\{ \sin\left(\omega_1 \cdot t - \frac{16\pi}{12}\right) + \sin\left(\omega_1 \cdot t - \frac{16\pi}{12} + \pi\right) - \right.$$

$$\left. \sin\left(\omega_1 \cdot t - \frac{16\pi}{12} + \frac{\pi}{2}\right) - \sin\left(\omega_1 \cdot t - \frac{16\pi}{12} + \frac{3\pi}{2}\right) \right\} +$$

$$Icx(t) \cdot \left\{ \sin\left(\omega_1 \cdot t - \frac{18\pi}{12}\right) + \sin\left(\omega_1 \cdot t - \frac{18\pi}{12} + \pi\right) - \right.$$

$$\left. \sin\left(\omega_1 \cdot t - \frac{18\pi}{12} + \frac{\pi}{2}\right) - \sin\left(\omega_1 \cdot t - \frac{18\pi}{12} + \frac{3\pi}{2}\right) \right\} +$$

$$Icxi(t) \cdot \left\{ \sin\left(\omega_1 \cdot t - \frac{20\pi}{12}\right) + \sin\left(\omega_1 \cdot t - \frac{20\pi}{12} + \pi\right) - \right.$$

$$\left. \sin\left(\omega_1 \cdot t - \frac{20\pi}{12} + \frac{\pi}{2}\right) - \sin\left(\omega_1 \cdot t - \frac{20\pi}{12} + \frac{3\pi}{2}\right) \right\} +$$

$$Icxii(t) \cdot \left\{ \sin\left(\omega_1 \cdot t - \frac{22\pi}{12}\right) + \sin\left(\omega_1 \cdot t - \frac{22\pi}{12} + \pi\right) - \right.$$

$$\left. \left. \sin\left(\omega_1 \cdot t - \frac{22\pi}{12} + \frac{\pi}{2}\right) - \sin\left(\omega_1 \cdot t - \frac{22\pi}{12} + \frac{3\pi}{2}\right) \right\} \right]$$

$$= 4\mu \cdot n \cdot Im_1 \cdot \{Ica(t) \cdot \sin(2\omega_1 \cdot t) + Icb(t) \cdot$$

$$\sin\left(2\omega_1 \cdot t - \frac{2\pi}{3}\right) + Icc(t) \cdot \sin\left(2\omega_1 \cdot t - \frac{4\pi}{3}\right)\}$$

This is the same as equation (26) where the inner rotating magnetic fields are produced by a three-phase alternating current.

Also, $f_2$ is calculated by the following equation.

$$f_2 = Im_2 \cdot B_{100} - Im_2 \cdot B_{200}$$

where, $B_{100}$ is magnetic flux density B at $\theta=\omega_2 \cdot t+\alpha$, and
$B_{200}$ is magnetic flux density B at $\theta=\omega_2 \cdot t+\pi+\alpha$.
Therefore, the above equation can be rewritten as follows.

$$f_2 = \mu \cdot Im_2 \cdot [Im_1 \cdot \sin(2\omega_1 \cdot t - 2\omega_2 \cdot t - 2\alpha) - \quad (35)$$
$$Im_1 \cdot \sin(2\omega_1 \cdot t - 2\omega_2 \cdot t - 2\alpha - 2\pi) +$$
$$Im_2 \cdot \sin(2\omega_2 \cdot t + 2\alpha - 2\omega_2 \cdot t - 2\alpha) -$$
$$Im_2 \cdot \sin(2\omega_2 \cdot t + 2\alpha - 2\omega_2 \cdot t - 2\alpha - 2\pi) +$$
$$n \cdot \{Ica(t) \cdot \sin(2\omega_2 \cdot t + 2\alpha) + Icb(t) \cdot$$
$$\sin\left(2\omega_2 \cdot t + 2\alpha - \frac{2\pi}{3}\right) +$$
$$Icc(t) \cdot \sin\left(2\omega_2 \cdot t + 2\alpha - \frac{4\pi}{3}\right)\} -$$
$$n \cdot \{Ica(t) \cdot \sin(2\omega_2 \cdot t + 2\pi + 2\alpha) +$$
$$Icb(t) \cdot \sin\left(2\omega_2 \cdot t + 2\pi + 2\alpha - \frac{2\pi}{3}\right) +$$
$$Icc(t) \cdot \sin\left(2\omega_2 \cdot t + 2\pi + 2\alpha - \frac{4\pi}{3}\right)\} +$$
$$n \cdot [Ici(t) \cdot \{\sin(\omega_2 \cdot t + \alpha) - \sin(\omega_2 \cdot t + \pi + \alpha)\} +$$
$$Icii(t) \cdot \left\{\sin\left(\omega_2 \cdot t + \alpha - \frac{2\pi}{12}\right) - \sin\left(\omega_2 \cdot t + \pi + \alpha - \frac{2\pi}{12}\right)\right\} +$$
$$Iciii(t) \cdot \left\{\sin\left(\omega_2 \cdot t + \alpha - \frac{4\pi}{12}\right) - \sin\left(\omega_2 \cdot t + \pi + \alpha - \frac{4\pi}{12}\right)\right\} +$$
$$Iciv(t) \cdot \left\{\sin\left(\omega_2 \cdot t + \alpha - \frac{6\pi}{12}\right) - \sin\left(\omega_2 \cdot t + \pi + \alpha - \frac{6\pi}{12}\right)\right\} +$$
$$Icv(t) \cdot \left\{\sin\left(\omega_2 \cdot t + \alpha - \frac{8\pi}{12}\right) - \sin\left(\omega_2 \cdot t + \pi + \alpha - \frac{8\pi}{12}\right)\right\} +$$
$$Icvi(t) \cdot \left\{\sin\left(\omega_2 \cdot t + \alpha - \frac{10\pi}{12}\right) - \sin\left(\omega_2 \cdot t + \pi + \alpha - \frac{10\pi}{12}\right)\right\} +$$
$$Icvii(t) \cdot \left\{\sin\left(\omega_2 \cdot t + \alpha - \frac{12\pi}{12}\right) - \sin\left(\omega_2 \cdot t + \pi + \alpha - \frac{12\pi}{12}\right)\right\} +$$
$$Icviii(t) \cdot \left\{\sin\left(\omega_2 \cdot t + \alpha - \frac{14\pi}{12}\right) - \sin\left(\omega_2 \cdot t + \pi + \alpha - \frac{14\pi}{12}\right)\right\} +$$
$$Icix(t) \cdot \left\{\sin\left(\omega_2 \cdot t + \alpha - \frac{16\pi}{12}\right) - \sin\left(\omega_2 \cdot t + \pi + \alpha - \frac{16\pi}{12}\right)\right\} +$$
$$Icx(t) \cdot \left\{\sin\left(\omega_2 \cdot t + \alpha - \frac{18\pi}{12}\right) - \sin\left(\omega_2 \cdot t + \pi + \alpha - \frac{18\pi}{12}\right)\right\} +$$
$$Icxi(t) \cdot \left\{\sin\left(\omega_2 \cdot t + \alpha - \frac{20\pi}{12}\right) - \sin\left(\omega_2 \cdot t + \pi + \alpha - \frac{20\pi}{12}\right)\right\} +$$
$$Icxii(t) \cdot \left\{\sin\left(\omega_2 \cdot t + \alpha - \frac{22\pi}{12}\right) - \sin\left(\omega_2 \cdot t + \pi + \alpha - \frac{22\pi}{12}\right)\right\}]]$$
$$= 2\mu \cdot Im_2 \cdot n \cdot \{Ici(t) \cdot \sin(\omega_2 \cdot t + \alpha) +$$
$$Icii(t) \cdot \sin\left(\omega_2 \cdot t + \alpha - \frac{2\pi}{12}\right) +$$
$$Iciii(t) \cdot \sin\left(\omega_2 \cdot t + \alpha - \frac{4\pi}{12}\right) +$$
$$Icvi(t) \cdot \sin\left(\omega_2 \cdot t + \alpha - \frac{10\pi}{12}\right) +$$
$$Icvii(t) \cdot \sin\left(\omega_2 \cdot t + \alpha - \frac{12\pi}{12}\right) +$$
$$Icviii(t) \cdot \sin\left(\omega_2 \cdot t + \alpha - \frac{14\pi}{12}\right) +$$
$$Icix(t) \cdot \sin\left(\omega_2 \cdot t + \alpha - \frac{16\pi}{12}\right) +$$
$$Icx(t) \cdot \sin\left(\omega_2 \cdot t + \alpha - \frac{18\pi}{12}\right) +$$
$$Icxi(t) \cdot \sin\left(\omega_2 \cdot t + \alpha - \frac{20\pi}{12}\right) +$$
$$Icxii(t) \cdot \sin\left(\omega_2 \cdot t + \alpha - \frac{22\pi}{12}\right)\}]$$

$f_2$ given by this equation (35) is different from $f_2$ given by equation (27) when the inner rotating magnetic fields are formed by a three-phase alternating current. Therefore, the following calculation of $f_2$ when the inner rotating magnetic fields are formed by a twelve-phase alternating current, will be performed.

(2-6-2) Calculation of $f_2$ using twelve-phase alternating current

The above-mentioned twelve-phase alternating current $Ici(t)$–$Icxii(t)$ is set by the following equations (36A)–(36L).

$$Ici(t) = Ic_2(t) \cdot \cos(\omega_2 \cdot t - \gamma) \quad (36A)$$

$$Icii(t) = Ic_2(t) \cdot \cos\left(\omega_2 \cdot t - \gamma - \frac{2\pi}{12}\right) \quad (36B)$$

$$Iciii(t) = Ic_2(t) \cdot \cos\left(\omega_2 \cdot t - \gamma - \frac{4\pi}{12}\right) \quad (36C)$$

$$Iciv(t) = Ic_2(t) \cdot \cos\left(\omega_2 \cdot t - \gamma - \frac{6\pi}{12}\right) \quad (36D)$$

$$Icv(t) = Ic_2(t) \cdot \cos\left(\omega_2 \cdot t - \gamma - \frac{8\pi}{12}\right) \quad (36E)$$

$$Icvi(t) = Ic_2(t) \cdot \cos\left(\omega_2 \cdot t - \gamma - \frac{10\pi}{12}\right) \quad (36F)$$

$$Icvii(t) = Ic_2(t) \cdot \cos\left(\omega_2 \cdot t - \gamma - \frac{12\pi}{12}\right) \quad (36G)$$

$$Icviii(t) = Ic_2(t) \cdot \cos\left(\omega_2 \cdot t - \gamma - \frac{14\pi}{12}\right) \quad (36H)$$

$$Icix(t) = Ic_2(t) \cdot \cos\left(\omega_2 \cdot t - \gamma - \frac{16\pi}{12}\right) \quad (36I)$$

-continued $$Icx(t) = Ic_2(t) \cdot \cos\left(\omega_2 \cdot t - \gamma - \frac{18\pi}{12}\right) \quad (36J)$$

$$Icxi(t) = Ic_2(t) \cdot \cos\left(\omega_2 \cdot t - \gamma - \frac{20\pi}{12}\right) \quad (36K)$$

$$Icxii(t) = Ic_2(t) \cdot \cos\left(\omega_2 \cdot t - \gamma - \frac{22\pi}{12}\right) \quad (36L)$$

$f_2$ is calculated by substituting equations (36A)–(36L) in equation (35).

$$f_2 = 2\mu \cdot Im_2 \cdot n \cdot Ic(t) \cdot \{\cos(\omega_2 \cdot t - \gamma) \cdot \sin(\omega_2 \cdot t + \alpha) +$$
$$\cos\left(\omega_2 \cdot t - \gamma - \frac{2\pi}{12}\right) \cdot \sin\left(\omega_2 \cdot t + \alpha - \frac{2\pi}{12}\right) +$$
$$\cos\left(\omega_2 \cdot t - \gamma - \frac{4\pi}{12}\right) \cdot \sin\left(\omega_2 \cdot t + \alpha - \frac{4\pi}{12}\right) +$$
$$\cos\left(\omega_2 \cdot t - \gamma - \frac{6\pi}{12}\right) \cdot \sin\left(\omega_2 \cdot t + \alpha - \frac{6\pi}{12}\right) +$$
$$\cos\left(\omega_2 \cdot t - \gamma - \frac{8\pi}{12}\right) \cdot \sin\left(\omega_2 \cdot t + \alpha - \frac{8\pi}{12}\right) +$$
$$\cos\left(\omega_2 \cdot t - \gamma - \frac{10\pi}{12}\right) \cdot \sin\left(\omega_2 \cdot t + \alpha - \frac{10\pi}{12}\right) +$$
$$\cos\left(\omega_2 \cdot t - \gamma - \frac{12\pi}{12}\right) \cdot \sin\left(\omega_2 \cdot t + \alpha - \frac{12\pi}{12}\right) +$$
$$\cos\left(\omega_2 \cdot t - \gamma - \frac{14\pi}{12}\right) \cdot \sin\left(\omega_2 \cdot t + \alpha - \frac{14\pi}{12}\right) +$$
$$\cos\left(\omega_2 \cdot t - \gamma - \frac{16\pi}{12}\right) \cdot \sin\left(\omega_2 \cdot t + \alpha - \frac{16\pi}{12}\right) +$$
$$\cos\left(\omega_2 \cdot t - \gamma - \frac{18\pi}{12}\right) \cdot \sin\left(\omega_2 \cdot t + \alpha - \frac{18\pi}{12}\right) +$$
$$\cos\left(\omega_2 \cdot t - \gamma - \frac{20\pi}{12}\right) \cdot \sin\left(\omega_2 \cdot t + \alpha - \frac{20\pi}{12}\right) +$$
$$\cos\left(\omega_2 \cdot t - \gamma - \frac{22\pi}{12}\right) \cdot \sin\left(\omega_2 \cdot t + \alpha - \frac{22\pi}{12}\right)\}$$

Here, the above equation may be rewritten using the formula $$\cos(a) \cdot \sin(b) = \tfrac{1}{2} \cdot \{\sin(a+b) = \sin(a-b)\}.$$

$$f_2 = 2\mu \cdot Im_2 \cdot n \cdot Ic_2(t) \cdot \left[\frac{1}{2} \cdot \{\sin(\omega_2 \cdot t - \gamma + \omega_2 \cdot t + \alpha) - \right. \quad (37)$$
$$\sin(\omega_2 \cdot t - \gamma - \omega_2 \cdot t - \alpha)\} +$$
$$\frac{1}{2} \cdot \left\{\sin\left(\omega_2 \cdot t - \gamma - \frac{2\pi}{12} + \omega_2 \cdot t + \alpha - \frac{2\pi}{12}\right) - \right.$$
$$\sin\left(\omega_2 \cdot t - \gamma - \frac{2\pi}{12} - \omega_2 \cdot t - \alpha + \frac{2\pi}{12}\right)\} +$$
$$\frac{1}{2} \cdot \left\{\sin\left(\omega_2 \cdot t - \gamma - \frac{4\pi}{12} + \omega_2 \cdot t + \alpha - \frac{4\pi}{12}\right) - \right.$$
$$\sin\left(\omega_2 \cdot t - \gamma - \frac{4\pi}{12} - \omega_2 \cdot t - \alpha + \frac{4\pi}{12}\right)\} +$$
$$\frac{1}{2} \cdot \left\{\sin\left(\omega_2 \cdot t - \gamma - \frac{6\pi}{12} + \omega_2 \cdot t + \alpha - \frac{6\pi}{12}\right) - \right.$$
$$\sin\left(\omega_2 \cdot t - \gamma - \frac{6\pi}{12} - \omega_2 \cdot t - \alpha + \frac{6\pi}{12}\right)\} +$$
$$\frac{1}{2} \cdot \left\{\sin\left(\omega_2 \cdot t - \gamma - \frac{8\pi}{12} + \omega_2 \cdot t + \alpha - \frac{8\pi}{12}\right) - \right.$$
$$\sin\left(\omega_2 \cdot t - \gamma - \frac{8\pi}{12} - \omega_2 \cdot t - \alpha + \frac{8\pi}{12}\right)\} +$$
$$\frac{1}{2} \cdot \left\{\sin\left(\omega_2 \cdot t - \gamma - \frac{10\pi}{12} + \omega_2 \cdot t + \alpha - \frac{10\pi}{12}\right) - \right.$$
$$\sin\left(\omega_2 \cdot t - \gamma - \frac{10\pi}{12} - \omega_2 \cdot t - \alpha + \frac{10\pi}{12}\right)\} +$$
$$\frac{1}{2} \cdot \left\{\sin\left(\omega_2 \cdot t - \gamma - \frac{12\pi}{12} + \omega_2 \cdot t + \alpha - \frac{12\pi}{12}\right) - \right.$$
$$\sin\left(\omega_2 \cdot t - \gamma - \frac{12\pi}{12} - \omega_2 \cdot t - \alpha + \frac{12\pi}{12}\right)\} +$$
$$\frac{1}{2} \cdot \left\{\sin\left(\omega_2 \cdot t - \gamma - \frac{14\pi}{12} + \omega_2 \cdot t + \alpha - \frac{14\pi}{12}\right) - \right.$$
$$\sin\left(\omega_2 \cdot t - \gamma - \frac{14\pi}{12} - \omega_2 \cdot t - \alpha + \frac{14\pi}{12}\right)\} +$$
$$\frac{1}{2} \cdot \left\{\sin\left(\omega_2 \cdot t - \gamma - \frac{16\pi}{12} + \omega_2 \cdot t + \alpha - \frac{16\pi}{12}\right) - \right.$$
$$\sin\left(\omega_2 \cdot t - \gamma - \frac{16\pi}{12} - \omega_2 \cdot t - \alpha + \frac{16\pi}{12}\right)\} +$$
$$\frac{1}{2} \cdot \left\{\sin\left(\omega_2 \cdot t - \gamma - \frac{18\pi}{12} + \omega_2 \cdot t + \alpha - \frac{18\pi}{12}\right) - \right.$$
$$\sin\left(\omega_2 \cdot t - \gamma - \frac{18\pi}{12} - \omega_2 \cdot t - \alpha + \frac{18\pi}{12}\right)\} +$$
$$\frac{1}{2} \cdot \left\{\sin\left(\omega_2 \cdot t - \gamma - \frac{20\pi}{12} + \omega_2 \cdot t + \alpha - \frac{20\pi}{12}\right) - \right.$$
$$\sin\left(\omega_2 \cdot t - \gamma - \frac{20\pi}{12} - \omega_2 \cdot t - \alpha + \frac{20\pi}{12}\right)\} +$$
$$\frac{1}{2} \cdot \left\{\sin\left(\omega_2 \cdot t - \gamma - \frac{22\pi}{12} + \omega_2 \cdot t + \alpha - \frac{22\pi}{12}\right) - \right.$$
$$\left. \sin\left(\omega_2 \cdot t - \gamma - \frac{22\pi}{12} - \omega_2 \cdot t - \alpha + \frac{22\pi}{12}\right)\}\right]$$

$$= 2\mu \cdot Im_2 \cdot n \cdot Ic_2(t) \cdot \left[\frac{1}{2}\{\sin(2\omega_2 \cdot t - \gamma + \alpha) + \sin(\gamma + \alpha)\} + \right.$$
$$\frac{1}{2}\left\{\sin\left(2\omega_2 \cdot t - \gamma + \alpha - \frac{4\pi}{12}\right) + \sin(\gamma + \alpha)\right\} +$$
$$\frac{1}{2}\left\{\sin\left(2\omega_2 \cdot t - \gamma + \alpha - \frac{8\pi}{12}\right) + \sin(\gamma + \alpha)\right\} +$$
$$\frac{1}{2}\left\{\sin\left(2\omega_2 \cdot t - \gamma + \alpha - \frac{12\pi}{12}\right) + \sin(\gamma + \alpha)\right\} +$$
$$\frac{1}{2}\left\{\sin\left(2\omega_2 \cdot t - \gamma + \alpha - \frac{16\pi}{12}\right) + \sin(\gamma + \alpha)\right\} +$$
$$\frac{1}{2}\left\{\sin\left(2\omega_2 \cdot t - \gamma + \alpha - \frac{20\pi}{12}\right) + \sin(\gamma + \alpha)\right\} +$$
$$\frac{1}{2}\left\{\sin\left(2\omega_2 \cdot t - \gamma + \alpha - \frac{24\pi}{12}\right) + \sin(\gamma + \alpha)\right\} +$$
$$\frac{1}{2}\left\{\sin\left(2\omega_2 \cdot t - \gamma + \alpha - \frac{28\pi}{12}\right) + \sin(\gamma + \alpha)\right\} +$$
$$\frac{1}{2}\left\{\sin\left(2\omega_2 \cdot t - \gamma + \alpha - \frac{32\pi}{12}\right) + \sin(\gamma + \alpha)\right\} +$$
$$\frac{1}{2}\left\{\sin\left(2\omega_2 \cdot t - \gamma + \alpha - \frac{36\pi}{12}\right) + \sin(\gamma + \alpha)\right\} +$$
$$\frac{1}{2}\left\{\sin\left(2\omega_2 \cdot t - \gamma + \alpha - \frac{40\pi}{12}\right) + \sin(\gamma + \alpha)\right\} +$$
$$\left. \frac{1}{2}\left\{\sin\left(2\omega_2 \cdot t - \gamma + \alpha - \frac{44\pi}{12}\right) + \sin(\gamma + \alpha)\right\}\right]$$

$$= \mu \cdot Im_2 \cdot n \cdot Ic_2(t) \cdot \{\sin(2\omega_2 \cdot t - \gamma + \alpha) +$$
$$\sin\left(2\omega_2 \cdot t - \gamma + \alpha - \frac{4\pi}{12}\right) + \sin\left(2\omega_2 \cdot t - \gamma + \alpha - \frac{8\pi}{12}\right) +$$

$$\sin\left(2\omega_2 \cdot t - \gamma + \alpha - \frac{12\pi}{12}\right) + \sin\left(2\omega_2 \cdot t - \gamma + \alpha - \frac{16\pi}{12}\right) +$$

$$\sin\left(2\omega_2 \cdot t - \gamma + \alpha - \frac{20\pi}{12}\right) + \sin\left(2\omega_2 \cdot t - \gamma + \alpha - \frac{24\pi}{12}\right) +$$

$$\sin\left(2\omega_2 \cdot t - \gamma + \alpha - \frac{28\pi}{12}\right) + \sin\left(2\omega_2 \cdot t - \gamma + \alpha - \frac{32\pi}{12}\right) +$$

$$\sin\left(2\omega_2 \cdot t - \gamma + \alpha - \frac{36\pi}{12}\right) + \sin\left(2\omega_2 \cdot t - \gamma + \alpha - \frac{40\pi}{12}\right) +$$

$$\sin\left(2\omega_2 \cdot t - \gamma + \alpha - \frac{44\pi}{12}\right) + 12\sin(\gamma + \alpha)\}$$

$$= \mu \cdot Im_2 \cdot n \cdot Ic_2(t) \cdot \{\sin(2\omega_2 \cdot t - \gamma + \alpha) +$$

$$\sin\left(2\omega_2 \cdot t - \gamma + \alpha - \frac{\pi}{3}\right) + \sin\left(2\omega_2 \cdot t - \gamma + \alpha - \frac{2\pi}{3}\right) -$$

$$\sin(2\omega_2 \cdot t - \gamma + \alpha) - \sin\left(2\omega_2 \cdot t - \gamma + \alpha - \frac{\pi}{3}\right) -$$

$$\sin\left(2\omega_2 \cdot t - \gamma + \alpha - \frac{2\pi}{3}\right) + \sin(2\omega_2 \cdot t - \gamma + \alpha) +$$

$$\sin\left(2\omega_2 \cdot t - \gamma + \alpha - \frac{\pi}{3}\right) + \sin\left(2\omega_2 \cdot t - \gamma + \alpha - \frac{2\pi}{3}\right) -$$

$$\sin(2\omega_2 \cdot t - \gamma + \alpha) - \sin\left(2\omega_2 \cdot t - \gamma + \alpha - \frac{\pi}{3}\right) -$$

$$\sin\left(2\omega_2 \cdot t - \gamma + \alpha - \frac{2\pi}{3}\right) + 12\sin(\gamma + \alpha)\}$$

$$= 12\mu \cdot Im_2 \cdot n \cdot Ic_2(t) \cdot \sin(\gamma + \alpha)$$

(2-6-3) Summary

Comparing equation (37) obtained when the inner rotating magnetic fields are supplied by a twelve-phase alternating current with the above-mentioned equation (31) obtained when the inner rotating magnetic fields are supplied by a three-phase alternating current (31), the constant term of equation (37), i.e., the last term, is four times that of equation (31).

In other words, when the inner magnet is driven by a twelve-phase alternating current (Ii–Ixii), the drive torque obtained is four times that when the inner magnet is driven by a three-phase alternating current.

In other words, the inner magnets drive current required to exert the same drive torque on the inner *magnets $m_2$, is only one fourth of that when a three-phase alternating current is applied.

(3) N(3(2p)-2p) type (3-1) When the magnetic pole number ratio is 3:1

Figure 11:
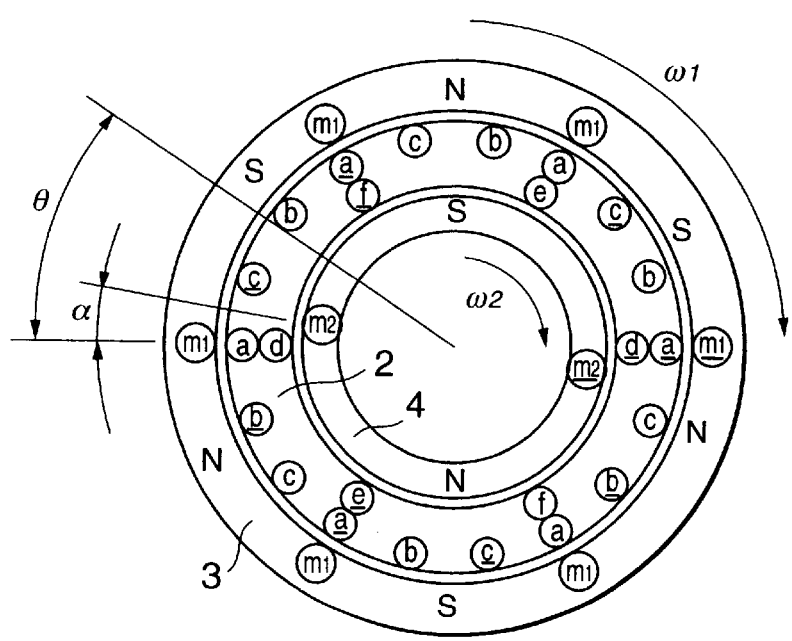
FIG. 11 is similar to FIG. 7, but showing a motor/generator with a magnetic pole number ratio of 3:1.

Taking a motor/generator of FIG. 11 as an example, the magnetic pole number ratio is 3:1 when the magnetic pole number of the outer magnets $m_2$ is 6 and the magnetic pole number of the inner magnets $m_1$ is 2.

In this construction, the magnetic flux densities $B_1$ and $B_2$ generated by the outer and inner permanent magnets are expressed by the following equations (41), (42).

$$B_1 = Bm_1 \cdot \sin(3\omega_1 \cdot t - 3\theta) = \mu \cdot Im_1 \cdot \sin(3\omega_1 \cdot t - 3\theta) \quad (41)$$

$$B_2 = Bm_2 \cdot \sin(\omega_2 \cdot t + \alpha - \theta) = \mu \cdot Im_2 \cdot \sin(\omega_2 \cdot t + \alpha - \theta) \quad (42)$$

The rotating magnetic fields produced by the coils 6 of the stator 2 are calculated separately for the outer rotor 3 and inner rotor 4. The magnetic flux densities $Bc_1$, $Bc_2$ of the coils 6 relative to the outer magnets $m_1$ and inner magnets $m_2$ are expressed by the following equations (43), (44).

$$Bc_1 = \mu_n \cdot \{Ica(t) \cdot \sin(3\theta) + \quad (43)$$

$$Icb(t) \cdot \sin\left(3\theta - \frac{2\pi}{3}\right) + Icc(t) \cdot \sin\left(3\theta - \frac{4\pi}{3}\right)\}$$

$$Bc_2 = \mu \cdot n \cdot \quad (44)$$

$$\{Icd(t) \cdot \sin\theta + Ice(t) \cdot \sin\left(\theta - \frac{2\pi}{3}\right) + Icf(t) \cdot \sin\left(\theta - \frac{4\pi}{3}\right)\}$$

The variation of the aforesaid magnetic flux densities $B_1$, $B_2$ and $Bc_1$, $Bc_2$ are shown in FIGS. 12A–12D.

The total magnetic flux density B is expressed by the following equation.

$$B = B_1 + B_2 + Bc_1 + Bc_2 \quad (45)$$

$$= \mu \cdot Im_1 \cdot \sin(3\omega_1 \cdot t - 3\theta) + \mu \cdot Im_2 \cdot \sin(\omega_2 \cdot t + \alpha - \theta) +$$

$$\mu \cdot n \cdot \{Ica(t) \cdot \sin(3\theta) + Icb(t) \cdot \sin\left(3\theta - \frac{2\pi}{3}\right) +$$

$$Icc(t) \cdot \sin\left(3\theta - \frac{4\pi}{3}\right)\} + \mu \cdot n \cdot \{Icd(t) \cdot \sin\theta + Ice(t) \cdot$$

$$\sin\left(\theta - \frac{2\pi}{3}\right) + Icf(t) \cdot \sin\left(\theta - \frac{4\pi}{3}\right)\}$$

Here, let the torque acting on the outer rotor 3 be $\tau_1$. If the force which acts on a semicircle of the outer rotor 3 is $f_1$, the force which then acts on the other semicircle is also $f_1$. Therefore, the force acting on the whole circumference is $2f_1$, and the torque $\tau_1$ may be expressed by the following equation.

$$\tau_1 = 2f_1 \cdot r_1$$

where, $r_1$=distance to outer magnets from center axis of outer rotor.

As three equivalent direct currents are formed for one semicircle, $f_1$ is given by the following equation.

$$f_1 = Im_1 \cdot B_{1000} + Im_1 \cdot B_{2000} - Im_1 \cdot B_{3000}$$

where, $B_{1000}$ is magnetic flux density B at $\theta = \omega_1 \cdot t$, $B_{2000}$ is | magnetic flux density B at $\theta = \omega_1 \cdot t + 2\pi/3$, and $B_{3000}$ is magnetic flux density B at $\theta = \omega_1 \cdot t + \pi/3$.

Therefore, the above equation can be rewritten as follows.

$$f_1 = \mu \cdot Im_1 \cdot [Im_1 \cdot \sin(3\omega_1 \cdot t - 3\omega_1 \cdot t) + Im_1 \cdot \quad (46)$$

$$\sin(3\omega_1 \cdot t - 3\omega_1 \cdot t - 2\pi) - Im_1 \cdot \sin(3\omega_1 \cdot t - 3\omega_1 \cdot t - \pi) +$$

$$Im_2 \cdot \sin(\omega_2 \cdot t + \alpha - \omega_1 \cdot t) + Im_2 \cdot$$

$$\sin\left(\omega_2 \cdot t + \alpha - \omega_1 \cdot t - \frac{2\pi}{3}\right) - Im_2 \cdot$$

$$\sin\left(\omega_2 \cdot t + \alpha - \omega_1 \cdot t - \frac{\pi}{3}\right) + n \cdot \{Ica(t) \cdot \sin(3\omega_1 \cdot t) +$$

$$Icb(t) \cdot \sin\left(3\omega_1 \cdot t - \frac{2\pi}{3}\right) + Icc(t) \cdot \sin\left(3\omega_1 \cdot t - \frac{4\pi}{3}\right)\} +$$

$$n \cdot \{Ica(t) \cdot \sin(3\omega_1 \cdot t + 2\pi) + Icb(t) \cdot$$

$$\sin\left(3\omega_1 \cdot t + 2\pi - \frac{2\pi}{3}\right) + Icc(t) \cdot \sin\left(3\omega_1 \cdot t + 2\pi - \frac{4\pi}{3}\right)\} -$$

$$n \cdot \{Ica(t) \cdot \sin(3\omega_1 \cdot t + \pi) + Icb(t) \cdot \sin\left(3\omega_1 \cdot t + \pi - \frac{2\pi}{3}\right) +$$

-continued
$$Icc(t) \cdot \sin\left(3\omega_1 \cdot t + \pi - \frac{4\pi}{3}\right)\} + n \cdot \{Icd(t) \cdot \sin(\omega_1 \cdot t) +$$

$$Ice(t) \cdot \sin\left(\omega_1 \cdot t - \frac{2\pi}{3}\right) + Icf(t) \cdot \sin\left(\omega_1 \cdot t - \frac{4\pi}{3}\right)\} +$$

$$n \cdot \left\{Icd(t) \cdot \sin\left(\omega_1 \cdot t + \frac{2\pi}{3}\right) + Ice(t) \cdot\right.$$

$$\sin\left(\omega_1 \cdot t + \frac{2\pi}{3} - \frac{2\pi}{3}\right) + Icf(t) \cdot \sin\left(\omega_1 \cdot t + \frac{2\pi}{3} - \frac{4\pi}{3}\right)\} -$$

$$n \cdot \{Icd(t) \cdot \sin(\omega_1 \cdot t + \frac{\pi}{3}) + Ice(t) \cdot$$

$$\sin\left(\omega_1 \cdot t + \frac{\pi}{3} - \frac{2\pi}{3}\right) + Icf(t) \cdot \sin\left(\omega_1 \cdot t + \frac{\pi}{3} - \frac{4\pi}{3}\right)\}\right]$$

$$= \mu \cdot Im_1 \cdot [n \cdot \{Ica(t) \cdot \sin(3\omega_1 \cdot t) + Icb(t) \cdot$$

$$\sin\left(3\omega_1 \cdot t - \frac{2\pi}{3}\right) + Icc(t) \cdot \sin\left(3\omega_1 \cdot t - \frac{4\pi}{3}\right)\} + n \cdot \{Ica(t) \cdot$$

$$\sin(3\omega_1 \cdot t) + Icb(t) \cdot \sin\left(3\omega_1 \cdot t - \frac{2\pi}{3}\right) + Icc(t) \cdot$$

$$\sin\left(3\omega_1 \cdot t - \frac{4\pi}{3}\right)\} + n \cdot \{Ica(t) \cdot \sin(3\omega_1 \cdot t) + Icb(t) \cdot$$

$$\sin\left(3\omega_1 \cdot t - \frac{2\pi}{3}\right) + Icc(t) \cdot \sin\left(3\omega_1 \cdot t - \frac{4\pi}{3}\right)\} +$$

$$n \cdot \left\{Icd(t) \cdot \sin(\omega_1 \cdot t) + Ice(t) \cdot \sin\left(\omega_1 \cdot t - \frac{2\pi}{3}\right) +\right.$$

$$Icf(t) \cdot \sin\left(\omega_1 \cdot t - \frac{4\pi}{3}\right)\} + n \cdot \left\{Icd(t) \cdot \sin\left(\omega_1 \cdot t + \frac{2\pi}{3}\right) +\right.$$

$$Ice(t) \cdot \sin(\omega_1 \cdot t) + Icf \cdot \sin\left(\omega_1 \cdot t - \frac{2\pi}{3}\right)\} + n \cdot \{Icd(t) \cdot$$

$$\sin\left(\omega_1 \cdot t + \frac{4\pi}{3}\right) + Ice(t) \cdot \sin\left(\omega_1 \cdot t + \frac{2\pi}{3}\right) + Icf(t) \cdot$$

$$\sin(\omega_1 \cdot t)\}\right]$$

$$= \mu \cdot n \cdot Im_1 \cdot \left[3 \cdot \{Ica(t) \cdot \sin(3\omega_1 \cdot t) + Icb(t) \cdot\right.$$

$$\sin\left(3\omega_1 \cdot t - \frac{2\pi}{3}\right) + Icc(t) \cdot \sin\left(3\omega_1 \cdot t - \frac{4\pi}{3}\right)\} + Icd(t) \cdot$$

$$\sin(\omega_1 \cdot t) + Icd(t) \cdot \sin\left(\omega_1 \cdot t + \frac{2\pi}{3}\right) + Icd(t) \cdot$$

$$\sin\left(\omega_1 \cdot t + \frac{4\pi}{3}\right) + Ice(t) \cdot \sin(\omega_1 \cdot t) + Ice(t) \cdot$$

$$\sin\left(\omega_1 \cdot t + \frac{2\pi}{3}\right) + Ice(t) \cdot \sin\left(\omega_1 \cdot t + \frac{4\pi}{3}\right) + Icf(t) \cdot$$

$$\sin(\omega_1 \cdot t) + Icf(t) \cdot \sin\left(\omega_1 \cdot t + \frac{2\pi}{3}\right) + Icf(t) \cdot$$

$$\sin\left(\omega_1 \cdot t + \frac{4\pi}{3}\right)\right]$$

$$= 3\mu \cdot Im_1 \cdot n \cdot \{Ica(t) \cdot \sin(3\omega_1 \cdot t) + Icb(t) \cdot$$

$$\sin\left(3\omega_1 \cdot t - \frac{2\pi}{3}\right) + Icc(t) \cdot \sin\left(3\omega_1 \cdot t - \frac{4\pi}{3}\right)\}$$

Equation (46) shows that when the magnetic flux density of the outer magnets $m_1$ is approximated to a sine wave, the torque acting on the outer magnets $m_1$ can be controlled by the exciting currents of the coils a, b, c.

It also shows that the torque acting on the outer magnets $m_1$ is not affected by the excitation currents of the coils d, e, f.

Here, let the torque acting on the inner rotor 4 be $\tau_2$. If the force which acts on a semicircle of the inner rotor 4 is $f_2$, the force which then acts the other semicircle is also $f_2$.

Therefore, the force acting on the whole circumference is $2f_2$, and the torque $\tau_2$ may be expressed by the following equation.

$$\tau_2 = 2f_2 \cdot r_2$$

where, $r_2$=distance from center axis of inner rotor 4 to inner magnets $m_2$.

Here, the force $f_2$ is a drive force which an equivalent direct current $Im_2$ generates in a magnetic field of magnetic flux density B. As an equivalent direct current is formed for each semicircle, $f_2$ is given by the following equation.

$$f_2 = Im_2 \cdot B$$

where, $\theta = \omega_2 \cdot t + \alpha$.

From this equation and equation (45), $f_2$ may be expressed by the following equation (47).

$$f_2 = \mu \cdot Im_2 \cdot [Im_1 \cdot \sin(3\omega_1 \cdot t - 3\omega_2 \cdot t - 3\alpha) + \mu \cdot Im_2 \cdot \quad (47)$$

$$\sin(\omega_2 \cdot t + \alpha - \omega_2 \cdot t - \alpha) + n \cdot \{Ica(t) \cdot \sin(3\omega_2 \cdot t + 3\alpha) +$$

$$Icb(t) \cdot \sin\left(3\omega_2 \cdot t + 3\alpha - \frac{2\pi}{3}\right) + Icc(t) \cdot$$

$$\sin\left(3\omega_2 \cdot t + 3\alpha - \frac{4\pi}{3}\right)\} + n\{Icd(t) \cdot \sin(\omega_2 \cdot t + \alpha) +$$

$$Ice(t) \cdot \sin\left(\omega_2 \cdot t + 3\alpha - \frac{2\pi}{3}\right) + Icf(t) \cdot$$

$$\sin\left(\omega_2 \cdot t + 3\alpha - \frac{4\pi}{3}\right)\}\Big]$$

$$= \mu \cdot Im_2 \cdot \left[Im_1 \cdot \sin\{3(\omega_1 - \omega_2)t - 3\alpha\} + n \cdot \{Ica(t) \cdot\right.$$

$$\sin(3\omega_2 \cdot t + 3\alpha) + Icb(t) \cdot \sin\left(3\omega_2 \cdot t + 3\alpha - \frac{2\pi}{3}\right) +$$

$$Icc(t) \cdot \sin\left(3\omega_2 \cdot t + 3\alpha - \frac{4\pi}{3}\right)\} + n \cdot \{Icd(t) \cdot$$

$$\sin(\omega_2 \cdot t + \alpha) + Ice(t) \cdot \sin\left(\omega_2 \cdot t + \alpha - \frac{2\pi}{3}\right) + Icf(t) \cdot$$

$$\sin\left(\omega_2 \cdot t + \alpha - \frac{4\pi}{3}\right)\}\right]$$

The second term in equation (47) shows that the torque acting on the inner magnets $m_2$ is evidently affected by the exciting currents of the coils a, b, c for the outer magnets $m_1$. However, this is an apparent effect, and there is actually no effect due to the following reason.

If the positions of the outer magnets $m_1$ are $\phi_1 = \omega_1 \cdot t + \pi/6$, $\phi_2 = \omega_1 \cdot t + 5\pi/6$, $\phi_3 = \omega_1 \cdot t + 9\pi/6$ respectively, the magnetic flux density $B_1$ of the outer magnets $m_1$ at a rotation angle $\theta$ may be expressed by the following equation.

$$B_1 = Bm_1 \cdot \left\{\cos\left(\omega_1 \cdot t + \frac{\pi}{6} - \theta\right) + \cos\left(\omega_1 \cdot t + \frac{5\pi}{6} - \theta\right) + \right.$$

$$\cos\left(\omega_1 \cdot t + \frac{9\pi}{6} - \theta\right)\right\}$$

$$= \mu \cdot Im_1 \cdot \left\{\cos\left(\omega_1 \cdot t + \frac{\pi}{6} - \theta\right) + \cos\left(\omega_1 \cdot t + \frac{5\pi}{6} - \theta\right) + \right.$$

$$\cos\left(\omega_1 \cdot t + \frac{9\pi}{6} - \theta\right)\right\}$$

$$= 0$$

This shows that the magnetic poles formed at 120 degree intervals cancel the magnetic force. In other words, the magnetic pole number of the outer magnets $m_1$ has no effect on the inner magnets $m_2$. Similarly, the magnetic flux density produced by the outer coil is also 0 in total. Therefore, the drive force $f_2$ is as follows.

$$f_2 = \mu \cdot Im_2 \cdot \left[ n \cdot \left\{ Icd(t) \cdot \sin(\omega_2 \cdot t + \alpha) + Ice(t) \cdot \sin\left(\omega_2 \cdot t + \alpha - \frac{2\pi}{3}\right) + Icf(t) \cdot \sin\left(\omega_2 \cdot t + \alpha - \frac{4f}{3}\right) \right\} \right] \quad (48)$$

(3-2) When both the outer rotating magnetic fields and inner rotating magnetic fields are supplied The alternating currents Ica(t), Icb(t), Icc(t) and alternating currents Icd(t), Ice(t), Icf(t) are expressed by the following equations.

$$Ica(t) = Ic_1 \cdot \cos(3\omega_1 \cdot t - 3\beta) \quad (49A)$$

$$Icb(t) = Ic_1 \cdot \cos\left(3\omega_1 \cdot t - 3\beta - \frac{2\pi}{3}\right) \quad (49B)$$

$$Icc(t) = Ic_1 \cdot \cos\left(3\omega_1 \cdot t - 3\beta - \frac{4\pi}{3}\right) \quad (49C)$$

$$Icd(t) = Ic_2(t) \cdot \cos(\omega_2 \cdot t - \gamma) \quad (50A)$$

$$Ice(t) = Ic_2(t) \cdot \cos\left(\omega_2 \cdot t - \gamma - \frac{2\pi}{3}\right) \quad (50B)$$

$$Icf(t) = Ic_2(t) \cdot \cos\left(\omega_2 \cdot t - \gamma - \frac{4\pi}{3}\right) \quad (50C)$$

In equations (50A)–(50C), to permit amplitude modulation, the current is assumed to be $Ic_2(t)$ which is a function of time t.

$f_1$, $f_2$ are calculated by substituting equations (49A)–(49C) in equation (46), and substituting equations (49A)–(49C) and (50A)–(50C) in equation (47).

$$f_1 = 3\mu \cdot Im_1 \cdot n \cdot Ic \cdot \left\{ \cos(3\omega_1 \cdot t - 3\beta) \cdot \sin(3\omega_1 \cdot t) + \cos\left(3\omega_1 \cdot t - 3\beta - \frac{2\pi}{3}\right) \cdot \sin\left(3\omega_1 \cdot t - \frac{2\pi}{3}\right) + \cos\left(3\omega_1 \cdot t - 3\beta - \frac{4\pi}{3}\right) \cdot \sin\left(3\omega_1 \cdot t - \frac{4\pi}{3}\right) \right\}$$

Here, the above equation may be rewritten using the formula $$\cos(a)\cdot\sin(b) = \tfrac{1}{2}\cdot\{\sin(a+b) - \sin(a-b)\}.$$

$$f_1 = 3\mu \cdot Im_1 \cdot n \cdot Ic_1 \cdot \left[ \frac{1}{2} \cdot \{\sin(3\omega_1 \cdot t - 3\beta + 3\omega_1 \cdot t) - \sin(3\omega_1 \cdot t - 3\beta - 3\omega_1 \cdot t)\} + \frac{1}{2} \cdot \left\{ \sin\left(3\omega_1 \cdot t - 3\beta - \frac{2\pi}{3} + 3\omega_1 \cdot t - \frac{2\pi}{3}\right) - \sin\left(3\omega_1 \cdot t - 3\beta - \frac{2\pi}{3} - 3\omega_1 \cdot t + \frac{2\pi}{3}\right) \right\} + \frac{1}{2} \cdot \left\{ \sin\left(3\omega_1 \cdot t - 3\beta - \frac{4\pi}{3} + 3\omega_1 \cdot t - \frac{4\pi}{3}\right) - \sin\left(3\omega_1 \cdot t - 3\beta - \frac{4\pi}{3} - 3\omega_1 \cdot t + \frac{4\pi}{3}\right) \right\} \right] \quad (51)$$

$$= \frac{3}{2} \cdot \mu \cdot Im_1 \cdot n \cdot Ic_1 \cdot \left\{ \sin(6\omega_1 \cdot t - 3\beta) + \sin 3\beta + \sin\left(6\omega_1 \cdot t - \right. \right.$$

-continued $$\left. 3\beta - \frac{4\pi}{3}\right) + \sin 3\beta + \left(6\omega_1 \cdot t - 3\beta - \frac{8\pi}{3}\right) + \sin 3\beta \right\}$$

$$= \frac{3}{2} \mu \cdot Im_1 \cdot n \cdot Ic_1 \cdot \left\{ \sin(6\omega_1 \cdot t - 3\beta) + \sin\left(6\omega_1 \cdot t - 3\beta - \frac{4\pi}{3}\right) + \sin\left(6\omega_1 \cdot t - 3\beta - \frac{8\pi}{3}\right) + 3\sin 3\beta \right\}$$

$$= \frac{9}{2} \cdot \mu \cdot Im_1 \cdot n \cdot Ic_1 \cdot \sin 3\beta$$

$$f_2 = \mu \cdot Im_2 \cdot [Im_1 \cdot \sin\{3(\omega_1 - \omega_2)t - 3\alpha\} + n \cdot Ic_1 \cdot \left\{ \cos(3\omega_1 \cdot t - 3\beta) \cdot \sin(3\omega_2 \cdot t + 3\alpha) + \cos\left(3\omega_1 \cdot t - 3\beta - \frac{2\pi}{3}\right) \cdot \sin\left(3\omega_2 \cdot t + 3\alpha - \frac{2\pi}{3}\right) + \cos\left(3\omega_1 \cdot t - 3\beta - \frac{4\pi}{3}\right) \cdot \sin\left(3\omega_2 \cdot t + 3\alpha - \frac{4\pi}{3}\right) \right\} + n \cdot Ic_2(t) \cdot \{\cos(\omega_2 \cdot t - \gamma) \cdot \sin(\omega_2 \cdot t + \alpha) + \cos\left(\omega_2 \cdot t - \gamma - \frac{2\pi}{3}\right) \cdot \sin\left(\omega_2 \cdot t + \alpha - \frac{2\pi}{3}\right) + \cos\left(\omega_2 \cdot t - \gamma - \frac{4\pi}{3}\right) \cdot \sin\left(\omega_2 \cdot t + \alpha - \frac{4\pi}{3}\right) \}]$$

Here, the above equation may be rewritten using the expression $$\cos(a)\cdot\sin(b) = \tfrac{1}{2}\cdot\{\sin(a+b) - \sin(a-b)\}.$$

$$f_2 = \mu \cdot Im_2 \cdot \left[ Im_1 \cdot \sin\{3(\omega_1 - \omega_2) \cdot t - 3\alpha\} + n \cdot Ic_1 \cdot \left[ \frac{1}{2} \cdot \{\sin(3\omega_1 \cdot t - 3\beta + 3\omega_2 \cdot t + 3\alpha) - \sin(3\omega_1 \cdot t - 3\beta - 3\omega_2 \cdot t - 3\alpha)\} + \frac{1}{2} \cdot \left\{ \sin\left(3\omega_1 \cdot t - 3\beta - \frac{2\pi}{3} + 3\omega_2 \cdot t + 3\alpha - \frac{2\pi}{3}\right) - \sin\left(3\omega_1 \cdot t - 3\beta - \frac{2\pi}{3} - 3\omega_2 \cdot t - 3\alpha + \frac{2\pi}{3}\right) \right\} + \frac{1}{2} \cdot \left\{ \sin\left(3\omega_1 \cdot t - 3\beta - \frac{4\pi}{3} + 3\omega_2 \cdot t + 3\alpha - \frac{4\pi}{3}\right) - \sin\left(3\omega_1 \cdot t - 3\beta - \frac{4\pi}{3} - 3\omega_2 \cdot t - 3\alpha + \frac{4\pi}{3}\right) \right\} \right] + n \cdot Ic_2(t) \cdot \left[ \frac{1}{2} \cdot \{\sin(\omega_2 \cdot t - \gamma + \omega_2 \cdot t + \alpha) - \sin(\omega_2 \cdot t - \gamma - \omega_2 \cdot t - \alpha)\} + \frac{1}{2} \cdot \left\{ \sin\left(\omega_2 \cdot t - \gamma - \frac{2\pi}{3} + \omega_2 \cdot t + \alpha - \frac{2\pi}{3}\right) - \sin\left(\omega_2 \cdot t - \gamma - \frac{2\pi}{3} - \omega_2 \cdot t - \alpha + \frac{2\pi}{3}\right) \right\} + \frac{1}{2} \cdot \left\{ \sin\left(\omega_2 \cdot t - \gamma - \frac{4\pi}{3} + \omega_2 \cdot t + \alpha - \frac{4\pi}{3}\right) - \sin\left(\omega_2 \cdot t - \gamma - \frac{4\pi}{3} - \omega_2 \cdot t - \alpha + \frac{4\pi}{3}\right) \right\} \right] \right] \quad (52)$$

$$= \mu \cdot Im_2 \cdot [Im_1 \cdot \sin\{3(\omega_1 - \omega_2) \cdot t - 3\alpha\} + \frac{1}{2} \cdot n \cdot Ic_1 \cdot \left\{ \sin(3\omega_1 \cdot t + 3\omega_2 \cdot t - 3\beta + 3\alpha) + \sin\left(3\omega_1 \cdot t + 3\omega_2 \cdot t - 3\beta + 3\alpha - \frac{4\pi}{3}\right) + \sin\left(3\omega_1 \cdot t + 3\omega_2 \cdot t - 3\beta + 3\alpha - \frac{8\pi}{3}\right) - 3\sin(3\omega_1 \cdot t + 3\omega_2 \cdot t - 3\beta + 3\alpha) \right\} + \frac{1}{2} \cdot n \cdot Ic_2(t) \cdot \left\{ \sin(2\omega_2 \cdot t - \gamma + \alpha) + \sin\left(2\omega_2 \cdot t - \gamma + \alpha - \frac{4\pi}{3}\right) + \right.$$

-continued $$\sin\left(2\omega_2 \cdot t - \gamma + \alpha - \frac{8\pi}{3}\right) + 3\sin(\gamma + \alpha)\bigg]$$

$$= \mu \cdot Im_2 \cdot \bigg[Im_1 \cdot \sin\{3(\omega_1 - \omega_2) \cdot t - 3\alpha\} + \frac{1}{2} \cdot n \cdot Ic_1 \cdot$$

$$\{\sin(3\omega_1 \cdot t + 3\omega_2 \cdot t - 3\beta + 3\alpha) + \sin(3\omega_1 \cdot t + 3\omega_2 \cdot$$

$$t - 3\beta + 3\alpha - \frac{2\pi}{3}) + \sin\left(3\omega_1 \cdot t + 3\omega_2 \cdot t - 3\beta + 3\alpha - \frac{4\pi}{3}\right) -$$

$$3\sin(3\omega_1 \cdot t - 3\beta - 3\omega_2 \cdot t - 3\alpha)\} + \frac{1}{2} \cdot n \cdot Ic_2(t) \cdot$$

$$\bigg\{\sin(2\omega_2 \cdot t - \gamma + \alpha) + \sin\left(2\omega_2 \cdot t - \gamma + \alpha - \frac{2\pi}{3}\right) +$$

$$\sin\left(2\omega_2 \cdot t - \gamma + \alpha - \frac{4\pi}{3}\right) + 3\sin(\gamma + \alpha)\bigg\}\bigg]$$

$$= \mu \cdot Im_2 \cdot \bigg[Im_1 \cdot \sin\{3(\omega_1 - \omega_2) \cdot t - 3\alpha\} - \frac{3}{2} \cdot n \cdot Ic_1 \cdot$$

$$\sin(3\omega_1 \cdot t - 3\beta - 3\omega_2 \cdot t - 3\alpha) + \frac{3}{2} \cdot n \cdot Ic_2(t) \cdot \sin(\gamma + \alpha)\bigg]$$

As described with regard to equation (48), $f_2$ is a constant value when there is no effect of the outer magnets $m_1$ and outer coils a, c, b as shown by the following equation (53).

$$f_2 = \frac{3}{2} \cdot \{n \cdot Ic_2(t) \cdot \sin(\gamma + \alpha)\} \quad (53)$$

Conversely, when there is an effect from the magnetic field due to the outer magnets $m_1$ and outer coils, if $Ic_2(t)$ is set by the following equation (54), $ff_2 = C$ (constant) in the equation (52) and the motor/generator can be driven by a constant torque.

$$Ic_2(t) = \frac{\frac{2}{3} \cdot \frac{C}{\mu \cdot Im_2} - Im_1 \cdot \sin\{3(\omega_1 - \omega_2)t - 3\alpha\} + n \cdot Ic_1 \cdot \sin(3\omega_1 \cdot t - 3\beta - 3\omega_2 \cdot t - 3\alpha)}{n \cdot \sin(\gamma + \alpha)} \quad (54)$$

Figure 13A:
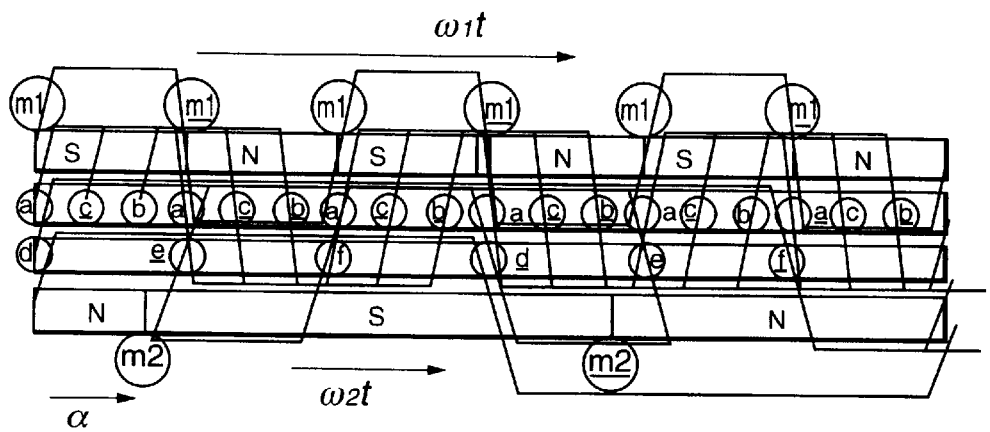
FIGS. 13A–13C are diagrams describing magnetic force interference in the motor/generator of FIG. 11.
Figure 13B:
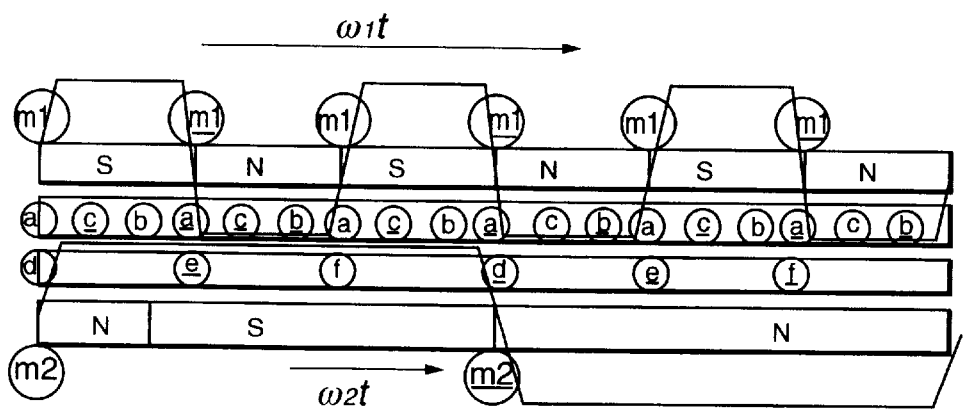
Figure 13C:
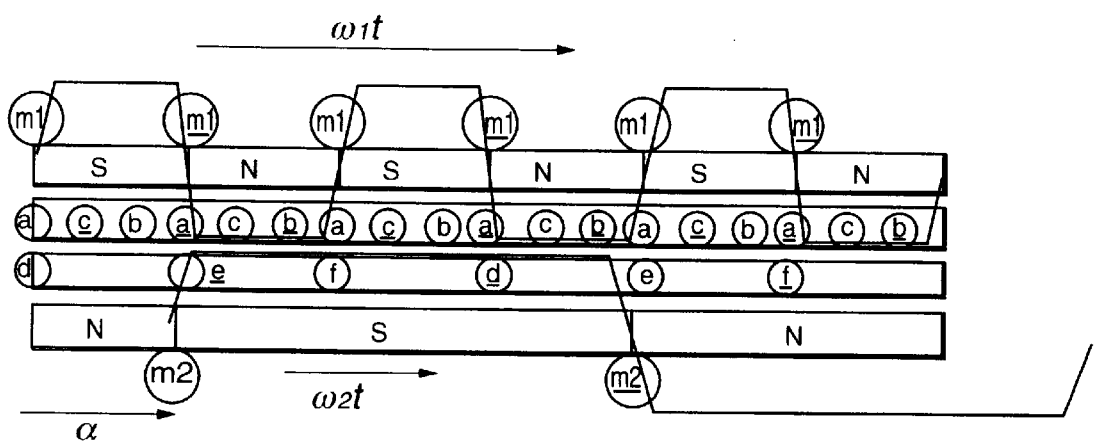

In other words, this means that according to equation (52), some effect of the outer magnets $m_1$ is generated relative to the rotation of the inner magnets $m_2$ when the magnetic pole number ratio is 3:1. More precisely, a constant torque fluctuation based on the phase difference $(\omega_1 - \omega_2)$ occurs in the rotational torque of the inner magnets $m_2$. This situation is shown in FIGS. 13A–13C.

If a magnetic field is assumed to be rectangular in a model representation, the magnetic force interference between the outer magnets and inner magnets may be clearly expressed.

Comparing state A with state B, as state B is stable, a torque is generated in state A which tends to shift to state B. This torque is an intermittent torque and is generated by a phase difference $(\omega_1 - \omega_2)$. Further, as a perfect sine wave cannot be realized due to the effect of distance between coils, it may be impossible to completely eliminate the effect of the outer magnets. The most extreme example of such case is expressed by equation (52). However, a torque fluctuation can be eliminated in most cases by applying amplitude modulation from equation (54), and the inner magnet can be driven with a constant torque even when the magnetic pole number ratio is 3:1.

(3-3) Summary

According to equations (51), (52), when currents are passed through the coils of the stator 2 in synchronism with the rotations of the outer magnets $m_1$ and inner magnets $m_2$, a rotational torque acts on both permanent magnets.

It will of course be understood that when currents are passed through the coils of the stator in synchronism with the rotation of the outer magnets $m_1$, a rotational torque acts only the outer magnets $m_1$, and when currents are passed through the coils of the stator in synchronism with the rotation of the inner magnets $m_2$, a rotational torque acts only the inner magnets $m_2$.

This fact shows that also in the case where the magnetic pole number ratio is 3:1, the two rotors 3, 4 can be driven as a generator and a motor using one series of the coils 6.

(3-4) Current settings

In FIG. 11, one series of coils a, c, b are assumed to generate the outer rotating magnetic fields, and another series of coils d, f, e are assumed to generate the inner rotating magnetic fields.

Figure 14:
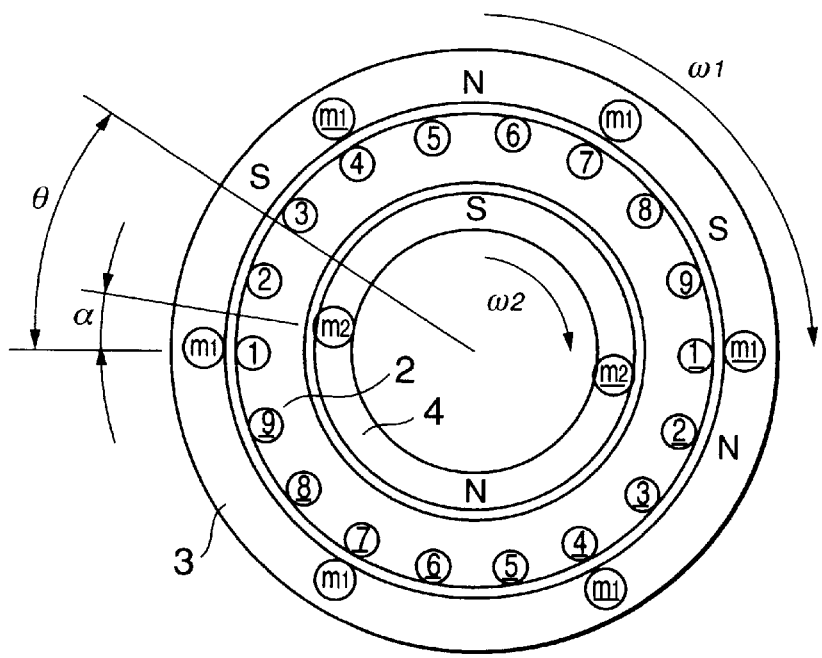
FIG. 14 is similar to FIG. 11, but showing a case where outer and inner coils are integrated.

In the real motor/generator according to this invention, these coils are integrated as shown in FIG. 14. Specifically, the coils a and d, a and f, a and e, a and d, a and f, a and e in FIG. 11 are respectively integrated to coils #1, #4, #7, #1, #4 and #7 of FIG. 14.

In view of the construction of FIG. 17, the currents passing through the coils 6 of the stator 2 may be set as follows.

$I_1 = Ia + Id$ $I_{10} = I_1 = Ia + Id$ $I_2 = Ic$ $I_3 = Ib$ $I_4 = Ia + If$ $I_5 = IC$ $I_6 = Ib$ $I_7 = Ia + Ie$ $I_8 = Ic$ $I_9 = Ib$ $I_{11-12} = Ic$ $I_{12} = I_3 = Ib$ $I_{13} = I_4 = Ia + If$ $I_{14} = I_5 = Ic$ $I_{15} = I_6 = Ib$ $I_{16} = Ia + Ie$ $I_{17} = I_8 = Ic$ $I_{18} = I_9 = Ib$

When the magnetic pole number ratio is 3:1, an eighteen-phase alternating current is required, but the phase is reversed over half the circumference, so a nine-phase alternating current (half of eighteen-phase) may be used.

In this case as the load on coils #1, #4, #7, #1, #4 and #7 is heavy, it is desirable to use also the remaining coils in order to form the inner rotating magnetic fields. For example, the following current settings are recommended.

Figure 15A:
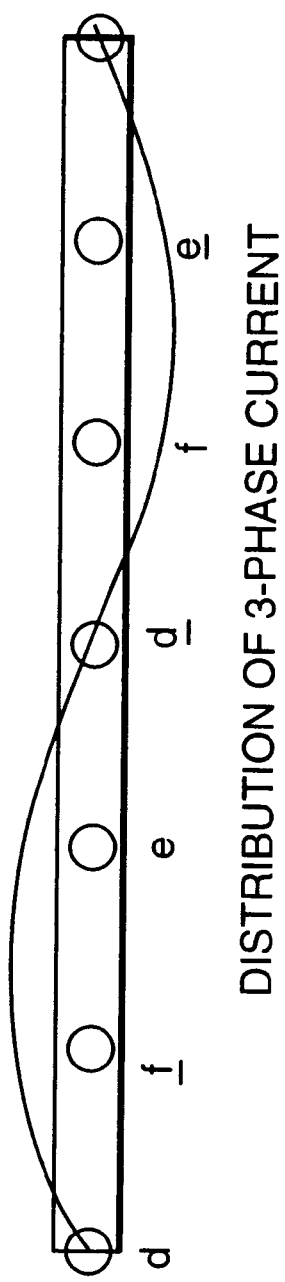
FIGS. 15A and 15B are diagrams showing a distribution of alternating current driving the motor/generator of FIG. 14.
Figure 15B:
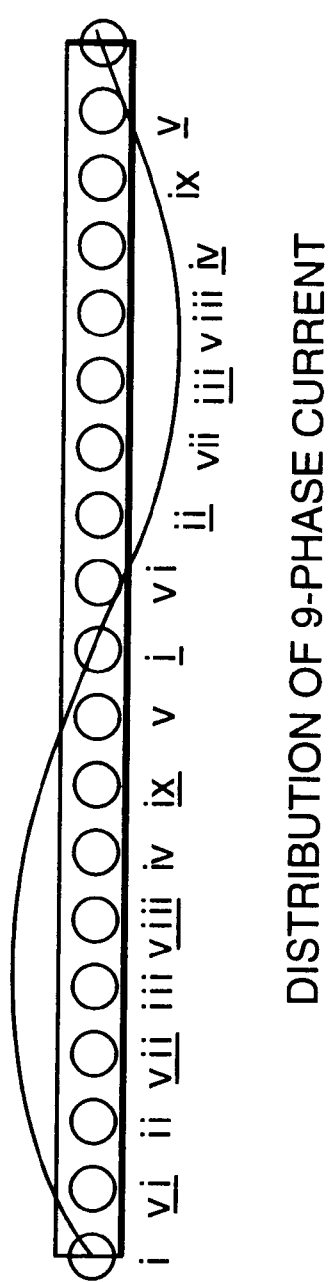

$I_1 = Ia + Ii$ $I_2 = Ic + Ivi$ $I_3 = Ib + Iii$ $I_4 = Ia + Ivii$ $I_5=Ic+Iiii$ $I_6=Ib+Iviii$ $I_7=Ia+Iiv$ $I_8=Ic+Iix$ $I_9=Ib+Iv$ $I_{10}=I_1=Ia+Ii$ $I_{11}=I_2=Ic+Ivi$ $I_{12}=I_3=Ib+Iiii$ $I_{13}=I_4=Ia+Ivii$ $I_{14}=I_5=Ic+Iiii$ $I_{15}=I_6=Ib+Iviii$ $I_{16}=I_7=Ia+Iiv$ $I_{17}=I_8=Ic+Iix$ $I_{18}=I_9=Ib+Iv$ The phases of the currents Ii–Iix and Ii–Iix for forming the inner rotating magnetic fields are shown in FIGS. 15A and 15B.

(3-5) When the inner rotating magnetic fields with nine-phase alternating current are supplied (3-5-1) Magnetic flux density $Bc_2$ The magnetic flux density $Bc_2$ when the inner rotating magnetic fields are produced by nine-phase alternating current is expressed by the following equation (55).

$$Bc_2 = \mu \cdot n \cdot \left\{ Ici(t) \cdot \sin\theta + Icii(t) \cdot \sin\left(\theta - \frac{2\pi}{9}\right) + \right.$$
$$Iciii(t) \cdot \sin\left(\theta - \frac{4\pi}{9}\right) + Iciv(t) \cdot \sin\left(\theta - \frac{6\pi}{9}\right) +$$
$$Icv(t) \cdot \sin\left(\theta - \frac{8\pi}{9}\right) + Icvi(t) \cdot \sin\left(\theta - \frac{10\pi}{9}\right) +$$
$$Icvii(t) \cdot \sin\left(\theta - \frac{12\pi}{9}\right) + Icviii(t) \cdot \sin\left(\theta - \frac{14\pi}{9}\right) +$$
$$\left. Icix(t) \cdot \sin\left(\theta - \frac{16\pi}{9}\right) \right\} \tag{55}$$

The total magnetic flux density B is expressed as follows.

$$B = B_1 + B_2 + Bc_1 + Bc_2 \tag{56}$$
$$= \mu \cdot Im_1 \cdot \sin(3\omega_1 \cdot t - 3\theta) + \mu \cdot Im_2 \cdot \sin(\omega_2 \cdot t + \alpha - \theta) +$$
$$\mu \cdot n \left\{ Ica(t) \cdot \sin(3\theta) + Icb(t) \cdot \sin\left(3\theta - \frac{2\pi}{3}\right) + \right.$$
$$\left. Icc(t) \cdot \sin\left(3\theta - \frac{4\pi}{3}\right) \right\} + \mu \cdot n \cdot \{ Ici(t) \cdot \sin\theta + Icii(t) \cdot$$
$$\sin\left(\theta - \frac{2\pi}{9}\right) + Iciii(t) \cdot \sin\left(\theta - \frac{4\pi}{9}\right) + Iciv(t) \cdot$$
$$\sin\left(\theta - \frac{6\pi}{9}\right) + Icv(t) \cdot \sin\left(\theta - \frac{8\pi}{9}\right) + Icvi(t) \cdot$$
$$\sin\left(\theta - \frac{10\pi}{9}\right) + Icvii(t) \cdot \sin\left(\theta - \frac{12\pi}{9}\right) + Icviii(t) \cdot$$
$$\sin\left(\theta - \frac{14\pi}{9}\right) + Icix(t) \cdot \sin\left(\theta - \frac{16\pi}{9}\right) \}$$

$f_1$ is calculated by the following equation.

$$f_1 = Im_1 \cdot B_{1000} + Im_1 \cdot B_{2000} - Im_1 \cdot B_{3000}$$

where, $B_{1000}$ is magnetic flux density B at $\theta = \omega_1 \cdot t$, $B_{2000}$ is magnetic flux density B at $\theta = \omega_1 \cdot t + 2\pi/3$, and $B_{3000}$ is magnetic flux density B at $\theta = \omega_1 \cdot t + \pi/3$.

Therefore, the above equation can be rewritten as follows.

$$f_1 = \mu \cdot Im_1 \cdot [Im_1 \cdot \{\sin(3\omega_1 \cdot t - 3\omega_1 \cdot t) + \tag{57}$$
$$\sin(3\omega_1 \cdot t - 3\omega_1 \cdot t + 2\pi) -$$
$$\sin(3\omega_1 \cdot t - 3\omega_1 \cdot t + \pi)\} +$$
$$Im_2 \cdot \{\sin(\omega_2 \cdot t + \alpha - \omega_1 \cdot t) +$$
$$\sin\left(\omega_2 \cdot t + \alpha - \omega_1 \cdot t - \frac{2\pi}{3}\right) -$$
$$\sin\left(\omega_2 \cdot t + \alpha - \omega_1 \cdot t - \frac{\pi}{3}\right)\} +$$
$$n \cdot [Ica(t) \cdot \{\sin(3\omega_1 \cdot t) + \sin(3\omega_1 \cdot t + 2\pi) -$$
$$\sin(3\omega_1 \cdot t + \pi)\} + Icb(t) \cdot \left\{\sin\left(3\omega_1 \cdot t - \frac{2\pi}{3}\right) + \right.$$
$$\left. \sin\left(3\omega_1 \cdot t + 2\pi - \frac{2\pi}{3}\right) - \sin\left(3\omega_1 \cdot t + \pi - \frac{2\pi}{3}\right)\right\} +$$
$$Icc(t) \cdot \left\{\sin\left(3\omega_1 \cdot t - \frac{4\pi}{3}\right) + \right.$$
$$\sin\left(3\omega_1 \cdot t + 2\pi - \frac{4\pi}{3}\right) -$$
$$\left. \sin\left(3\omega_1 \cdot t + \pi - \frac{4\pi}{3}\right)\right\}] + n \cdot [Ici(t) \cdot \{\sin(\omega_1 \cdot t) +$$
$$\sin\left(\omega_1 \cdot t + \frac{2\pi}{3}\right) + \sin\left(\omega_1 \cdot t + \frac{\pi}{3}\right)\} + Icii(t) \cdot$$
$$\left\{\sin\left(\omega_1 \cdot t - \frac{2\pi}{9}\right) + \sin\left(\omega_1 \cdot t - \frac{2\pi}{9} + \frac{2\pi}{3}\right) - \right.$$
$$\left. \sin\left(\omega_1 \cdot t - \frac{2\pi}{9} + \frac{\pi}{3}\right)\right\} + Iciii(t) \cdot$$
$$\left\{\sin\left(\omega_1 \cdot t - \frac{4\pi}{9}\right) + \sin\left(\omega_1 \cdot t - \frac{4\pi}{9} + \frac{2\pi}{3}\right) - \right.$$
$$\left. \sin\left(\omega_1 \cdot t - \frac{4\pi}{9} + \frac{\pi}{3}\right)\right\} + Iciv(t) \cdot$$
$$\left\{\sin\left(\omega_1 \cdot t - \frac{6\pi}{9}\right) + \sin\left(\omega_1 \cdot t - \frac{6\pi}{9} + \frac{2\pi}{3}\right) - \right.$$
$$\left. \sin\left(\omega_1 \cdot t - \frac{6\pi}{9} + \frac{\pi}{3}\right)\right\} + Icv(t) \cdot$$
$$\left\{\sin\left(\omega_1 \cdot t - \frac{8\pi}{9}\right) + \sin\left(\omega_1 \cdot t - \frac{8\pi}{9} + \frac{2\pi}{3}\right) - \right.$$
$$\left. \sin\left(\omega_1 \cdot t - \frac{8\pi}{9} + \frac{\pi}{3}\right)\right\} + Icvi(t) \cdot$$
$$\left\{\sin\left(\omega_1 \cdot t - \frac{10\pi}{9}\right) + \sin\left(\omega_1 \cdot t - \frac{10\pi}{9} + \frac{2\pi}{3}\right) - \right.$$
$$\left. \sin\left(\omega_1 \cdot t - \frac{10\pi}{9} + \frac{\pi}{3}\right)\right\} + Icvii(t) \cdot$$
$$\left\{\sin\left(\omega_1 \cdot t - \frac{12\pi}{9}\right) + \sin\left(\omega_1 \cdot t - \frac{12\pi}{9} + \frac{2\pi}{3}\right) - \right.$$
$$\left. \sin\left(\omega_1 \cdot t - \frac{12\pi}{9} + \frac{\pi}{3}\right)\right\} + Icviii(t) \cdot$$
$$\left\{\sin\left(\omega_1 \cdot t - \frac{14\pi}{9}\right) + \sin\left(\omega_1 \cdot t - \frac{14\pi}{9} + \frac{2\pi}{3}\right) - \right.$$

$$\sin\left(\omega_1 \cdot t - \frac{14\pi}{9} + \frac{\pi}{3}\right)\} + Icix(t) \cdot$$

$$\left\{\sin\left(\omega_1 \cdot t - \frac{16\pi}{9}\right) + \sin\left(\omega_1 \cdot t - \frac{16\pi}{9} + \frac{2\pi}{3}\right) - \sin\left(\omega_1 \cdot t - \frac{16\pi}{9} + \frac{\pi}{3}\right)\}\right]]$$

$$= \mu \cdot Im_1 \cdot [Im_1 \cdot \{\sin(3\omega_1 \cdot t - 3\omega_1 \cdot t) + \sin(3\omega_1 \cdot t - 3\omega_1 \cdot t + 2\pi) - \sin(3\omega_1 \cdot t - 3\omega_1 \cdot t + \pi)\} + \quad (=0)$$

$$Im_2 \cdot \{\sin(\omega_2 \cdot t + \alpha - \omega_1 \cdot t) + \sin\left(\omega_2 \cdot t + \alpha - \omega_1 \cdot t - \frac{2\pi}{3}\right) - \sin\left(\omega_2 \cdot t + \alpha - \omega_1 \cdot t + \frac{\pi}{3}\right)\} + \quad (=0)$$

$$n \cdot \{Ica(t) \cdot \{\sin(3\omega_1 \cdot t) + \sin(3\omega_1 \cdot t + 2\pi) - \sin(3\omega_1 \cdot t + \pi)\} + Icb(t) \cdot \{\sin\left(3\omega_1 \cdot t - \frac{2\pi}{3}\right) + \sin\left(3\omega_1 \cdot t + 2\pi - \frac{2\pi}{3}\right) - \sin\left(3\omega_1 \cdot t + \pi - \frac{2\pi}{3}\right)\} +$$

$$Icc(t) \cdot \{\sin\left(3\omega_1 \cdot t - \frac{4\pi}{3}\right) + \sin\left(3\omega_1 \cdot t + 2\pi - \frac{4\pi}{3}\right) - \sin\left(3\omega_1 \cdot t + \pi - \frac{4\pi}{3}\right)\}\right] + \quad (\neq 0)$$

$$n \cdot \left[Ici(t) \cdot \{\sin(\omega_1 \cdot t) + \sin\left(\omega_1 \cdot t + \frac{2\pi}{3}\right) - \sin\left(\omega_1 \cdot t + \frac{\pi}{3}\right)\right\} + \quad (=0)$$

$$Icii(t) \cdot \{\sin\left(\omega_1 \cdot t - \frac{2\pi}{9}\right) + \sin\left(\omega_1 \cdot t - \frac{2\pi}{9} + \frac{2\pi}{3}\right) - \sin\left(\omega_1 \cdot t - \frac{2\pi}{9} + \frac{\pi}{3}\right)\} + \quad (=0)$$

$$Iciii(t) \cdot \{\sin\left(\omega_1 \cdot t - \frac{4\pi}{9}\right) + \sin\left(\omega_1 \cdot t - \frac{4\pi}{9} + \frac{2\pi}{3}\right) - \sin\left(\omega_1 \cdot t - \frac{4\pi}{9} + \frac{\pi}{3}\right)\} + \quad (=0)$$

$$Iciv(t) \cdot \{\sin\left(\omega_1 \cdot t - \frac{6\pi}{9}\right) + \sin\left(\omega_1 \cdot t - \frac{6\pi}{9} + \frac{2\pi}{3}\right) - \sin\left(\omega_1 \cdot t - \frac{6\pi}{9} + \frac{\pi}{3}\right)\} + \quad (=0)$$

$$Icv(t) \cdot \{\sin\left(\omega_1 \cdot t - \frac{8\pi}{9}\right) + \sin\left(\omega_1 \cdot t - \frac{8\pi}{9} + \frac{2\pi}{3}\right) - \sin\left(\omega_1 \cdot t - \frac{8\pi}{9} + \frac{\pi}{3}\right)\} + \quad (=0)$$

$$Icvi(t) \cdot \{\sin\left(\omega_1 \cdot t - \frac{10\pi}{9}\right) + \sin\left(\omega_1 \cdot t - \frac{10\pi}{9} + \frac{2\pi}{3}\right) - \sin\left(\omega_1 \cdot t - \frac{10\pi}{9} + \frac{\pi}{3}\right)\} + \quad (=0)$$

$$Icvii(t) \cdot \{\sin\left(\omega_1 \cdot t - \frac{12\pi}{9}\right) + \sin\left(\omega_1 \cdot t - \frac{12\pi}{9} + \frac{2\pi}{3}\right) - \sin\left(\omega_1 \cdot t - \frac{12\pi}{9} + \frac{\pi}{3}\right)\} + \quad (=0)$$

$$Icviii(t) \cdot \{\sin\left(\omega_1 \cdot t - \frac{14\pi}{9}\right) +$$

$$\sin\left(\omega_1 \cdot t - \frac{14\pi}{9} + \frac{2\pi}{3}\right) - \sin\left(\omega_1 \cdot t - \frac{14\pi}{9} + \frac{\pi}{3}\right)\} + \quad (=0)$$

$$Icix(t) \cdot \{\sin\left(\omega_1 \cdot t - \frac{16\pi}{9}\right) + \sin\left(\omega_1 \cdot t - \frac{16\pi}{9} + \frac{2\pi}{3}\right) - \sin\left(\omega_1 \cdot t - \frac{16\pi}{9} + \frac{\pi}{3}\right)\}\right]] \quad (=0)$$

$$= 3\mu \cdot n \cdot Im_1\{Ica(t) \cdot \sin(3\omega_1 \cdot t) + Icb(t) \cdot \sin\left(3\omega_1 \cdot t - \frac{2\pi}{3}\right) + Icc(t) \cdot \sin\left(3\omega_1 \cdot t - \frac{4\pi}{3}\right)\}$$

This is the same as equation (46) which is obtained when the inner rotating magnetic fields are supplied by a three-phase alternating current.

On the other hand, $f_2$ may be calculated as follows.

$$f_2 = Im_2 \cdot B$$

where, $\theta = \omega_2 \cdot t + \alpha$.

From this equation and equation (56), $f_2$ may be expressed by the following equation.

$$f_2 = \mu \cdot Im_2 \cdot [Im_1 \cdot \sin(2\omega_1 \cdot t - 3\omega_2 \cdot t - 3\alpha) + \quad (58)$$

$$Im_2 \cdot \sin(\omega_2 \cdot t + \alpha - \omega_2 \cdot t - \alpha) + n \cdot$$

$$\{Ica(t) \cdot \sin(3\omega_2 \cdot t + 3\alpha) + Icb(t) \cdot \sin\left(3\omega_2 \cdot t + 3\alpha - \frac{2\pi}{3}\right) + Icc(t) \cdot$$

$$\sin\left(3\omega_2 \cdot t + 3\alpha - \frac{4\pi}{3}\right)\} + n \cdot$$

$$\{Ici(t) \cdot \sin(\omega_2 \cdot t + \alpha) + Icii(t) \cdot$$

$$\sin\left(\omega_2 \cdot t + \alpha - \frac{2\pi}{9}\right) + Iciii(t) \cdot$$

$$\sin\left(\omega_2 \cdot t + \alpha - \frac{4\pi}{9}\right) + Iciv(t) \cdot$$

$$\sin\left(\omega_2 \cdot t + \alpha - \frac{6\pi}{9}\right) + Icv(t) \cdot$$

$$\sin\left(\omega_2 \cdot t + \alpha - \frac{8\pi}{9}\right) + Icvi(t) \cdot$$

$$\sin\left(\omega_2 \cdot t + \alpha - \frac{10\pi}{9}\right) + Icvii(t) \cdot$$

$$\sin\left(\omega_2 \cdot t + \alpha - \frac{12\pi}{9}\right) + Icviii(t) \cdot$$

$$\sin\left(\omega_2 \cdot t + \alpha - \frac{14\pi}{9}\right) + Icix(t) \cdot$$

$$\sin\left(\omega_2 \cdot t + \alpha - \frac{16\pi}{9}\right)\}]$$

$$= \mu \cdot Im_2 \cdot [Im_1 \cdot \sin(3\omega_1 \cdot t - 3\omega_2 \cdot t - 3\alpha) +$$

$$n \cdot \{Ica(t) \cdot \sin(3\omega_2 \cdot t + 3\alpha) + Icb(t) \cdot$$

$$\sin\left(3\omega_2 \cdot t + 3\alpha - \frac{2\pi}{3}\right) + Icc(t) \cdot$$

$$\sin\left(3\omega_2 \cdot t + 3\alpha - \frac{4\pi}{3}\right)\} + n \cdot$$

-continued $$\{Ici(t)\cdot\sin(\omega_2\cdot t+\alpha)+Icii(t)\cdot$$

$$\sin\left(\omega_2\cdot t+\alpha-\frac{2\pi}{9}\right)+Iciii(t)\cdot$$

$$\sin\left(\omega_2\cdot t+\alpha-\frac{4\pi}{9}\right)+Iciv(t)\cdot$$

$$\sin\left(\omega_2\cdot t+\alpha-\frac{6\pi}{9}\right)+Icv(t)\cdot$$

$$\sin\left(\omega_2\cdot t+\alpha-\frac{8\pi}{9}\right)+Icvi(t)\cdot$$

$$\sin\left(\omega_2\cdot t+\alpha-\frac{10\pi}{9}\right)+Icvii(t)\cdot$$

$$\sin\left(\omega_2\cdot t+\alpha-\frac{12\pi}{9}\right)+Icviii(t)\cdot$$

$$\sin\left(\omega_2\cdot t+\alpha-\frac{14\pi}{9}\right)+Icix(t)\cdot$$

$$\sin\left(\omega_2\cdot t+\alpha-\frac{16\pi}{9}\right)\}]$$

(3-5-2) When the outer rotating magnetic fields and inner rotating magnetic fields are supplied together The three-phase alternating currents Ica(t), Icb(t), Icc(t) mentioned above are expressed by the following equations (59A), (59B), (59C).

$$Ica(t)=Ic_1\cdot\cos(3\omega_1\cdot t-3\beta) \quad (59A)$$

$$Icb(t)=Ic_1\cdot\cos\left(3\omega_1\cdot t-3\beta-\frac{2\pi}{3}\right) \quad (59B)$$

$$Icc(t)=Ic_1\cdot\cos\left(3\omega_1\cdot t-3\beta-\frac{4\pi}{3}\right) \quad (59C)$$

The nine-phase alternating currents Ici(t)–Icix(t) mentioned above are set as follows.

$$Ici(t)=Ic_2(t)\cdot\cos(\omega_2\cdot t-\gamma) \quad (60A)$$

$$Icii(t)=Ic_2(t)\cdot\cos\left(\omega_2\cdot t-\gamma-\frac{2\pi}{9}\right) \quad (60B)$$

$$Iciii(t)=Ic_2(t)\cdot\cos\left(\omega_2\cdot t-\gamma-\frac{4\pi}{9}\right) \quad (60C)$$

$$Iciv(t)=Ic_2(t)\cdot\cos\left(\omega_2\cdot t-\gamma-\frac{6\pi}{9}\right) \quad (60D)$$

$$Icv(t)=Ic_2(t)\cdot\cos\left(\omega_2\cdot t-\gamma-\frac{8\pi}{9}\right) \quad (60E)$$

$$Icvi(t)=Ic_2(t)\cdot\cos\left(\omega_2\cdot t-\gamma-\frac{10\pi}{9}\right) \quad (60F)$$

$$Icvii(t)=Ic_2(t)\cdot\cos\left(\omega_2\cdot t-\gamma-\frac{12\pi}{9}\right) \quad (60G)$$

$$Icviii(t)=Ic_2(t)\cdot\cos\left(\omega_2\cdot t-\gamma-\frac{14\pi}{9}\right) \quad (60H)$$

$$Icix(t)=Ic_2(t)\cdot\cos\left(\omega_2\cdot t-\gamma-\frac{16\pi}{9}\right) \quad (60I)$$

Next, $f_2$ is calculated by substituting equations (59A)–(59C) and equations (60A)–(60I) into equation (58).

$$f_2=\mu\cdot Im_2\cdot[Im_1\cdot\sin(3\omega_1\cdot t-3\omega_2\cdot t-3\alpha)+$$

-continued $$n\cdot\{Ic_1\cdot\cos(3\omega_1\cdot t-3\beta)\cdot\sin(3\omega_2\cdot t-3\alpha)+$$

$$Ic_1\cdot\cos\left(3\omega_1\cdot t-3\beta-\frac{2\pi}{3}\right)\cdot\sin\left(3\omega_2\cdot t+3\alpha-\frac{2\pi}{3}\right)+$$

$$Ic_1\cdot\cos\left(3\omega_1\cdot t-3\beta-\frac{4\pi}{3}\right)\cdot\sin\left(3\omega_2\cdot t+3\alpha-\frac{4\pi}{3}\right)\}+$$

$$n\cdot\{Ic_2(t)\cdot\cos(\omega_2\cdot t-\gamma)\cdot\sin(\omega_1\cdot t+\alpha)+$$

$$Ic_2(t)\cdot\cos\left(\omega_2\cdot t-\gamma-\frac{2\pi}{9}\right)\cdot\sin\left(\omega_1\cdot t+\alpha-\frac{2\pi}{9}\right)+$$

$$Ic_2(t)\cdot\cos\left(\omega_2\cdot t-\gamma-\frac{4\pi}{9}\right)\cdot\sin\left(\omega_1\cdot t+\alpha-\frac{4\pi}{9}\right)+$$

$$Ic_2(t)\cdot\cos\left(\omega_2\cdot t-\gamma-\frac{6\pi}{9}\right)\cdot\sin\left(\omega_1\cdot t+\alpha-\frac{6\pi}{9}\right)+$$

$$Ic_2(t)\cdot\cos\left(\omega_2\cdot t-\gamma-\frac{8\pi}{9}\right)\cdot\sin\left(\omega_1\cdot t+\alpha-\frac{8\pi}{9}\right)+$$

$$Ic_2(t)\cdot\cos\left(\omega_2\cdot t-\gamma-\frac{10\pi}{9}\right)\cdot\sin\left(\omega_1\cdot t+\alpha-\frac{10\pi}{9}\right)+$$

$$Ic_2(t)\cdot\cos\left(\omega_2\cdot t-\gamma-\frac{12\pi}{9}\right)\cdot\sin\left(\omega_1\cdot t+\alpha-\frac{12\pi}{9}\right)+$$

$$Ic_2(t)\cdot\cos\left(\omega_2\cdot t-\gamma-\frac{14\pi}{9}\right)\cdot\sin\left(\omega_1\cdot t+\alpha-\frac{14\pi}{9}\right)+$$

$$Ic_2(t)\cdot\cos\left(\omega_2\cdot t-\gamma-\frac{16\pi}{9}\right)\cdot\sin\left(\omega_1\cdot t+\alpha-\frac{16\pi}{9}\right)\}]$$

Here, the above equation may be rewritten using the formula $$\cos(a)\cdot\sin(b)=\tfrac{1}{2}\cdot\{\sin(a+b)-\sin(a-b)\}.$$

$$f_2=\mu\cdot Im_2\cdot[Im_1\cdot\sin(3\omega_1\cdot t-3\omega_2\cdot t-3\alpha)+ \quad (61)$$

$$n\cdot Ic_1\cdot\left[\frac{1}{2}\cdot\{\sin(3\omega_1\cdot t-3\beta+3\omega_2\cdot t+3\alpha)-\right.$$

$$\sin(3\omega_1\cdot t-3\beta-3\omega_2\cdot t-3\alpha)\}+$$

$$\frac{1}{2}\cdot\left\{\sin\left(3\omega_1\cdot t-3\beta-\frac{2\pi}{3}+3\omega_2\cdot t+3\alpha-\frac{2\pi}{3}\right)-\right.$$

$$\sin\left(3\omega_1\cdot t-3\beta-\frac{2\pi}{3}-3\omega_2\cdot t-3\alpha+\frac{2\pi}{3}\right)\}+$$

$$\frac{1}{2}\cdot\left\{\sin\left(3\omega_1\cdot t-3\beta-\frac{4\pi}{3}+3\omega_2\cdot t+3\alpha-\frac{4\pi}{3}\right)-\right.$$

$$\sin\left(3\omega_1\cdot t-3\beta-\frac{4\pi}{3}-3\omega_2\cdot t-3\alpha+\frac{4\pi}{3}\right)\}\bigg]+$$

$$n\cdot Ic_2(t)\cdot\left[\frac{1}{2}\cdot\{\sin(\omega_2\cdot t-\gamma+\omega_2\cdot t+\alpha)-\right.$$

$$\sin(\omega_2\cdot t-\gamma-\omega_2\cdot t-\alpha)\}+$$

$$\frac{1}{2}\cdot\left\{\sin\left(\omega_2\cdot t-\gamma-\frac{2\pi}{9}+\omega_2\cdot t+\alpha\right)-\right.$$

$$\sin\left(\omega_2\cdot t-\gamma-\frac{2\pi}{9}-\omega_2\cdot t-\alpha\right)\}+$$

$$\frac{1}{2}\cdot\sin\left(\omega_2\cdot t-\gamma-\frac{4\pi}{9}+\omega_2\cdot t+\alpha\right)-$$

$$\sin\left(\omega_2\cdot t-\gamma-\frac{4\pi}{9}-\omega_2\cdot t-\alpha\right)\}+$$

$$\frac{1}{2}\cdot\left\{\sin\left(\omega_2\cdot t-\gamma-\frac{8\pi}{9}+\omega_2\cdot t+\alpha\right)-\right.$$

$$\sin\left(\omega_2\cdot t-\gamma-\frac{6\pi}{9}-\omega_2\cdot t-\alpha\right)\}+$$

$$\frac{1}{2}\cdot\left\{\sin\left(\omega_2\cdot t-\gamma-\frac{10\pi}{9}+\omega_2\cdot t+\alpha\right)-\right.$$

-continued $$\sin\left(\omega_2 \cdot t - \gamma - \frac{8\pi}{9} - \omega_2 \cdot t - \alpha\right)\right\} +$$

$$\frac{1}{2} \cdot \left\{\sin\left(\omega_2 \cdot t - \gamma - \frac{12\pi}{9} + \omega_2 \cdot t + \alpha\right) - \sin\left(\omega_2 \cdot t - \gamma - \frac{10\pi}{9} - \omega_2 \cdot t - \alpha\right)\right\} +$$

$$\frac{1}{2} \cdot \left\{\sin\left(\omega_2 \cdot t - \gamma - \frac{14\pi}{9} + \omega_2 \cdot t + \alpha\right) - \sin\left(\omega_2 \cdot t - \gamma - \frac{12\pi}{9} - \omega_2 \cdot t - \alpha\right)\right\} +$$

$$\frac{1}{2} \cdot \left\{\sin\left(\omega_2 \cdot t - \gamma - \frac{16\pi}{9} + \omega_2 \cdot t + \alpha\right) - \sin\left(\omega_2 \cdot t - \gamma - \frac{14\pi}{9} + \omega_2 \cdot t - \alpha\right)\right\}\right]$$

$$= \mu \cdot Im_2 \cdot [Im_1 \cdot \sin(3\omega_1 \cdot t - 3\omega_2 \cdot t - 3\alpha) +$$

$$\frac{1}{2} \cdot n \cdot Ic_1 \cdot \{\sin(3\omega_1 \cdot t + 3\omega_2 \cdot t - 3\beta + 3\alpha) -$$

$$\sin(3\omega_1 \cdot t - 3\omega_2 \cdot t - 3\alpha - 3\beta) +$$

$$\sin\left(3\omega_1 \cdot t + 3\omega_2 \cdot t - 3\beta + 3\alpha - \frac{4\pi}{3}\right) -$$

$$\sin(3\omega_1 \cdot t - 3\omega_2 \cdot t - 3\alpha - 3\beta) +$$

$$\sin\left(3\omega_1 \cdot t + 3\omega_2 \cdot t - 3\beta + 3\alpha - \frac{2\pi}{3}\right) -$$

$$\sin(3\omega_1 \cdot t - 3\omega_2 \cdot t - 3\alpha - 3\beta)\} + n \cdot Ic_2(t) \cdot$$

$$\left[\frac{1}{2} \cdot \{\sin(\omega_2 \cdot t - \gamma + \omega_2 \cdot t \cdot \alpha) + \sin(\gamma + \alpha)\} +$$

$$\frac{1}{2} \cdot \left\{\sin\left(\omega_2 \cdot t - \gamma + \omega_2 \cdot t + \alpha - \frac{4\pi}{9}\right) + \sin(\gamma + \alpha)\right\} +$$

$$\frac{1}{2} \cdot \left\{\sin\left(\omega_2 \cdot t - \gamma + \omega_2 \cdot t + \alpha - \frac{8\pi}{9}\right) + \sin(\gamma + \alpha)\right\} +$$

$$\frac{1}{2} \cdot \left\{\sin\left(\omega_2 \cdot t - \gamma + \omega_2 \cdot t + \alpha - \frac{12\pi}{9}\right) + \sin(\gamma + \alpha)\right\} +$$

$$\frac{1}{2} \cdot \left\{\sin\left(\omega_2 \cdot t - \gamma + \omega_2 \cdot t + \alpha - \frac{16\pi}{9}\right) + \sin(\gamma + \alpha)\right\} +$$

$$\frac{1}{2} \cdot \left\{\sin\left(\omega_2 \cdot t - \gamma + \omega_2 \cdot t + \alpha - \frac{2\pi}{9}\right) + \sin(\gamma + \alpha)\right\} +$$

$$\frac{1}{2} \cdot \left\{\sin\left(\omega_2 \cdot t - \gamma + \omega_2 \cdot t + \alpha - \frac{6\pi}{9}\right) + \sin(\gamma + \alpha)\right\} +$$

$$\frac{1}{2} \cdot \left\{\sin\left(\omega_2 \cdot t - \gamma + \omega_2 \cdot t + \alpha - \frac{10\pi}{9}\right) + \sin(\gamma + \alpha)\right\} +$$

$$\frac{1}{2} \cdot \left\{\sin\left(\omega_2 \cdot t - \gamma + \omega_2 \cdot t + \alpha - \frac{14\pi}{9}\right) + \sin(\gamma + \alpha)\right\}\right]$$

$$= \mu \cdot Im_2 \cdot \{Im_1 \cdot \sin(3\omega_1 \cdot t - 3\omega_2 \cdot t - 3\alpha) -$$

$$\frac{3}{2} \cdot n \cdot Ic_1 \cdot \sin(3\omega_1 \cdot t + 3\omega_1 \cdot t - 3\alpha - 3\beta) +$$

$$\frac{9}{2} \cdot n \cdot Ic_2(t) \cdot \sin(\gamma + \alpha)\}$$

(3-5-3) Summary

As described in the case of equation (48), as in the case of three-phase alternating current, the first and second terms on the right-hand side of equation (61) are canceled when these terms in other phases are taken into account.

When this equation (61) for the case where the inner rotating magnetic fields are supplied by a nine-phase alternating current is compared with the above-mentioned equation (52) where the inner rotating magnetic fields are supplied by a three-phase alternating current, the fixed term of equation (61), i.e., the last term, is three times that of equation (52).

In other words, when the drive current of the inner magnets $m_2$ is a nine-phase alternating current (Ii–Iix), a drive force, i.e., drive torque, is three times that when the drive current of the inner magnet is a three-phase alternating current.

In other words, the drive torque required to generate the same drive torque for the inner magnets $m_2$ is only 1/3.

This completes the theoretical analysis of this invention.

Next, third-fifth embodiments of the invention will be described referring to FIGS. 16–18.

In all of these embodiments, the rotors 3 and 4 are arranged inside and outside the stator 2 as in the case of the aforesaid first and second embodiments, but the magnetic pole number ratio of the outer rotor 3 and inner rotor 4 is altered.

Figure 16:
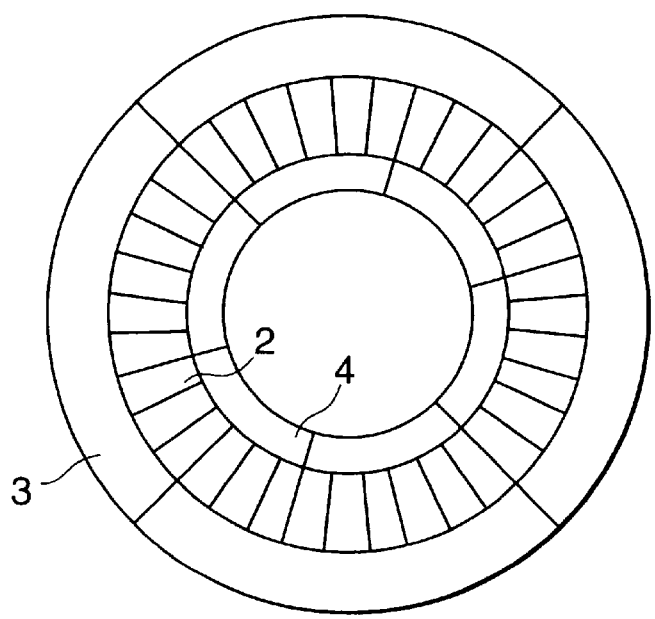
FIG. 16 is a schematic cross-sectional view of a motor/generator according to a third embodiment of this invention.

In the third embodiment shown in FIG. 16, the magnetic pole number ratio is set at 2:3.

Figure 17:
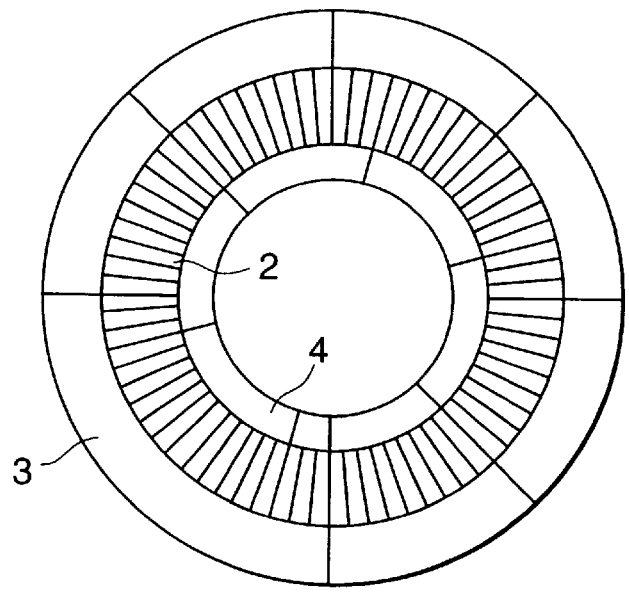
FIG. 17 is similar to FIG. 16, but showing a fourth embodiment of this invention.

In the fourth embodiment shown in FIG. 17, the magnetic pole number ratio is set at 4:3.

Figure 18:
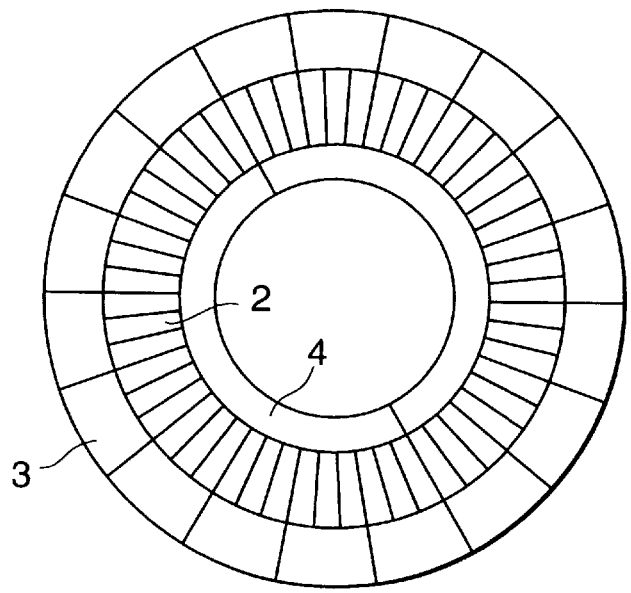
FIG. 18 is similar to FIG. 16, but showing a fifth embodiment of this invention.

In the fifth embodiment shown in FIG. 18, the magnetic pole number ratio is set at 9:1.

Hence, this invention can be applied to the case where the magnetic pole number of the outer rotor 3 is greater or less than the magnetic pole number of the inner rotor 4. In both of these cases, a fluctuation is produced in the rotational torque of the inner rotor 4 by the magnetic field which drives the outer rotor 3, or a fluctuation is produced in the rotational torque of the outer rotor 3 by the magnetic field which drives the inner rotor 4. A characteristic feature of this invention is that this torque fluctuation is eliminated by amplitude modulation that is added to the alternating current supplied to the stator coils. However, other methods are also possible.

The contents of Tokugan Hei 10-77495, with a filing date of Mar. 25, 1999 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, instead of adding an amplitude modulation to the alternating current which produces rotating magnetic fields relative to the inner rotor 4, one coil may be added to the inner rotor 4, and a direct current supplied via a slip ring to this coil. The torque fluctuation can be eliminated by varying this direct current voltage periodically.

Further, the rotors 3 and 4 were arranged outside and inside the stator 2 in the above-mentioned embodiments, but both rotors may be arranged outside the stator 2 or inside the stator 2.

Also, the signal output by the control circuit 15 to the inverter is not limited to a PWM signal, and a pulse amplitude modulation (PAM) signal or other signals may be used.

This invention is not limited to a radial gap type motor/generator wherein the gap between the rotor and the stator is set in a radial direction, and may be applied to a motor/generator wherein the gap between the rotor and stator is in an axial direction.

In the description of the aforesaid embodiments, the case was described where the rotors were driven as a motor, however they may of course also be used as generators, or one rotor may be used as a motor and the other one may be used as a generator to generate power.

The embodiments of this invention in which an exclusive property or privilege is claimed are defined as follows:

What is claimed is:

1. A motor/generator comprising:

a first rotor comprising plural magnetic poles and supported free to rotate, a second rotor comprising plural magnetic poles and supported free to rotate coaxially with said first rotor, a stator fixed co-axially with said first rotor, a coil unit comprising plural coils disposed at equal angular intervals on said stator, wherein said coil unit forms plural rotating magnetic fields of equal number to the number of magnetic poles of said first rotor according to a first alternating current and forms plural rotating magnetic fields of equal number to the number of magnetic poles of said second rotor according to a second alternating current, an electrical circuit for supplying a composite electrical current comprising said first alternating current and said second alternating current to said coil unit, and a circuit for compensating a torque fluctuation produced in either of said two rotors due to the non-uniformity of the magnetic field accompanying the relative rotation of said first rotor and second rotor.

2. A motor/generator as defined in claim 1, wherein said compensating circuit is configured to compensate said torque fluctuation by adding an amplitude modulation to an alternating current forming said composite current which produces the torque fluctuation.

3. A motor/generator as defined in claim 1, wherein said rotor which suffers the torque fluctuation comprises an extra coil for generating a magnetic force according to supply of a direct current, and said compensating circuit is further configured to compensate said torque fluctuation by periodically varying the voltage of said direct current.

4. A motor/generator as defined in claim 1, wherein the number of magnetic poles of said first rotor is set to any number other than twice the number of magnetic poles of said second rotor.

* * * * *